(12) United States Patent
Wies et al.

(10) Patent No.: US 8,838,671 B2
(45) Date of Patent: *Sep. 16, 2014

(54) DEFINING FORCE SENSATIONS ASSOCIATED WITH GRAPHICAL IMAGES

(75) Inventors: Evan F. Wies, Mountain View, CA (US); Dean C. Chang, Santa Clara, CA (US); Louis B. Rosenberg, San Jose, CA (US); Sian W. Tan, Mountain View, CA (US); Jeffrey R. Mallett, Boulder Creek, CA (US)

(73) Assignee: Immersion Corporation, San Jose, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/092,158

(22) Filed: Mar. 5, 2002

(65) Prior Publication Data

US 2002/0138562 A1 Sep. 26, 2002

Related U.S. Application Data

(63) Continuation of application No. 09/649,723, filed on Aug. 28, 2000, now Pat. No. 6,353,850, which is a (Continued)

(51) Int. Cl.
*G06F 15/16* (2006.01)
*G05B 19/00* (2006.01)

(Continued)

(52) U.S. Cl.
CPC .............. *G06F 3/016* (2013.01); *G05B 19/00* (2013.01); *H04L 67/36* (2013.01); *G06F 3/03548* (2013.01); *G06F 3/03543* (2013.01); *A63F 2300/1037* (2013.01); *H04L 67/02* (2013.01); *H04L 67/34* (2013.01); *H04L 29/06* (2013.01); *G06F 2203/014* (2013.01); *G06F 2203/0333* (2013.01); *H04L 67/38* (2013.01); *G06F 2203/013* (2013.01); *H04L 67/42* (2013.01); *A63F 2300/1025* (2013.01); *H04L 69/329* (2013.01)
USPC ............ 709/203; 709/217; 709/219; 715/701

(58) Field of Classification Search
USPC ........................... 709/203, 217–219; 345/701
See application file for complete search history.

(56) References Cited

U.S. PATENT DOCUMENTS 3,157,853 A 11/1964 Hirsch
3,220,121 A 11/1965 Cutler
(Continued)

FOREIGN PATENT DOCUMENTS

EP 0349086 1/1990
JP 01-003664 7/1990
(Continued)

OTHER PUBLICATIONS

Ken Hinckley, "Haptic Issues for Virtual Manipulation," Dissertation for PHD at the University of Virginia, pp. 1-200, Dec. 1996.*

(Continued)

*Primary Examiner* — Christopher Biagini
(74) *Attorney, Agent, or Firm* — Kilpatrick Townsend & Stockton LLP

(57) ABSTRACT

Force feedback is provided to a user of a client computer receiving information such as a web page over a network such as the World Wide Web from a server machine. The client machine has a force feedback interface device through which the user experiences physical force feedback. The web page may include force feedback information to provide authored force effects. Force feedback is correlated to web page objects by a force feedback program running on the client and based on input information from the interface device, the web page objects, and the force feedback information. Generic force effects can also be provided, which are applied uniformly at the client machine to all web page objects of a particular type as defined by user preferences at the client machine. A web page authoring interface is also described that includes the ability to add force sensations to a web page. The user may assign force effects to web page objects and immediately feel how the web page will feel to an end user. A web page is output by the interface, including force information to provide the force effects at a client. The authoring tool can include or access a force design interface for creating or modifying force effects.

20 Claims, 27 Drawing Sheets

Related U.S. Application Data continuation of application No. 09/244,622, filed on Feb. 2, 1999, now Pat. No. 6,161,126, which is a continuation-in-part of application No. 08/691,852, filed on Aug. 1, 1996, now Pat. No. 5,956,484, which is a continuation-in-part of application No. 08/571,606, filed on Dec. 13, 1995, now Pat. No. 6,219,032, which is a continuation-in-part of application No. 08/970,953, filed on Nov. 14, 1997, now Pat. No. 6,300,936.

(60) Provisional application No. 60/073,518, filed on Feb. 3, 1998.

(51) Int. Cl.
  *H04L 29/08* (2006.01)
  *G06F 3/0354* (2013.01)
  *H04L 29/06* (2006.01)
  *G06F 3/01* (2006.01)

(56) References Cited

U.S. PATENT DOCUMENTS

| | | | |
|---|---|---|---|
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,160,508 A | 7/1979 | Frosch et al. | |
| 4,236,325 A | 12/1980 | Hall et al. | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | De Vries et al. | |
| 4,713,007 A | 12/1987 | Alban | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,186,695 A | 2/1993 | Mangseth et al. | |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,299,810 A | 4/1994 | Pierce | |
| 5,309,140 A | 5/1994 | Everett | |
| 5,334,027 A | 8/1994 | Wherlock | |
| 5,382,885 A * | 1/1995 | Salcudean et al. | 318/568.11 |
| 5,386,507 A * | 1/1995 | Teig et al. | 715/836 |
| 5,466,213 A | 11/1995 | Hogan | |
| 5,547,382 A | 8/1996 | Yamasaki | |
| 5,555,894 A * | 9/1996 | Doyama et al. | 600/595 |
| 5,623,642 A | 4/1997 | Katz et al. | |
| 5,629,594 A * | 5/1997 | Jacobus et al. | 318/568.11 |
| 5,666,473 A * | 9/1997 | Wallace | 345/420 |
| 5,669,818 A * | 9/1997 | Thorner et al. | 463/30 |
| 5,685,775 A | 11/1997 | Bakoglu et al. | |
| 5,691,898 A | 11/1997 | Rosenberg et al. | |
| 5,695,400 A | 12/1997 | Fennell, Jr. et al. | |
| 5,732,219 A * | 3/1998 | Blumer et al. | 709/227 |
| 5,742,278 A * | 4/1998 | Chen et al. | 345/156 |
| 5,755,620 A | 5/1998 | Yamamoto et al. | |
| 5,766,016 A | 6/1998 | Sinclair | |
| 5,785,630 A | 7/1998 | Bobick et al. | |
| 5,791,992 A | 8/1998 | Crump et al. | |
| 5,795,228 A | 8/1998 | Trumbull et al. | |
| 5,802,353 A | 9/1998 | Avila et al. | |
| 5,825,308 A | 10/1998 | Rosenberg | |
| 5,838,906 A * | 11/1998 | Doyle et al. | 715/205 |
| 5,844,392 A * | 12/1998 | Peurach et al. | 318/568.17 |
| 5,880,731 A | 3/1999 | Liles et al. | |
| 5,884,029 A | 3/1999 | Brush, II et al. | |
| 5,889,506 A | 3/1999 | Lopresti et al. | |
| 5,907,677 A | 5/1999 | Glenn et al. | |
| 5,908,467 A * | 6/1999 | Barrett et al. | 709/218 |
| 5,917,725 A | 6/1999 | Thacher et al. | |
| 5,933,599 A | 8/1999 | Nolan | |
| 5,956,484 A | 9/1999 | Rosenberg et al. | |
| 5,973,678 A * | 10/1999 | Stewart et al. | 345/184 |
| 6,004,134 A * | 12/1999 | Marcus et al. | 434/45 |
| 6,028,593 A | 2/2000 | Rosenberg et al. | |
| 6,046,726 A * | 4/2000 | Keyson | 345/156 |
| 6,071,194 A * | 6/2000 | Sanderson et al. | 463/37 |
| 6,076,100 A | 6/2000 | Cottrille et al. | |
| 6,101,530 A | 8/2000 | Rosenberg et al. | |
| 6,111,577 A * | 8/2000 | Zilles et al. | 345/701 |
| 6,141,652 A * | 10/2000 | Reeder | 705/53 |
| 6,148,346 A * | 11/2000 | Hanson | 719/321 |
| 6,154,773 A | 11/2000 | Roberts et al. | |
| 6,160,489 A | 12/2000 | Perry et al. | |
| 6,166,732 A | 12/2000 | Mitchell et al. | |
| 6,183,364 B1 | 2/2001 | Trovato | |
| 6,219,034 B1 | 4/2001 | Elbing et al. | |
| 6,219,045 B1 | 4/2001 | Leahy et al. | |
| 6,249,806 B1 | 6/2001 | Kohda et al. | |
| 6,256,663 B1 | 7/2001 | Davis | |
| 6,263,442 B1 * | 7/2001 | Mueller et al. | 726/3 |
| 6,281,651 B1 | 8/2001 | Haanpaa et al. | |
| 6,342,880 B2 | 1/2002 | Rosenberg et al. | |
| 6,347,307 B1 | 2/2002 | Sandhu et al. | |
| 6,349,301 B1 | 2/2002 | Mitchell et al. | |
| 6,353,850 B1 | 3/2002 | Wies et al. | |
| 6,359,550 B1 | 3/2002 | Brisebois et al. | |
| 6,396,509 B1 | 5/2002 | Cheng | |
| 6,422,941 B1 | 7/2002 | Thorner et al. | |
| 6,429,846 B2 | 8/2002 | Rosenberg et al. | |
| 6,442,590 B1 | 8/2002 | Inala et al. | |
| 6,482,010 B1 * | 11/2002 | Marcus et al. | 434/45 |
| 6,539,218 B2 | 3/2003 | Higuchi et al. | |
| 6,563,487 B2 | 5/2003 | Martin et al. | |
| 6,618,754 B1 * | 9/2003 | Gosling | 709/220 |
| 6,678,720 B1 | 1/2004 | Matsumoto et al. | |
| 6,693,626 B1 | 2/2004 | Rosenberg | |
| 6,859,819 B1 | 2/2005 | Rosenberg et al. | |

FOREIGN PATENT DOCUMENTS

| | | |
|---|---|---|
| JP | 02-109714 | 1/1992 |
| JP | 04-007371 | 8/1993 |
| JP | 05-193862 | 1/1995 |
| WO | WO 97/21160 | 6/1997 |

OTHER PUBLICATIONS

Ellis, R.E. et al., "Design and Evaluation of a High-Performance Prototype Planar Haptic Interface," ASME Dec. 3, 1993, DSC-vol. 49, pp. 55-64.*

Mitsuishi, M. et al. "A tele-micro-surgery system across the Internet with a fixed viewpoint/operation-point," Intelligent Robots and Systems 95. 'Human Robot Interaction and Cooperative Robots', Proceedings. 1995 IEEE/RSJ International Conference on , vol. 2, No., pp. 178-185 vol. 2, Aug. 5-9, 1995.*

Goldberg, K.; Mascha, M.; Gentner, S.; Rothenberg, N.; Sutter, C.; Wiegley, J., "Desktop teleoperation via the World Wide Web," Robotics and Automation, 1995. Proceedings., 1995 IEEE International Conference on , vol. 1, No., pp. 654-659 vol. 1, May 21-25, 1995.*

Reynolds, Mark et al. Electronic excerpt from Chapter 8 of "Special Edition Using Javascript". Que Corporation. <http://www.see.ed.ac.uk/~mfg/work/javascript-book/sejava08.htm>. Jul. 4, 1996. pp. 1-23.*

"Index of /~mfg/work/javascript-book". <http://www.see.ed.ac.uk/~mfg/work/javascript-book/>. Accessed Apr. 18, 2014. p. 1.*

LOOKupbyISBN listing for "Special Edition Using Javascript". <www.lookupby   isbn.com/Lookup/Book/0789707896/0-7897-0789-6/1>. Accessed Apr. 18, 2014. pp. 1-2.*

U.S. Appl. No. 09/153,781, filed Sep. 16, 1998, Rosenberg, et al.

(56) References Cited

OTHER PUBLICATIONS

Mania, Katerina, et al., A Classification for User Embodiment in Collaborative Virtual Environments; www.cs.bris.ac.uk/Tools/Reports/Abstracts/1998—mania.html printed Jun. 9, 2004.
Bouguila, Laroussi, et al., Effect of Coupling Haptics and Stereopsis on Depth in Virtual Environment, pp. 54-62; www.dcs.gla.ac.uk/~stephen/workshops/haptic/papers/bougilia-paper.pdf printed Jun. 9, 2004.
Real Time Graphics, vol. 7, No. 2; Computer Graphics Systems Development Corp., Aug. 1998, pp. 1-20; www.cgsd.com/rtgAug98.pdf printed Jun. 9, 2004.
Benford, Steve, et al., eRENA—Deliverable 7b.1 Pushing Mixed Reality Boundaries, Feb. 1999; www.nada.kth.se/erena/pdf/D7b_1.pdf printed Jun. 9, 2004.
Pao, Lucy, et al., Synergistic Visual/Haptic Computer Interfaces, May 1998, pp. 155-162; schof.colorado.edu/~pao/anonftp/Vietnam.ps. printed Jun. 9, 2004.
McLaughlin, Margaret, et al., The USC Interactive Art Museum: Removing the Barriers between Museums and their Constituencies; http://ascusc.org/jcmc/paperforica.html printed Jul. 22, 2003.
Virtual Realty (VR) Development at SERI (Korea), pp. 1-9, 1998; www.atip.org/public/atip.reports.98/atip98.059r.html printed Jun. 9, 2004.
Australia Patent Office, First Official Report, Australian Patent Application No. 25790/99, mailed Apr. 15, 2002.
Australia Patent Office, Second Official Report, Australian Patent Application No. 25790/99, mailed Jul. 25, 2003.
Australia Patent Office, Third Official Report, Australian Patent Application No. 25790/99, mailed Dec. 19, 2003.
Canadian Patent Office, Office Action, Application No. 2,319,586, mailed Dec. 28, 2006.
Canadian Patent Office, Office Action, Application No. 2,319,586, mailed Feb. 1, 2008.
Canadian Patent Office, Office Action, Application No. 2,319,586, mailed Nov. 6, 2009.
Patent Cooperation Treaty, International Search Report, Application No. PCT/US99/02322, mailed Jun. 15, 1999.
United States Patent and Trademark Office, Office Action, U.S. Appl. No. 10/615,927, mailed Dec. 9, 2008.
United States Patent and Trademark Office, Office Action, U.S. Appl. No. 10/615,927, mailed Jul. 21, 2008.
United States Patent and Trademark Office, Office Action, U.S. Appl. No. 10/615,927, mailed Dec. 11, 2007.
United States Patent and Trademark Office, Office Action, U.S. Appl. No. 09/153,781, mailed Feb. 26, 2003.
United States Patent and Trademark Office, Office Action, U.S. Appl. No. 09/153,781, mailed Mar. 14, 2002.
United States Patent and Trademark Office, Office Action, U.S. Appl. No. 09/153,781, mailed May 17, 2007.
United States Patent and Trademark Office, Office Action, U.S. Appl. No. 09/153,781, mailed May 22, 2006.
United States Patent and Trademark Office, Office Action, U.S. Appl. No. 09/153,781, mailed Jun. 17, 2008.
United States Patent and Trademark Office, Office Action, U.S. Appl. No. 09/153,781, mailed Aug. 11, 2004.
United States Patent and Trademark Office, Office Action, U.S. Appl. No. 09/153,781, mailed Aug. 27, 2003.
United States Patent and Trademark Office, Office Action, U.S. Appl. No. 09/153,781, mailed Oct. 11, 2006.
United States Patent and Trademark Office, Office Action, U.S. Appl. No. 09/153,781, mailed Oct. 22, 2002.
United States Patent and Trademark Office, Office Action, U.S. Appl. No. 09/153,781, mailed Dec. 10, 2007.
United States Patent and Trademark Office, Office Action, U.S. Appl. No. 09/153,781, mailed Dec. 18, 2008.
Ellis, R. et al., Design and Evaluation of a High Performance Prototype Planar Haptic Interface, DSC-vol. 49, Advances in Robotics, Mechatronics, and Haptic Interfaces, ASME 1993, pp. 55-64.
Goldberg, K. et al., Desktop Teleoperation via the World Wide Web, IEEE International Conference on Robotics and Automation, pp. 654-659, 1995.
Mitsuishi, M. et al., A Tele-micro-surgery System across the Internet with a Fixed Viewpoint/Operation-Point, Division of Design, Manufacturing, and Industrial Innovation National Science Foundation, pp. 178-185, 1995.
Adelstein, "A Virtual Environment System for the Study of Human Arm Tremor," Ph.D. Dissertation, Dept. of Mechanical Engineering, MIT, Jun. 1989.
Adelstein, "Design and Implementation of a Force Reflecting Manipulandum for Manual Control research," DSC-vol. 42, Advances in Robotics, Edited by H. Kazerooni, pp. 1-12, 1992.
Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.
Bejczy, et al., "Universal Computer Control System (UCCS) for Space Telerobots," CH2413- 3/87/0000/0318501.00 1987 IEEE, 1987.
Bejczy et al., "A Laboratory Breadboard System for Dual-Arm Teleoperation," SOAR '89 Workshop, JSC, Houston, TX, Jul. 25-27, 1989.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Caldwell et al., "Enhanced Tactile Feedback (Tele-Taction) Using a Multi-Functional Sensory System," 1050-4729/93, pp. 955-960, 1993.
"Cyberman Technical Specification," Logitech Cyberman SWIFT Supplement, Apr. 5, 1994.
Eberhardt et al., "OMAR—A Haptic display for speech perception by deaf and deaf-blind individuals," IEEE Virtual Reality Annual International Symposium, Seattle, WA, Sep. 18-22, 1993.
Eberhardt et al., "Including Dynamic Haptic Perception by The Hand: System Description and Some Results," DSC-vol. 55-1, Dynamic Systems and Control: vol. 1, ASME 1994.
Gobel et al., "Tactile Feedback Applied to Computer Mice," International Journal of Human-Computer Interaction; vol. 7, No. 1, pp. 1-24, 1995.
Gotow et al., "Controlled Impedance Test Apparatus for Studying Human Interpretation of Kinesthetic Feedback," WA11-11:00, pp. 332-337, 1989.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bullein, "Mouse Ball-Actuating Device With Force and Tactile Feedback," vol. 32, No. 9B, Feb. 1990.
Iwata, "Pen-based Haptic Virtual Environment," 0/7803-1363-1/93 IEEE, pp. 287-292, 1993.
Jacobsen et al., "High Performance, Dextrous Telerobotic Manipulator With Force Reflection," Intervention/ROV '91 Conference & Exposition, Hollywood, Florida, May 21-23, 1991.
Jones et al., "A perceptual analysis of stiffness," ISSN 0014-4819 Springer International (Springer-Verlag); Experimental Brain Research, vol. 79, No. 1, pp. 150-156, 1990.
Kaczmarek et al., "Tactile Displays," Virtual Environment Technologies., 1995.

(56) References Cited

OTHER PUBLICATIONS

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Marcus, "Touch Feedback in Surgery," Proceedings of Virtual Reality and Medicine the Cutting Edge, Sep. 8-11, 1994.
McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.
Minsky, "Computational Haptics: The Sandpaper System for Synthesizing Texture for a Force-Feedback Display," Ph.D. Dissertation, MIT, Jun. 1995.
Noll, "Man-Machine Tactile," SID Journal, Jul./Aug. 1972 Issue.
Ouh-Young, "Force Display in Molecular Docking," Order No. 9034744, p. 1-369, 1990.
Ouh-Young, "A Low-Cost Force Feedback Joystick and Its Use in PC Video Games," IEEE Transactions on Consumer Electronics, vol. 41, No. 3, Aug. 1995.
Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.
Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of the Acoustical Society of America, vol. 82, No. 4, Oct. 1987.
Russo, "The Design and Implementation of a Three Degree of Freedom Force Output Joystick," MIT Libraries Archives Aug. 14, 1990, pp. 1-131, May 1990.
Russo, "Controlling Dissipative Magnetic Particle Brakes in Force Reflective Devices," DSC-vol. 42, Advances in Robotics, pp. 63-70, ASME 1992.
Scannell, "Taking a Joystick Ride," Computer Currents, Boston Edition, vol. 9, No. 11, Nov. 1994.
Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30-Oct. 1, 1992.
Snow et al., "Model-X Force-Reflecting-Hand-Controller," NT Control No. MPO-17851; JPL Case No. 5348, pp. 1-4, Jun. 15, 1989.
Stanley et al., "Computer Simulation of Interacting Dynamic Mechanical Systems Using Distributed Memory Parallel Processors," DSC-vol. 42, Advances in Robotics, pp. 55-61, ASME 1992.
Tadros, "Control System Design for a Three Degree of Freedom Virtual Environment Simulator Using Motor/Brake Pair Actuators", MIT Archive © Massachusetts Institute of Technology, pp. 1-88, Feb. 1990.
Terry et al., "Tactile Feedback in a Computer Mouse," Proceedings of Fouteenth Annual Northeast Bioengineering Conference, University of New Hampshire, Mar. 10-11, 1988.
Yamakita et al., "Tele-Virtual Reality of Dynamic Mechanical Model," Proceedings of the 1992 IEEE/RSJ International Conference on Intelligent Robots and Systems, Raleigh, NC, Jul. 7-10, 1992.

* cited by examiner

DEFINING FORCE SENSATIONS ASSOCIATED WITH GRAPHICAL IMAGES

CROSS REFERENCE TO RELATED APPLICATIONS

This is a continuation application of prior U.S. application Ser. No. 09/649,723, filed Aug. 28, 2000 now U.S. Pat. No. 6,353,850, which is a continuation of U.S. application Ser. No. 09/244,622, now U.S. Pat. No. 6,161,126, filed on Feb. 2, 1999, which 1) is a continuation-in-part of U.S. application Ser. No. 08/691,852, now U.S. Pat. No. 5,956,484, filed Aug. 1, 1996, which is a continuation-in-part of U.S. patent application Ser. No. 08/571,606, now U.S. Pat. No. 6,219,032, filed Dec. 13, 1995; 2) is a continuation-in-part of application Ser. No. 08/970,953, now U.S. Pat. No. 6,300,936, filed Nov. 14, 1997; and 3) claims priority to U.S. Provisional patent application No. 60/073,518, filed Feb. 3, 1998; the disclosures of which are all incorporated herein by reference.

BACKGROUND OF THE INVENTION

This invention relates generally to human/computer interfaces, and more particularly to human/computer interfaces with force feedback that can operate over a network.

The Internet has, of late, become extremely popular. While the use of the Internet has been prevalent for many years now, its use has been limited by the arcane and difficult commands required to access the various computers on the network. To address this problem, a protocol known as the "World Wide Web" or "WWW" was developed to provide an easier and user-friendlier interface for the Internet. With the World Wide Web, an entity having a domain name creates a "web page" or "page" which can provide information and, to a limited degree, some interactivity.

A computer user can "browse", i.e. navigate around, the WWW by utilizing a suitable web browser and a network gateway (e.g., an Internet Service Provider (ISP)). Currently, popular web browsers, include Netscape® Navigator® made by Netscape Corporation of Mountain View, Calif., and Internet Explorer made by Microsoft® Corporation of Redmond, Wash. A web browser allows a user to specify or search for a web page on the WWW, and then retrieves and displays web pages on the user's computer screen.

The Internet is based upon a transmission protocol known as "Transmission Control Protocol/Internet Protocol" (or "TCP/IP" for short), which sends "packets" of data between a host machine, e.g. a server computer on the Internet, and a client machine, e.g. a user's personal computer connected to the Internet. The WWW is an Internet interface protocol which is supported by the same TCP/IP transmission protocol. Intranets are private networks based upon Internet standards; since they adhere to Internet standards, can often use the same web browser software and web server software as are used on the Internet.

A web page typically includes static images, animated images (e.g. video), and/or text. The images and text are specified in a "HyperText Mark-up Language" ("HTML") file that is sent from the web server to the client machine. This HTML file is parsed by the web browser in order to display the text and images on the display of the client machine. Other standardized languages or protocols are also being developed for use with the Internet and the World Wide Web. For example, the Virtual Reality Modeling Language (VRML) is used to provide visual virtual 3-D environments and allow one or many users to navigate through and interact as "avatars" in such an environment using a web browser or other software on a client computer system.

Furthermore, additional functionality may be provided in web pages with information downloaded over the WWW in the form of scripts or programs. Scripting, typically in the form of VBScript or JavaScript, allows a series of instructions to be performed on the client computer once the instructions have been downloaded in a web page. Programs can be provided in such standard languages as Visual Basic, C++, or currently in the form of Java "applets" or ActiveX® controls. Java includes a platform-independent interpreter running on the client machine that executes downloaded applets within web pages or other programs, e.g., to display animated images, retrieve data over the WWW, output feedback to the user, or perform operating system tasks. ActiveX controls similarly execute on the client computer once the program instructions are resident on the client. ActiveX controls are programmable objects that can be embedded into Web pages and may be written in any (platform-specific) language. Java and ActiveX controls can add functionality to a Web page that would normally be difficult, or even impossible, using HTML or scripting languages. ActiveX controls can also be controlled with a scripting language. Alternatively, functionality can be added to a web page through the use of "plug-ins", which are application programs running in conjunction with certain web browsers to parse plug-in-specific code in the web page which the browser cannot understand.

Other WWW-related functionality includes Dynamic HTML. Dynamic HTML is a set of features currently incorporated in browsers such as Microsoft Internet Explorer that enable authors to dynamically change the rendering and content of an HTML document. Using Dynamic HTML, a content developer or programmer can access the attributes of a document's contents or objects (such as an object's position on the page and type). In addition, event messages are generated when a user interacts with the web page content (such as when a user clicks on a graphical button image). The features of Dynamic HTML can be elicited through the use of VBScript or JavaScript scripts embedded in a Web page or programmatically through Visual Basic or C++.

The Internet and the WWW also permit sound data to be transmitted over the Internet. For example, references to sound files can be embedded in HTML pages and can be played by the web browser. Data "packets" coded in TCP/IP format can also be sent from one client machine to another over the Internet to transmit sound data. This last-mentioned technique forms the basis for Internet telephony.

While the transmission of visual images (both static and dynamic), text, and sound over the Internet is well-known, the transmission of other types of sensory data has not been well explored. In particular, the transmission of data over the Internet pertaining to the sense of touch and/or force has not been established. "Force feedback" allows a user to experience or "feel" tactile sensations as provided through computational information. Using computer-controlled actuators and sensors on a force feedback device, a variety of realistic sensations can be modeled and experienced by the user. This useful and highly immersive sensory modality for interacting with the Internet has hereto been unavailable.

In addition, there needs to be tools to allow web page authors to quickly and easily add forces to web page content or adjust/modify existing forces as desired. Such tools should preferably allow an author or user to intuitively include forces in web pages without needing a knowledge of force feedback instructions or programming constructs. In addition, the author should be provided with an intuitive way to design or adjust the forces. Thus, a tool is needed for assisting the user, programmer or developer in intuitively and easily creating web pages and in setting force feedback characteristics to provide desired force sensations in web pages.

SUMMARY OF THE INVENTION

The present invention is related to the transmission/reception of information pertaining to force feedback to provide feel in transmitted information such as web pages. The force feedback provided by the methods and apparatus of the present invention enhance the sensory experience of the user to provide a richer, more interesting, and more enjoyable interaction with information received over networks.

In one aspect of the present invention for providing force feedback over a network, information is received by a client machine over a network from a server machine. The client machine (typically a personal computer) has a visual display and a force feedback interface device. Force feedback interface devices can include force feedback mice, joysticks, finger cradles, trackballs, steering wheels, and yokes. The force feedback interface device includes sensors and actuators and preferably a local microprocessor for communicating with the client machine and controlling the actuators of the interface device.

Several embodiments are disclosed in which forces are implemented based on the information received over the network. The disclosed embodiments emphasize the World Wide Web or the Internet as the network provided between client and server computers, where web page information received by the client is in HTML or other standard format and a web browser running on the client machine displays the web page. One embodiment provides authored force effects, which are effects particular to a web page that are customized for each web page object and are downloaded with the web page. The received web page information includes screen display information representing a visual layout of a web page and force feedback information related to providing a feel sensation. Input information from the interface device is used to position a cursor with respect to the visual layout of the web page. A force feedback signal is provided based upon the input information and the web page information, and the received force feedback information includes a call to a force feedback program running on the client machine that provides the force feedback signal. The force feedback signal is received by the interface device, which outputs computer-controlled physical force feedback to the user correlated with the visual layout of the web page. The force feedback program running on the client can be ActiveX control, a Java applet, a plug-in, etc. In one preferred embodiment, the ActiveX control is called by script instructions, e.g. in JavaScript, included in the received force feedback information. The script instructions can provide downloaded force effect parameters to the force feedback program to output a desired force effect.

In a different embodiment, generic force effects are implemented. Generic effects are applied uniformly to all web page objects of a particular type. A web page need not include force information to allow generic force effects to be applied to the web page content. Thus, a received web page includes screen display information representing web page objects. The client determines which web page objects are force web page objects to be associated with at least one generic force effect, where the force web page objects are of a predefined type. A generic force effect is assigned to each type of web page object as defined by effect information derived from the client machine. Generic force effects are output when a user-controlled cursor interacts with a force web page object. A force control program running on the client machine can detect whether the cursor is contacting one of the force web page objects and output the appropriate force feedback signals to the interface device. In another embodiment, a downloaded web page can be preprocessed before being displayed to add force feedback information to the web page. The client can perform the preprocessing, or a proxy server can preprocess the web page before sending the web page to the client. In other embodiments, both generic effects and authored effects can be provided for a particular web page. If both types of force effects are used, either type of force effect can be overridden by the other depending on user preferences.

In another aspect of the present invention, a web page authoring interface is provided that includes the ability to add force sensations to a web page. The web page authoring interface is displayed on a display device of a computer and displays a web page including web page objects. Input from a user is received to the authoring interface and selects a web page object and a force effect to be associated with the selected web page object. A web page is output by the interface, including the web page objects and including force information to allow the force effect to be implemented when the web page is displayed by a client machine after being received from a server machine over a network. The authoring tool can include a force design interface for creating or modifying the force effect, or a separate force design interface can accessed. The force effects added to web page objects can also be experienced directly by the author during the design process. In one embodiment, the author is also able to spatially designate an area of a web page object to be associated with a selected force effect, e.g. a graphical mark or outline can designate sub-areas of an image or text to be associated with forces. In addition, the user can preferably associate sound data with a web page object, such that when said force effect is output, a sound is output to the user synchronized with the force effect. Finally, a predefined graphical identifier can be inserted into the web page to indicate to a user that the web page provides force effects, and which may also be a link that causes a linked force feedback resource web page to be downloaded.

The present invention provides several ways to implement force feedback over a network such as the World Wide Web. Embodiments included herein allow standard web pages without any force content to be assigned forces on a client machine including force feedback capability. In other embodiments, a web page author can include specific force effects in a web page to any desired level of customization. The described force feedback web page authoring tool allows force effects to be easily and quickly included in web pages to foster greater diversity and widespread use of feel in web pages.

These and other advantages of the present invention will become apparent upon reading the following detailed descriptions and studying the various figures of the drawings.

BRIEF DESCRIPTION OF THE DRAWINGS

FIG. 4b is a perspective view of the mechanism of the force feedback device of FIG. 4a;

DETAILED DESCRIPTION OF THE PREFERRED EMBODIMENTS

Figure 1:
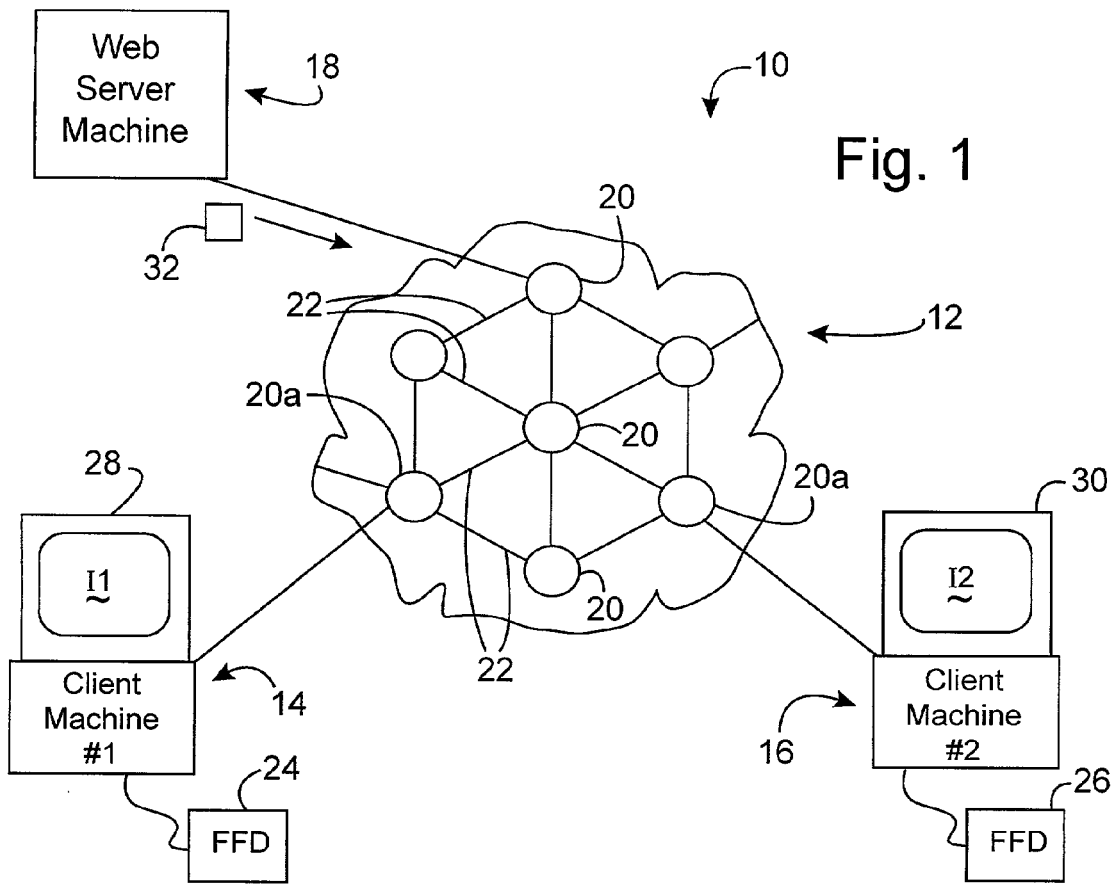
FIG. 1 is a pictorial representation of the Internet, a web server machine, and two client machines.

In FIG. 1, a network system 10 includes a wide area network (WAN) such as the Internet 12, and a number of computers or "machines" coupled to the Internet 12. For example, a first client machine 14, a second client machine 16, and a web server machine 18, are coupled to the Internet 12.

As noted previously, both the Internet 12 and Intranets operate using the same TCP/IP protocols. This allows Intranets to use similar or the same server machine software and client machine software as are used in Internet 12 applications. The Internet 12 includes a number of nodes 20 that are interconnected by data transmission media 22. These nodes are typically routers, switches, and other intelligent data transmission apparatus which route "packets" of TCP/IP information to the desired destination. In some instances, the nodes 20 comprise an Internet service provider (ISP) 20a which allows a client machine to access the "backbone" of the Internet. Alternatively, client machines and web servers can be coupled directly into the backbone of the Internet.

As noted previously, the present invention is directed to the implementation of force feedback over a network, such as the Internet 12. To provide a user of a client machine with the experience of force feedback, force feedback human/computer interfaces (hereafter "force feedback devices") 24 and 26 can be provided as part of the client machines 14 and 16, respectively. The client machines 14 and 16 are typically provided with computer video monitors 28 and 30 (which is one example of a "visual display"), respectively, which can display images I1 and I2, respectively. Preferably, forces developed by force feedback devices 24 and 26 are correlated with the images I1 and I2 of the client machines 14 and 16, respectively.

The machines 14-18 are considered, in the language of the Internet, to be "resources," and each has its own unique Uniform Resource Locator or "URL." In one embodiment of the present invention, a client machine, such as client machine 14 or 16, sends a request for a "web page" residing on, for example, web server machine 18. This is accomplished by the client machine sending a connection request and a URL which specifies the address of the web page to the web server machine 18. The web server machine 18 then sends a web page 32 in HTML format back to the requesting client machine where it is "cached" in the memory (typically the RAM, hard disk, or a combination of the two) of the client machine. In this embodiment of the invention, the image on the video display of the client machine is generated from the HTML web page file cached on the client machine, and force feedback is provided to a user through the force feedback device as he manipulates a user manipulable object of the force feedback device. The embodiments of the present invention can also be used with other collections of data or documents besides web pages.

In another aspect of the present invention, a first client machine, such as client machine 14, and a second client machine, such as client machine 16, directly communicate force feedback commands to each other in standard TCP/IP protocol over the Internet 12. More particularly, client machine 14 can send force feedback and other information to the URL of the client machine 16, and the client machine 16 can send force feedback and other information in standard TCP/IP packets to the URL of the client machine 14. In this way, users of client machine 14 and client machine 16 can interact physically over the Internet 12. Of course, a server machine 18 can likewise directly communicate force feedback commands to a client machine 12 or 14, or all three machines can interact.

Figure 2:
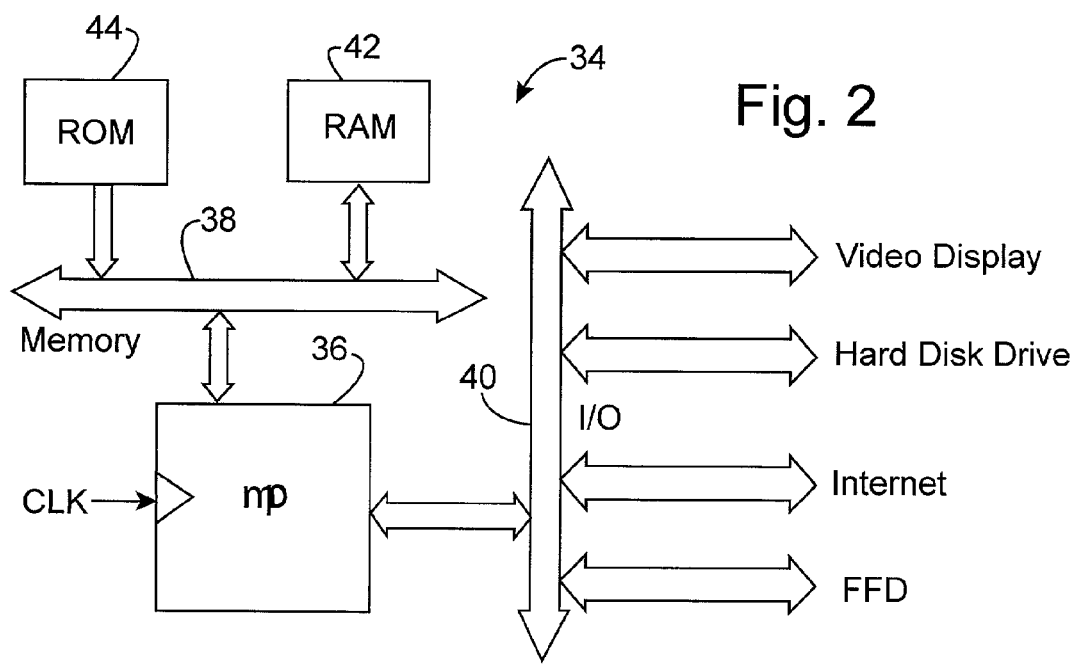
FIG. 2 is a block-diagram of a client machine used in the present invention.

In FIG. 2, a "personal" computer 34 architecture that can be used for client machine 14 or client machine 16 is shown in block diagram form. It should be noted that a variety of machine architectures can be used to access the Internet 12, such as a PC compatible computer under the Windows or MS-DOS operating system, Macintosh personal computer, SUN or Silicon Graphics workstation, home video game systems (such as systems available from Nintendo, Sega, or Sony), "set top box", "network access computers", portable/handheld computers of all types, or any general-purpose computer. The particular architecture shown for the computer 34 is a typical personal or "PC" computer architecture. Web server machines can also have similar architectures, but are often more powerful "workstations" that, for example, operate under some variant of the UNIX® operating system. The Internet service providers 20a are likewise often UNIX-based computers or powerful personal computers running Windows NT®. The nodes 20 are most commonly routers built by Cisco Systems of San Jose, Calif. Client machine 14 or 16 can also take other forms, such as a television including or connected to a microprocessor for Internet access. Force feedback devices used with such client machines can be appropriate for the particular embodiment, e.g., a TV remote control used for internet browsing on the abovementioned television can include force feedback functionality.

The personal computer system 34 includes a microprocessor 36 clocked by a system clock CLK and which is coupled to a high speed or memory bus 38 and to a lower speed or I/O bus 40. The system RAM 42 and ROM 44 are typically coupled to the high speed memory bus, while various peripherals, such as the video display, hard disk drive, Internet interface (often either a modem or an Ethernet connection), and force feedback device, are typically coupled to the slower I/O bus. The microprocessor executes programs stored in the various memories or other computer-readable medium of the computer 34 (RAM, ROM, hard disk, signal propagated by a carrier wave, etc.) to control, for example, the image display on the video display and the forces provided by the force feedback device. The manufacture and use of computers, such as personal computer 34, are well-known to those skilled in the art.

Figure 3:
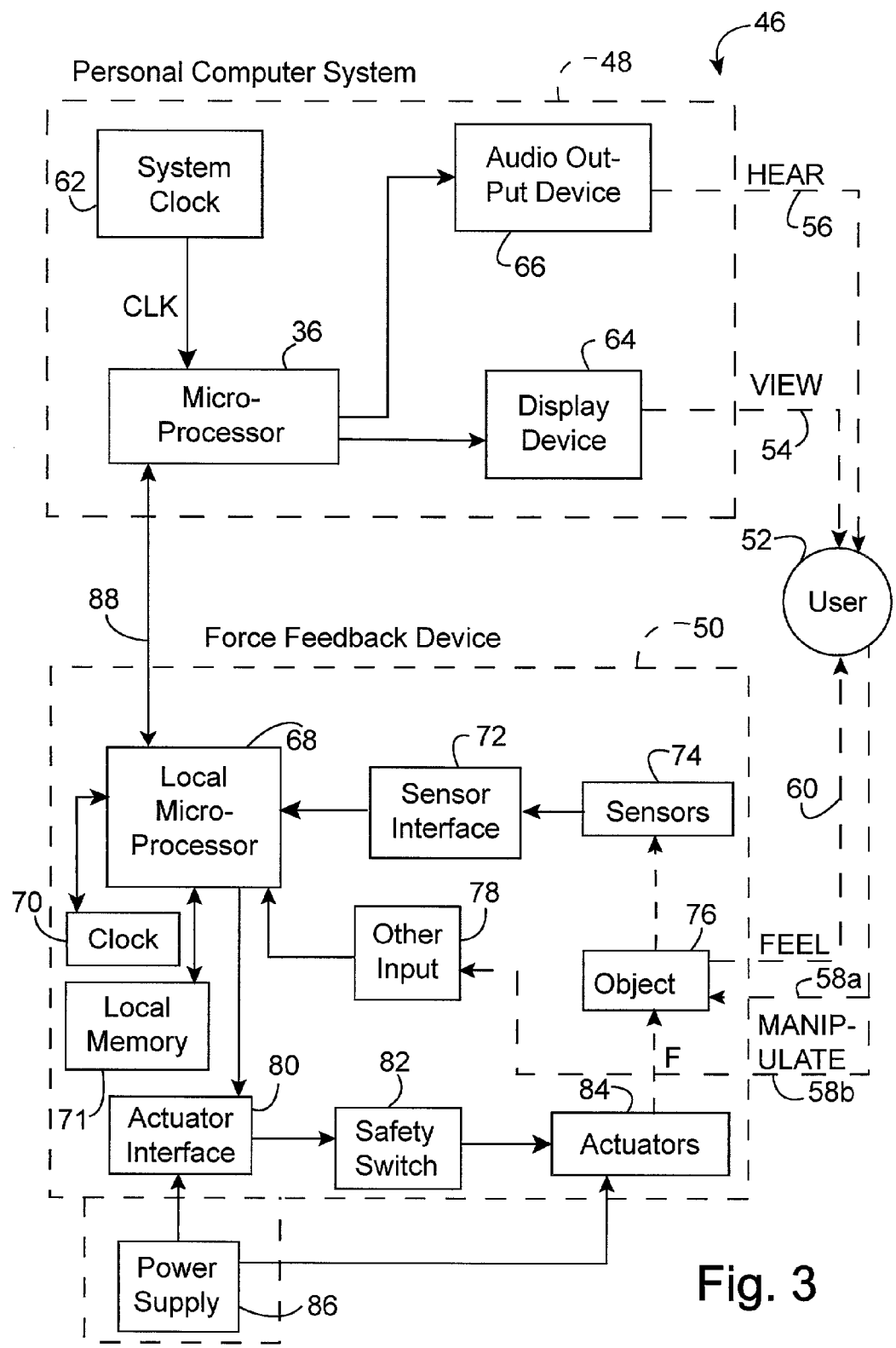
FIG. 3 is a block-diagram of a force feedback system in accordance with the present invention.

In FIG. 3, a client machine 46 in accordance with the present invention includes a personal computer system 48 and a force feedback human/computer interface or "force feedback device" 50. A user 52 can receive visual information 54 and auditory information 56 from the personal computer 48 and can manipulate the force feedback device 50 as indicated at 58a and 58b to provide input, e.g., to command a cursor location on a visual display or other provide other control information. In addition, the user 52 can receive force feedback 60 from the force feedback device 50 to represent physical "feel" or force sensations.

The personal computer system 48 includes the microprocessor 36, the system clock 62, a video monitor 64 (which is one type of "visual display"), and an audio device 66. The system clock 62, as explained previously, provides a system clock signal CLK to the microprocessor 36 and to other components of the personal computer system 48. The display device 64 and the audio output device 66 are typically coupled to the I/O bus 40 (not shown in this figure).

In this preferred embodiment, the force feedback device 50 preferably includes a local microprocessor 68, a local clock 70, optional local memory 71 for the local microprocessor 68, a sensor interface 72, sensors 74, a user manipulatable object 76, "other" input interface 78, an actuator interface 80, a safety switch 82, and actuators 84 which provide a force F to the object 76, and an optional power supply 86 to provide power for the actuator interface 80 and actuator 84.

The microprocessor 36 of the personal computer system 48 is coupled for communication with the local microprocessor 68 of the force feedback device 50. This communication coupling can be through a serial port coupling 88 to the personal computer system. A preferred communication coupling the Universal Serial Bus (USB) of a personal computer, although an RS-232 serial bus, or other communication coupling (such as Firewire), a parallel bus, an Ethernet bus, or other types of interfaces or communication links can also be used.

In use, the user 52 of the client machine 46 grasps the object 76 of the force feedback device 50 and manipulates (i.e. exerts a force to move or attempt to move) the object to cause a "pointer" icon (cursor) to move in the image displayed by the display device 64. This pointer icon typically takes the form of a small arrow, a pointing hand, or the like. The sensor 75 senses the movement of the object 76 and communicates the movement to the local microprocessor 68 through the sensor interface 72. The local microprocessor 68 then communicates through communication coupling 88 to the microprocessor 36 to cause the microprocessor 36 to create a corresponding movement of the pointer icon on the image displayed upon the visual display 64. In some embodiments, the sensors 74 can communicate directly to microprocessor 36 without the use of local microprocessor 68. The user can also create other input, such as a "button click," through the other input 78 which are communicated to the microprocessor 36 by the local microprocessor 68 or directly, e.g., using a game port.

If the pointer icon on the display device 64 is at a position (or time) that correlates to a desired force feedback to the user 52, the microprocessor 36 sends a force feedback command to the local microprocessor 68 over the serial port connection 88. The local microprocessor 68 parses this force feedback command and sends signals to the actuator interface 80 which causes the actuator 84 to create forces F on object 76, which are experienced by the user 52 as indicated at 60. The safety switch 82, sometimes referred to as a "deadman switch", blocks the signal from the actuator interface 80 if, for example, the user 52 is no longer grasping the object 76. In this way, the user 52 can interact with the client machine 46 in a visual, auditory, and tactile fashion.

The hardware architecture described above is also described in co-pending U.S. Pat. No. 5,739,811, filed Nov. 28, 1995, the disclosure of which is incorporated herein by reference. The high level command protocol between the computer and the force feedback device is also described in U.S. Pat. No. 5,734,373, filed Dec. 1, 1995, the disclosure of which is incorporated herein by reference. Force feedback as implemented in a graphical user interface is described in U.S. patent application Ser. No. 08/571,606, now U.S. Pat. No. 6,219,032, filed Dec. 13, 1995, and incorporated herein by reference.

Figure 4A:
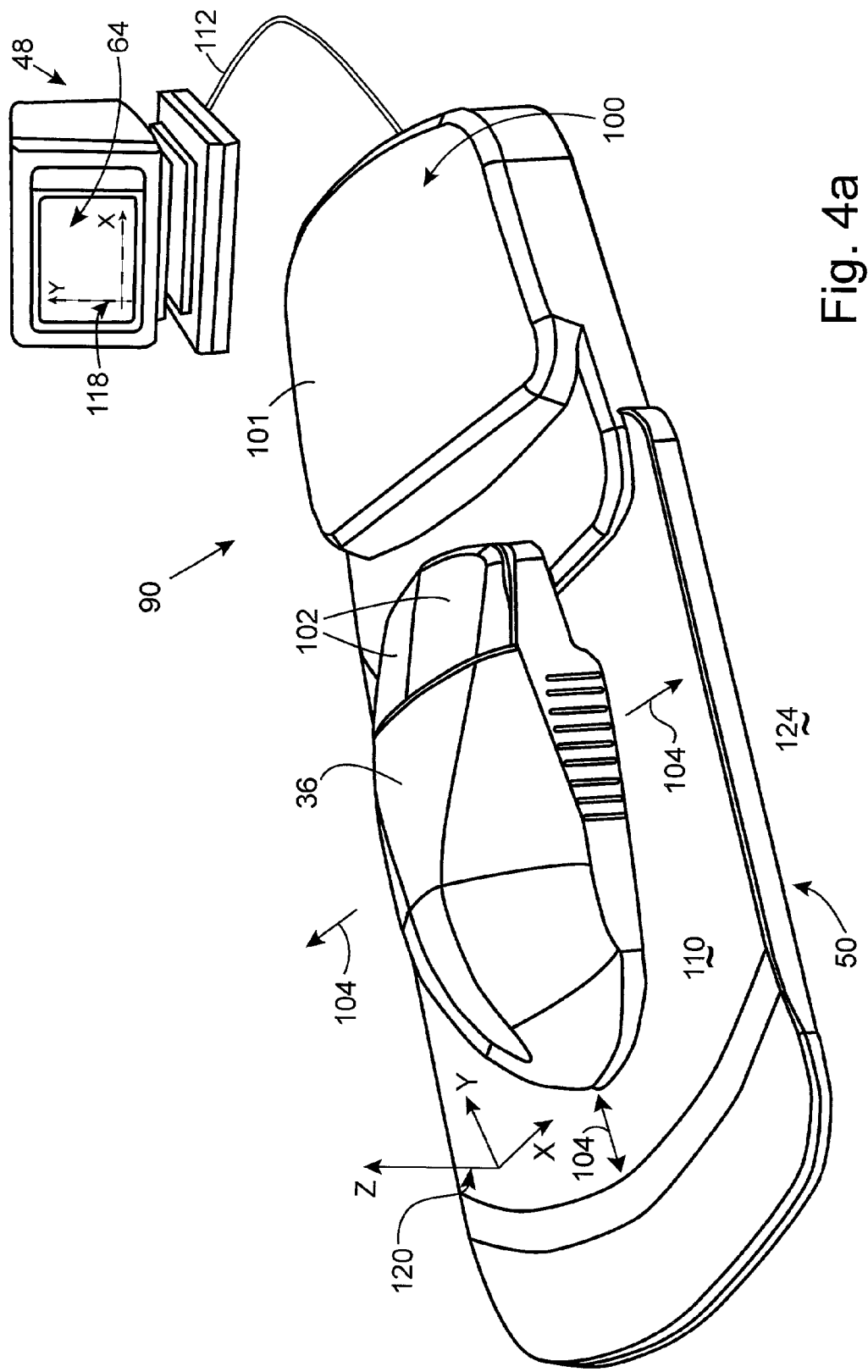
FIG. 4a is a perspective view of a preferred human/computer interface ("force feedback device") of the present invention.

FIG. 4a is a perspective view of a force feedback mouse interface system 90 of the present invention, capable of providing input from the user to a host computer based on the user's manipulation of the mouse and capable of providing force feedback to the user of the mouse system in accordance with the present invention. Mouse system 90 includes interface device 50 that includes a user manipulatable object or manipulandum 36 and an interface 100, and host (client) computer 48.

User manipulatable object (or "manipulandum") 36, in the described embodiment, is a mouse that is shaped so that a user's fingers or hand may comfortably grasp the object and move it in the provided degrees of freedom in physical space. For example, a user can move mouse 36 to correspondingly move a computer generated graphical object, such as a cursor or other image, in a graphical environment provided by computer 48. The available degrees of freedom in which mouse 36 can be moved are determined from the interface 100, described below. In addition, mouse 36 preferably includes one or more buttons 102 to allow the user to provide additional commands to the computer system.

It will be appreciated that a great number of other types of user manipulable objects can be used with the method and apparatus of the present invention in place of or in addition to mouse 36. For example, such objects may include a sphere, as trackball, a puck, a joystick, a knob, a wheel, a dial, cubical-, cylindrical-, or other-shaped hand grips, a fingertip receptacle for receiving a finger or a stylus, a flat planar surface like a plastic card having a rubberized, contoured, and/or bumpy surface, a handheld remote control used for controlling web pages or other devices, pool cue, or other physical objects.

Interface 100 is provided in housing 101 and interfaces mechanical and electrical input and output between the mouse 36 and host computer 48 implementing the application program, such as a GUI, simulation or game environment. Interface 100 provides one or more degrees of freedom to mouse 36; in the preferred embodiment, two linear, planar degrees of freedom are provided to the mouse, as shown by arrows 104. In other embodiments, greater or fewer degrees of freedom can be provided, as well as rotary degrees of freedom. For many applications, mouse 36 need only be moved in a very small workspace area.

The interface 100 provides position information to computer 48 via bus 112, such as a Universal Serial Bus (USB). In addition, computer 48 and/or interface 100 provide force feedback signals to actuators coupled to interface 100, and the actuators generate forces on members of the mechanical portion of the interface 100 to provide forces on mouse 36 in provided or desired degrees of freedom. The user experiences the forces generated on the mouse 36 as realistic simulations of force sensations such as jolts, springs, textures, enclosures, circles, ellipses, grids, vibrations, "barrier" forces, and the like. The electronic portion of interface 100 may couple the mechanical portion of the interface to the host computer 48. Interface 100 preferably includes a local microprocessor 68 as described above. Mouse 36 is preferably supported and suspended above a grounded pad 110 by the mechanical portion of interface 100.

Computer 48 is preferably a personal or other computer, workstation, or game console as described above. Computer 48 preferably implements one or more application programs ("applications") with which a user is interacting via mouse 36 and other peripherals, if appropriate, and which can include force feedback functionality. For example, one of the application programs is preferably a Web browser that implements HTML or VRML instructions. Herein, computer 48 may be referred as displaying "graphical objects" or "objects." These objects are not physical objects, but are logical software unit collections of data and/or procedures that may be displayed as images by computer 48 on display screen 64, as is well known to those skilled in the art. Display device 64 can be included in host computer 48 and can be a standard display screen (LCD, CRT, etc.), 3-D goggles, or any other visual output device.

As shown in FIG. 4a, the host computer may have its own "screen frame" 118 (or host frame) which is displayed on the display screen 64. In contrast, the mouse 36 has its own "device frame" (or local frame) 120 in which the mouse 36 is moved. In a position control paradigm, the position (or change in position) of a user-controlled graphical object, such as a cursor, in host frame 118 corresponds to a position (or change in position) of the mouse 36 in the local frame 120.

Figure 4B:
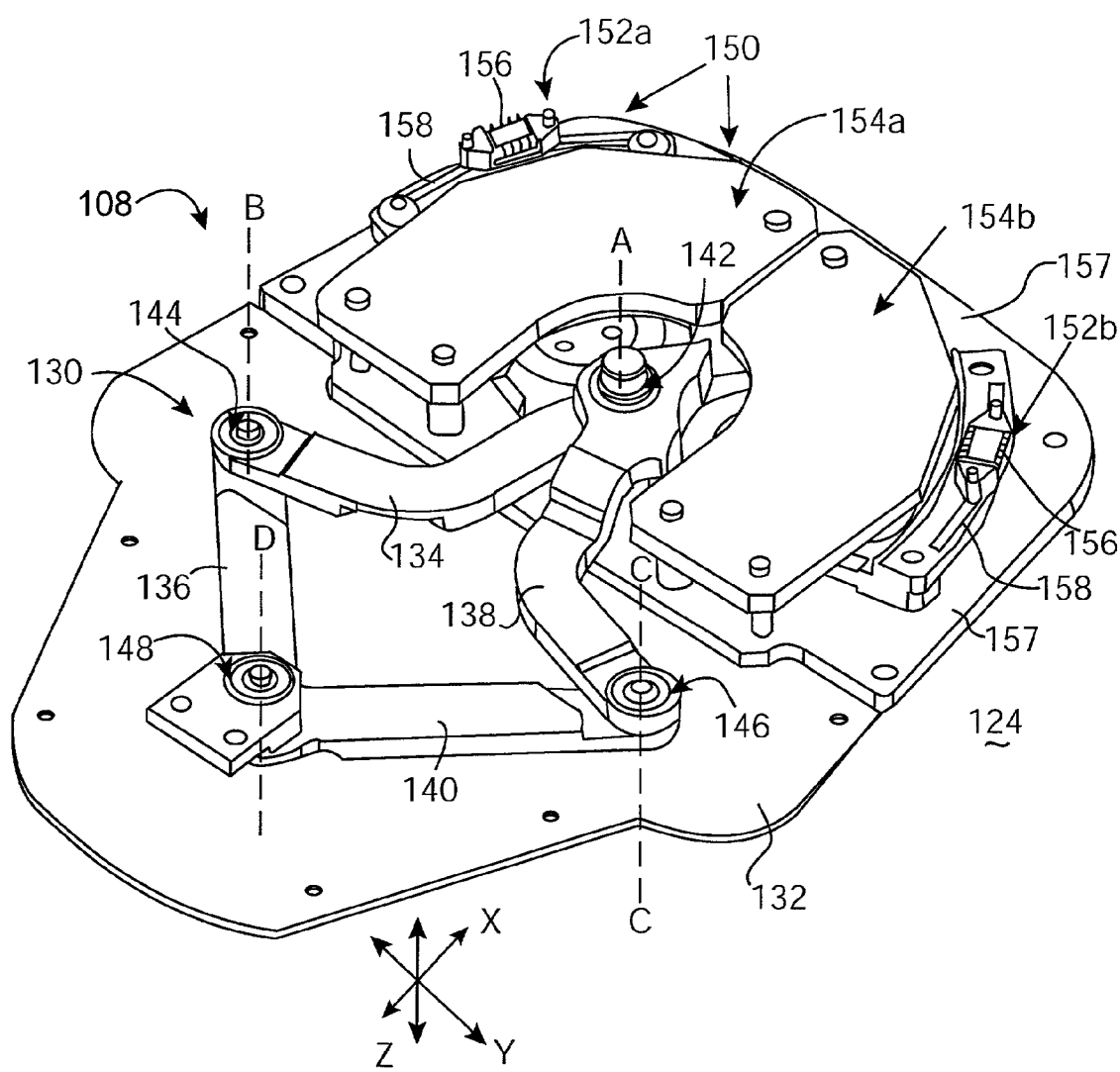

FIG. 4b is a perspective view of a preferred embodiment of the mechanical portion 108 of mouse device 50. Mechanical linkage 130 provides support for mouse 36 and couples the mouse to a grounded surface 124, such as a tabletop or other support. Linkage 130 is, in the described embodiment, a 5-member (or "5-bar") linkage. Fewer or greater numbers of members in the linkage can be provided in alternate embodiments.

Ground member 132 of the linkage 130 is a base for the support of the linkage and is coupled to or resting on a ground surface 124. The members of linkage 130 are rotatably coupled to one another through the use of rotatable pivots or bearing assemblies, all referred to as "bearings" herein. Base member 134 is rotatably coupled to ground member 132 by a grounded bearing 142 and can rotate about an axis A. Link member 136 is rotatably coupled to base member 134 by bearing 144 and can rotate about a floating axis B, and base member 138 is rotatably coupled to ground member 132 by bearing 142 and can rotate about axis A. Link member 140 is rotatably coupled to base member 138 by bearing 146 and can rotate about floating axis C, and link member 140 is also rotatably coupled to link member 136 by bearing 148 such that link member 140 and link member 136 may rotate relative to each other about floating axis D. Mouse 36 is coupled to link members 136 and 140 by rotary bearing 148 and may rotate at least partially about axis D.

Transducer system 150 is used to sense the position of mouse 36 in its workspace and to generate forces on the mouse 36. Transducer system 150 preferably includes sensors 152 and actuators 154. The sensors 152 collectively sense the movement of the mouse 36 in the provided degrees of freedom and send appropriate signals to the electronic portion of interface 100. Sensor 152a senses movement of link member 138 about axis A, and sensor 152b senses movement of base member 134 about axis A. These sensed positions about axis A allow the determination of the position of mouse 36 using known constants such as the lengths of the members of linkage 130 and using well-known coordinate transformations. Sensors 152 are, in the described embodiment, grounded optical encoders that sense the intermittent blockage of an emitted beam. A grounded emitter/detector portion 156 includes an emitter that emits a beam which is detected by a grounded detector. A moving encoder disk portion or "arc" 158 is provided at the end of members 134 and 138 which each block the beam for the respective sensor in predetermined spatial increments and allows a processor to determine the position (and velocity) of the arc 158 and thus the members 134 and 138 by counting the spatial increments.

Transducer system 150 also preferably includes actuators 154 to transmit forces to mouse 36 in space, i.e., in two (or more) degrees of freedom of the user object. The bottom housing plate 157 of actuator 154a is rigidly coupled to ground member 132 (or grounded surface 124) which includes, e.g. a magnet, and a moving portion of actuator 154a (e.g. a wire coil) is integrated into the base member 134. The actuator 154a transmits rotational forces to base member 134 about axis A. The housing 157 of the grounded portion of actuator 154b is coupled to ground member 132 or ground surface 124 through the grounded housing of actuator 154b, and a moving portion (e.g. a coil) of actuator 154b is integrated into base member 138. Actuator 154b transmits rotational forces to link member 138 about axis A. The combination of these rotational forces about axis A allows forces to be transmitted to mouse 36 in all directions in the planar workspace provided by linkage 130 through the rotational interaction of the members of linkage 130. The operation of the electromagnetic actuators 154 is described in greater detail in U.S. Pat. Nos. 6,100,874 and 6,166,723. In other embodiments, other types of actuators, such as electrical DC motors, can be used. A different embodiment of a force feedback device can include flexure members to allow movement in provided degrees of freedom.

Figure 5:
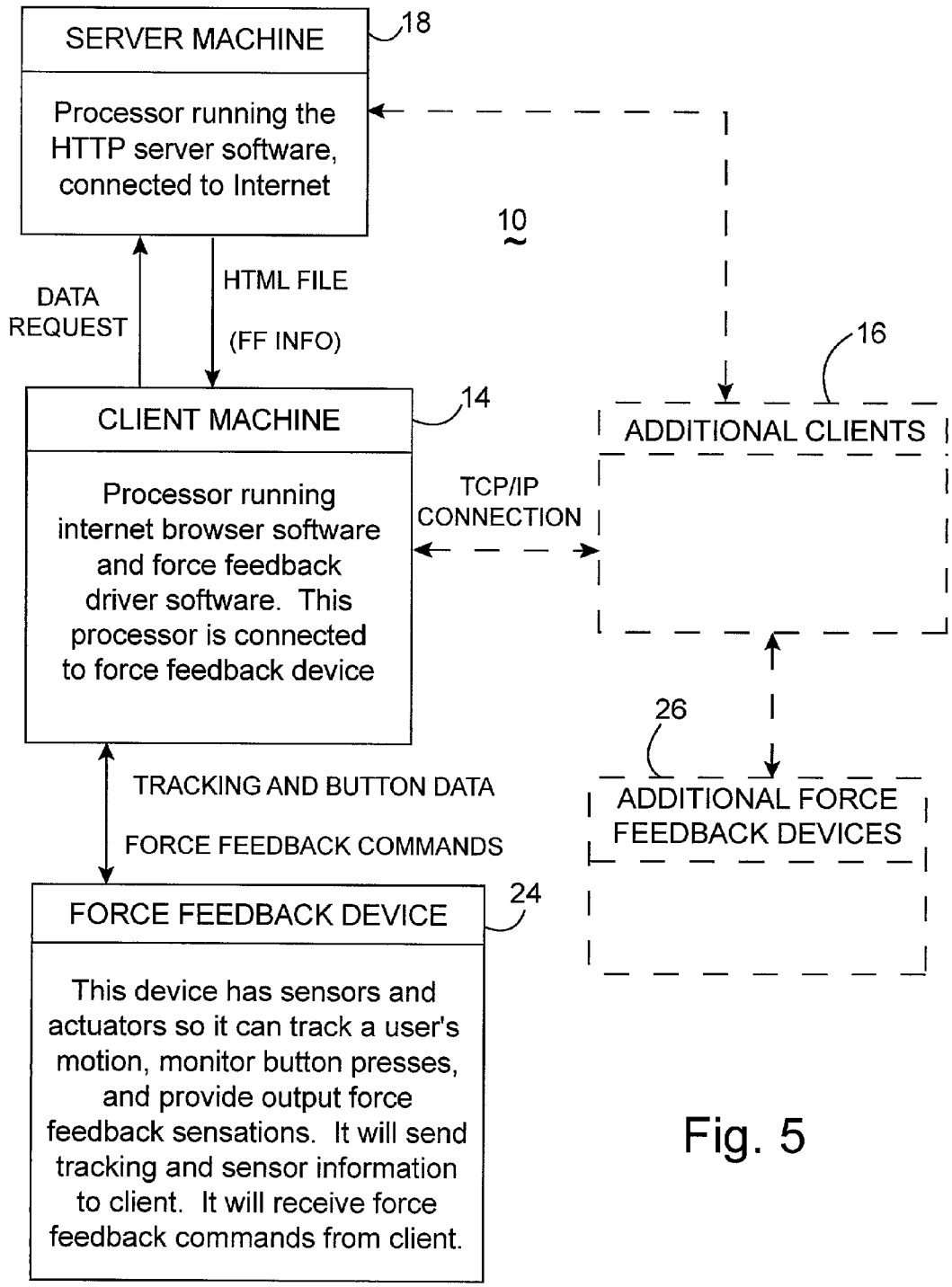
FIG. 5 is a block diagram of a wide area network (WAN) based upon Internet TCP/IP protocol and supporting World Wide Web (WWW) HTML protocols in accordance with the present invention.

In FIG. 5, a conceptual representation of the network system 10 with force feedback includes a server machine 18, a client machine 14 provided with a force feedback device 24, and one or more additional client machines 16, each of which may be provided with additional force feedback devices 26. As noted in this figure, the server machine is a computer or "processor" running, for example, the TCP/IP server software and is which is connected to the Internet. The client machine 14 includes a computer or "processor" running Internet browser software and force feedback driver software. The processor of the client machine is connected to the Internet and to the force feedback device 24. The force feedback device 24 has sensors and actuators so that it can track movement of the user manipulatable object, monitor for button presses and/or other ancillary input devices, and provide output force feedback sensations. The force feedback device 24 sends object tracking information to the client machine, and receives force feedback commands from the client machine 14. The "additional client", such as client machine 16, also includes computers or "processors" running Internet browser software and force feedback driver software. The processors of these additional clients are also connected to the Internet and are connected to force feedback devices associated with that client.

As noted in FIG. 5, a client machine 14 can send a data request to the server machine 18 and, in return, receive a web page including HTML instructions and/or other instructions for implementing a web page, e.g. Dynamic HTML instructions, JavaScript instructions, Java or ActiveX code, an embedded plug-in reference (such as the "IFF" extension described below), etc. For example, if an embedded IFF reference is used, the server must also have a modified configuration file which lets it know that .IFF is a valid MIME type. This modified file would be a SRM.CONF or other .CONF file, as will be appreciated by those skilled in the art. The client machine 14 then sends force feedback commands to the force feedback device 24 and receives tracking and button data from the force feedback device 24. Client machine 16 can likewise send a data request to the server machine 18 and receive an HTML file and/or other web page data or other document or collection of data. The client machine 16 can then interact with the force feedback device 26 by sending force feedback commands to the device 26 and by receiving tracking and button data from the force feedback device 26.

In another embodiment, a force-related application or control program running on the client machine 16 can check if any peripherals including force feedback functionality are connected to the client machine. For example, after downloading a web page having force effects, the client machine can first check whether a force feedback mouse is connected. If no mouse is connected, the client can check whether another force feedback peripheral, such as a force feedback joystick, is connected. If so, the client can enable the joystick to control the position of the cursor within the web page so that the user is able to experience the force effects associated with web page objects. Other force feedback peripherals can also be enabled for cursor control in a web page. The force-related application can perform the necessary adjustments to receive input from an absolute input device or a relative input device, as necessary, or from a "cursor control device" or a "gaming device", etc.

In addition to communicating with the server machine, the client machines can communicate directly with each other over the Internet using an Internet communication protocol. For example, client machine 14 can communicate with client machine 16 through a TCP/IP connection. This is accomplished making the URL of the client machine 16 known to the client machine 14, and vice versa. In this fashion, direct communication between client machines can be accomplished without involving the server machine 18. These connections can send force feedback information and other information to the other client machine. For example, a process on the client machine 16 can send force feedback information over a TCP/IP Internet connection to the client machine 14, which will then generate a force feedback command to the force feedback device 24. When the user reacts to the force feedback at force feedback device 24, this information can be sent from client machine 14 to client machine 16 to provide force feedback to the user on force feedback device 26.

As is well known to those skilled in the art, a client machine normally connects to another computer, such as a server or other client, over the Web by sending a connection request to the "host" of the desired URL. The host, in this example, is a server machine 18 and the desired URL is the URL of the desired web page residing on the server machine 18. Alternatively, the desired web page can reside on another server or resource and be retrieved by server machine 18. In response to the connection request of step 150, the server machine 18 sends the HTML file representing the web page over the Internet to be received by the client machine. The HTML file includes a number of "components" which are typically commands, command fragments, instructions, and data which permit the display of the web page and other functionality. HTML components are parsed and interpreted (processed) as they are received, e.g., even before the entire HTML file is received at the client machine. Alternatively, the entire HTML file can be received before the processing begins.

A HTML file typically includes a number of "components" which are parsed and interpreted as previously described. For example, an HTML file begins with a <HTML> command or "tag" to indicate the start of the HTML file, and a <BODY> tag to indicate that the body of the HTML file is beginning. Then, an arbitrary number of HTML commands are provided to, for example, display images of the web page on the video display of the client machine. The body of the HTML file is terminated by the </BODY> command, and the end of the HTML file is indicated with the </HTML> command, i.e. this command is the "eof" command of the HTML file.

Force Effects in Web Pages

There are many types of touch interaction that can be achieved in Web pages. The force sensation resulting from this interaction is known herein as a force effect or an "effect." Two main classes of tactile interaction with Web content described herein are "generic effects" and "authored effects," as described in greater detail below. These effects are applied to web page objects in the most common implementation. Herein, "web page objects" or "web objects" are any graphical objects (or regions) appearing on a web page, such as images, text, buttons, or other standardized or custom objects. In some cases, a web page object may not actually appear on the web page when displayed, but may have an effect on how the web page is visually displayed or how force effects are output on the force feedback interface device.

Generic effects and authored effects are preferably composed from a basic set of stock force effects. The stock effects include vector forces, vibrations, springs, textures, and others, as described in U.S. Pat. Nos. 5,825,308; 6,219,032; 5,959,613; 6,147,674; and 6,078,308, all incorporated by reference herein. Effects of differing complexity can be provided as stock effects; for example, a primitive effect such as a simple vector force to be output in a specified direction at a specified magnitude can be provided, or a more complex effect that includes multiple primitive effects can be provided. One particularly significant, more complex effect is the enclosure. An enclosure is a set of forces that occur only when the cursor is in or near a geometrically bounded ("enclosed") area of the screen. Enclosures can be associated with forces at their borders to attract the cursor to the inside of the bounded area, keep the cursor outside the bounded area, or attract the cursor to the border surrounding the bounded area. The enclosure may take a variety of shapes, for example rectangular or elliptical, and may also be associated with one or more other force effects when the cursor or pointer is positioned inside the enclosure. Examples of force effects that can be provided and programmed are specified in the FEELit Application Programming Interface (API) from Immersion Corporation of San Jose, Calif., detailed in patent application Ser. No. 08/970,953, now U.S. Pat. No. 6,300,936, filed Nov. 14, 1997, and incorporated by reference herein.

For example, a hyperlink ("link") is an input-sensitive area displayed on a web page which, when selected by the user, causes a "link action" in the web browser. Such link actions can include retrieving a different web page over the Web whose address is specified by the link and/or displaying that web page, causing a different section of the web page currently in memory to be displayed, retrieving data for an animation or other modification of the current web page, sending data to a server over the web, or other action either locally and/or involving data transfer over the WWW. Typically, one or more web objects on a web page are defined as hyperlinks, such as text, an image, an animated image, an icon, or other object; such an object is referred to as a "link object" herein. The user typically selects a link by moving the mouse pointer over the link object and providing a command gesture such as clicking a mouse button. Alternatively, links might automatically be selected when the mouse pointer is moved over the link object, i.e., the interaction of pointer and link object is the command gesture in such a case.

An enclosure can be defined as the visual boundaries of a hyperlink object (enclosures can also be defined as a portion of an object or as a portion of the background to the web page). The forces of the enclosure can be used to "snap" the pointer to that link object, i.e., assist the pointer to move onto or "acquire" that link object. To the user, this might feel as if the link has a magnetic attraction. A text hyperlink, for example, is no longer purely discerned by the user by the text's appearance (usually color and/or underlining), but is also discerned by its feel. Generally, hyperlinks are some of the more interesting features of a Web page and are intended to stand out from the other web page content to inform the user that other content can be accessed from the displayed web page, e.g. hyperlinks are the areas on the web page where the location of the mouse pointer can cause a link event, while other areas on the web page may have no effect based on input from a mouse. The snap enclosure effect physically grabs the user's attention at a link using forces until the user pushes the user manipulatable object (such as a mouse) hard away from the link object. Instead of interacting with unresponsive text, the enclosures constrain the user to the most important content on the web page that is responsive to input from the mouse (e.g. a command gesture such as a button click).

In addition, some objects on the web page may be defined as a hyperlink, but there is no visual evidence to the user that these objects are links and can cause a link action such as calling up a different web page. For instance, many graphical images are also hyperlinks, but this fact is not discernible visually; previously, the user had to move the pointer over the image, which would cause the appearance of the mouse pointer to change if the image were a link object (or cause a change in other displayed information). By providing enclosure effects on hyperlinks, tactile cues are offered instead of or in addition to visual cues; these tactile cues are consistent with the user interface so the user easily understands their meaning. The user can more quickly determine which objects on a web page are links by using the tactile sense compared with the visual sense. Adding feel to web pages increases both the user's efficiency and the quality of their experience. Some studies have shown an 88% improvement in mouse targeting performance with over 1000 test subjects.

Other objects on a web page besides hyperlinks may also be associated with forces such as the enclosure to assist acquiring the object. For example, standard GUI graphical objects such as text boxes, input buttons, radio buttons, checkboxes, icons, are readily adaptable to enclosures. In addition, the user can be constrained by enclosures to the input fields or the areas associated with frames. For example, an input field where the user must enter data such as a name, a credit card number, or click a drop down menu are prime areas which can be associated with enclosure "snap to" forces. Similarly, frames having particular objects of interest can be associated with enclosure effects. "Frames" are those areas of a web page which can be accessed, manipulated, scrolled, etc. independently of other displayed areas (other frames) of the web page. For example, a frame on the left side of a web page often is used to display the main subject areas of the web page while the larger, main frame on the right displays the content of a selected one of those subject areas.

Finally, an extra dimension of user experience can be added by invoking a "pop" or jolt force effect when the user clicks on a buttons, checkboxes, or other graphical object. A pop is a time based sensation as opposed to, e.g., an enclosure implemented as a snap sensation, which is a spatially based sensation.

Figure 6:
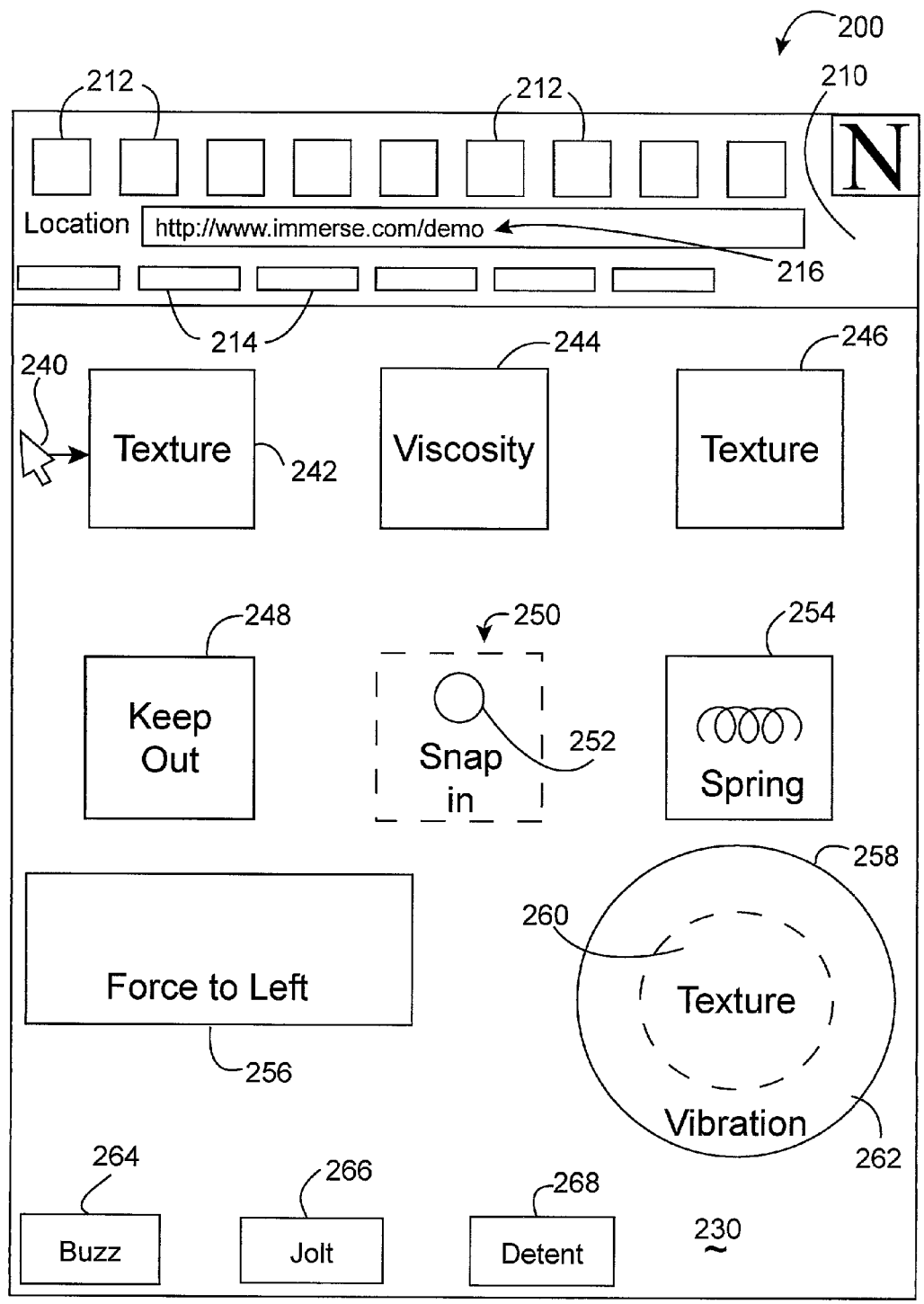
FIG. 6 is an illustration of a web browser and an image displayed on a visual display of a client computer as generated from a downloaded HTML web page file.

FIG. 6 illustrates a web browser 200 such as Netscape Navigator in which displayed web page objects are associated with forces. For example, these force effects can be authored force effects using any of the authored effect embodiments described below. Control area 210 of the browser includes well known controls such as navigation buttons 212 and 214 and URL address field 216. The display area 230 has been provided with a number of web page objects to illustrate some of the concepts of the present invention. The force feedback device controls the position of a pointer icon (cursor) 240 which can be caused to interact with the various web page objects.

As an example, when the force feedback device is manipulated by the user to cause the pointer icon 240 to move within a "texture" region 242, force feedback commands can be created for the force feedback device to provide a desired "texture" to the force feedback device. For example, the texture can feel "rough" to the user by causing the force feedback device to place forces on the user manipulatable object that emulate a rough or bumpy surface. In a region 244, a viscosity or "liquid" force feedback can be provided. With this form of force feedback, as the pointer icon is moved through field 244, a viscous "drag" force is emulated on the user manipulatable object as if the user object were moved through a thick liquid. In a region 246, inertial forces can be felt. Therefore, a pointer icon being moved through an "inertia" region would require relatively little or no force to move in a straight line, but would require greater forces to accelerate in a new direction or to be stopped. The inertial force sensations can be applied to the user manipulatable object and felt by the user.

In a "keep out" region 248, the pointer image is prevented from entering the region. This is accomplished by creating a repulsive force on the user manipulatable object using a force feedback command to the force feedback device which prevents or inhibits the user from moving the user manipulatable object in a direction of the region 248 when the pointer icon 240 contacts the periphery of the region 248. In contrast, a "snap-in" region 250 will pull a pointer icon 240 to a center 252 whenever the pointer icon engages the periphery of the snap-in region 250 and apply a corresponding attractive force on the user manipulatable object. A "spring" region 254 emulates a spring function such that a pointer icon moving into the spring region "compresses" a spring, which exerts a spring force on the user manipulatable object which opposes the movement of the pointer icon. A region 256 is a "Force To Left" region where the pointer icon within the region 256 is forced to the left side of the region and the user manipulatable object is forced in a corresponding direction as if influenced by some invisible magnetic force or gravitational force. A region 258 illustrates that regions can be of any size or shape and that within a region different force effects can be developed. In this example, within region 258 there is a texture core 260 surrounded by a vibration ring 262. Therefore, as the pointer icon 240 moves into the region 258, the user first experiences vibration from the ring 262, and then experiences a texture as the pointer icon moves within the core 260.

The exemplary force feedback web page of FIG. 6 is also provided with several force feedback buttons. In a first button 264, the placement of the pointer icon 240 over the button and the pressing of a mouse button (i.e., a switch) on the mouse 36 to create a "button click", "button down", or simply a "button event" input, will then cause a "buzz" command to be sent to the force feedback device. The buzz command would, for example, cause a vibration force on the user manipulatable object. Similarly, the selection of the "jolt" button 266 will cause a jolting force (e.g., a short-duration pulse of force) to be provided at the force feedback device, and the pressing of the "detent" button 268 will cause a "detent" to be created for the force feedback device. By "detent" it is meant that the user manipulatable object will be controlled by the force feedback actuators such that it feels as if a mechanical-type detent exists at the position that the user manipulatable object was in when the detent button 268 was activated.

Generic Effects

Generic effects are force effects that are applied uniformly to all objects in a received document having a particular type. For example, in a received web page, web page objects of standard types include hyperlinks, images, text, text entry fields, tables, headings, image maps, marquees, buttons, check boxes, radio buttons, drop-down menus, or other standard web page objects. Different generic effects can also be applied to different characteristics of an object; for example, one effect is associated with bold text, while a different effect is associated with text having the color blue. Generic effects are achieved by defining a mapping between object types and feel sensations, where feel sensations are uniformly associated with particular types of web page objects and/or particular types of interactions (or "events") with objects. "Interactions" or "events" may include clicking a mouse button when the pointer is positioned over the object, moving the pointer onto a link from above the link (e.g. as differing from moving the pointer onto the link from below the link), or any other cursor/object interaction defined by the developer or user.

In a preferences file or other storage of the client machine, particular force effects are each mapped to a particular type of object provided in a web page (and/or GUI). Using generic effects, the same force effect is applied to all graphical objects of a particular type. For example, all hyperlinks on a page can be assigned with an enclosure having the same force characteristics (e.g., forces of the same magnitude), although the area enclosed by each enclosure on the page will vary with the size of the web page object with which it is associated.

A major advantage of using generic effects is that the force effects are implemented exclusively oil the client side of the network. Thus, the author/content developer of a web page does not need to specify any forces or force characteristics of the objects in the web page code itself. When the web page is received by the client computer, the force-enabling code implemented by the client associates the forces from the preferences file (or default forces) to each graphical object and outputs the forces as appropriate. This allows standard web pages that have no force effects in their code to be implemented as a force feedback web page on the client end, which allows a force feedback interface device to be used immediately without requiring special web pages tailored for force output. In other embodiments, a web page can include force feedback information for authored effects (described below), and generic effects can also be applied to web page objects not having any authored effects associated with them, or to override particular authored effects as desired by the user of the client.

For example, the force magnitudes or directions associated with an enclosure are defined on the client computer. This enclosure is assigned to objects of a particular type, e.g. link objects. A different enclosure with different associated forces can be assigned to another type of object, such as a (non-link) image or an animation. The preferred embodiment allows the user to adjust the effects to suit their preferences. For example, one way to allow a user to assign forces is analogous to the approach applied to the color of a hyperlink object, where the web browser automatically assigns the hyperlink a color based on the user's preference but web authors can override those default colors as desired, e.g. to make the hyperlinks' color match the web page's color scheme. The user preferably is able to adjust the characteristics of generic effects using a central control panel, e.g., a control dialog box associated with their force feedback GUI preferences, or a dialog box associated with the web browser preferences.

In a different embodiment, different sets of generic effects can be provided which are associated with different web pages or different groups of web pages. For example, the user can specify a first set of generic effects in which snap enclosures are to be associated with link objects on the downloaded web page. This first set is to be associated with web pages of a particular type or origin, e.g. all web pages received from a particular URL or domain name will have objects assigned to the first set of effects on the client computer. Likewise, a second set of generic effects can be characterized by the user, e.g. assigns vibration forces to link objects. The second set of generic effects is assigned to web pages received from a different source or having a different characteristic. Alternatively, different generic effect sets can be provided by different web site providers, developers, companies. Thus, for example, Immersion Corporation can provide a generic effect set that the user can download and which will automatically be assigned to web pages that are downloaded from specified servers or locations oil the WWW. (The specified locations can be designated in the generic effect set file, or otherwise). The web browser (or a plug-in or script) can check for these specified locations when a web page is downloaded.

Authored Effects

In contrast, authored effects are effects particular to a certain web page that are specified or modified by a content developer or other author and which can provide a more rich, custom experience than generic effects can offer. For example, one or more particular graphical objects on a web page can be assigned a different, customized force effect by an author (the "author" can be the creator/developer of the web page or the user on the client machine that receives the web page). Web page objects having the same type can be assigned different force effects. Authored effects can be used, for example, to intentionally correlate a particular, unique force with an object of a web page. Typically, at least part of the instructions governing the type and/or characteristics of an authored effect are included in the code of the web page that is downloaded by the client. Thus, standard non-force web pages do not include authored force effects (unless there is preprocessing done to the web page before it is displayed by the client, as described in greater detail below).

Any standard force effect can be an authored effect, e.g. those feel sensations supported by the FEELit API from Immersion Corp. Alternatively, authored effects call be partially or completely customized to be specific to a desired interaction or display. One example of an authored effect is gravity toward a particular object. A gravity force is an attractive force that biases or actively attracts the mouse in a direction that causes the mouse pointer to move toward a defined point of the desired object. For example, an author can use gravity to attract the mouse pointer towards advertisement image objects oil a web page. Many web sites are sponsored or supported by advertisers; such sites usually include web pages that display graphical hyperlinks to a sponsor's web site. Although the advertisement visuals (animations, etc.) can attract the attention of a site's visitor, an authored effect can physically attract the mouse toward the advertisement, forcing the user to acknowledge the advertisement's existence. However, not all the graphical images on the same web page may be desired to have a gravity effect, so that generic effects may not be suitable in this situation. In other examples, authored effects can enable users to feel the texture of clothing at a commercial Web site by providing a texture effect associated with a graphical clothing image, or to feel the forces of a falling ball at a physics education web site by providing a ball image that causes the desired forces when the pointer is moved in contact with the ball image. Authored effects allow an author to provide a "theme" of feel sensations in accordance with a theme or subject of a particular web page; for example, a vibration force effect can be associated with the links of a web site that gives information about earthquakes.

Authored effects can be "dynamic," i.e., the behavior of the effect can change depending on the author's intent and a current state or other state of the Web page. In the gravitational advertisement example, the gravity can be turned off once the mouse cursor has reached the advertisement. Thus, the user's experience of the site will not be compromised after the cursor has been guided to the advertisement. The dynamic nature of these effects can be achieved either through scripting (e.g. using such languages as VBScript or JavaScript) or programming (e.g., using such programming constructs as Java applets and ActiveX controls). The ability to incorporate compelling authored effects in Web sites is limited only by the developer's creativity.

Although authored effects can allow much more compelling forces to be provided in web pages because they can be carefully correlated with images, animations, and sounds. They have the disadvantages of typically requiring specific force effect instructions in the web page that are downloaded by the client and sometimes require specific force-enabled resources on the client end.

A different embodiment uses a form of authored effects to specify generic effects. For example, if an author does not want to include authored effects in a web page but wishes to specify one or more generic force effects for object types on the web page, the author can include generic effect designations. For instance, a number of standardized generic effects sets (as described above) can be provided on client machines, and each web page downloaded can specify in an HTML tag (or otherwise) which generic effect set (or a particular generic effect within a set) to use for the downloaded page. Thus, the author has, in effect, authored the force effects by referring in the web page to generic effects resident on the client. Or, the tag in the web page code can refer to an official or customized generic effect set that the user is presumed to have previously installed on the client machine (and, if that customized effect set is not installed on the client, a default generic effect set can be used). The author can simply specify that there is a force enclosure on an object, but allow client defaults or preferences to assign forces and/or force characteristics to the enclosure (e.g. to the walls and/or interior of the enclosure).

A user can experience both authored effects and generic effects in a particular downloaded web page. For example, the user can set generic effects to types of objects displayed in the web page, as defined by the user's preferences stored on the client. There can also be authored effects in the web page that are specified in information downloaded with the web page. Any authored effect that conflicts with a generic effect can be set, by default, to override the conflicting generic effect. This allows special authored effects to still be felt by the user, yet also allows any other web page objects not assigned any authored effects to have the user's preferred generic effects assigned to them. As is analogous to the color of hyperlinks, the user on a client machine can also preferably specify whether to override any authored forces of a downloaded web page with preferred generic effects; or the user can specify to use the authored effects or the generic effects specified by the web page author (which may fit the theme of the web page better than the user's choice of generic effects, for example).

In yet another embodiment of the present invention, either authored effects or generic effects can be implemented by continuous reception of force feedback data over a network, e.g. similar to "streaming" video and audio. For example, parameters to specify and characterize forces can be included in streaming video and audio data to provide tactile sensations to the user of the client machine receiving the streaming data. Tags or references to force effects already resident on the receiving client machine can be included in the streaming data. Alternatively, all or most of the data defining the force effects and the data required to implement the force effects can be included in the streaming data.

Embodiments for Implementing Force Feedback Over Networks

The following subsections detail several embodiments of software that allow a user to feel web pages. These embodiments retrieve web page data, track user interaction with the web page, and output the appropriate force effects to the tactile display.

Proprietary Browser

An efficient embodiment to enable feel in web pages is to implement the force effect functionality directly in the web browser, such as Netscape Communicator by Netscape Communications or Internet Explorer by Microsoft Corp. A web browser parses Hypertext Markup Language (HTML) files retrieved over the Internet and visually displays the content of the web page. In the present embodiment, a browser may also track a user-controlled cursor's interactions with the displayed content and apply force effects accordingly. Since the web browser has intimate knowledge of the web content, it can perform these tracking operations more easily than many other methods can do so. This embodiment is most feasible for entities that have already written a Web browser (such as Microsoft and Netscape). In addition, publicly available source code of a web browser (e.g., Netscape Communicator) can be modified by a different party to incorporate force feedback functionality directly into the browser and re-released to the public.

This embodiment can apply generic effects to web page objects, which is typically used for standard web pages. However, HTML tags (commands) can also be created which can define authored effects in a downloaded web page and which the web browser can interpret and implement, similar to the function of the plug-in software described below in the plug-in embodiment. The use of authored effects can alternatively be achieved in this embodiment by providing Java applets or ActiveX controls in the web page, as described in greater detail below.

Dynamic HTML

Dynamic HTML is a set of features currently in browsers such as Microsoft Internet Explorer 4.0 that enable authors to dynamically change the rendering and content of an HTML document. Using Dynamic HTML, a content developer or programmer can access the attributes of the graphical objects of an HTML document (such as the object's position on the web page and the object's HTML tag or type). In addition, event messages are generated when a user selects or interacts with the Web objects (such as when a user clicks a button while the mouse pointer is over the object). The power of Dynamic HTML can be elicited, for example, through the use of VBScript or JavaScript scripts embedded in a web page or programmatically, e.g. in a web browser, through Visual Basic or C++, as is well known to those skilled in the art.

Figure 7:
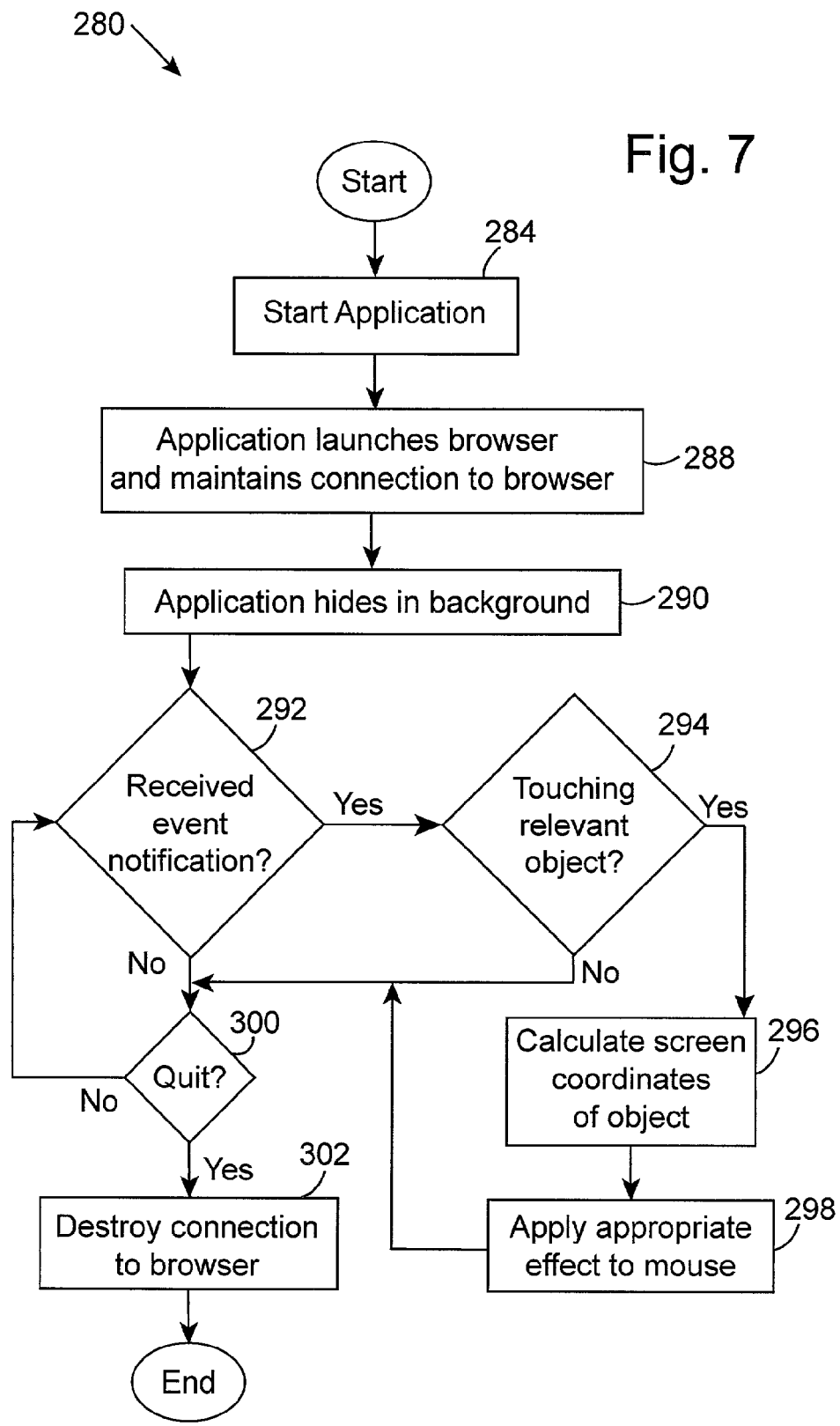
FIG. 7 is a flow-diagram illustrating a first embodiment of an embodiment using Dynamic HTML to provide force effects in web pages.

Dynamic HTML can be used to enable the feeling of generic effects in web pages. FIG. 7 presents a flow diagram of the present invention in accordance with a first Dynamic HTML embodiment in which a separate application program runs in parallel with a web browser on a client machine. A user starts a separate application program on a client machine in step 284. In a step 286, the application launches a web browser on the client machine, and creates/maintains a connection to the web browser. In step 290, this application then "hides" in the background of the operating system. After a web page in HTML has been received and displayed by the web browser, the application checks for an event notification in step 292. The application receives an event notification from the browser whenever a user moves the mouse (and/or when another predefined event occurs). When the application receives this notification, it can ascertain in step 294 whether the mouse pointer is touching any relevant object (e.g., a web page object having forces associated with it) on the web page through the use of Dynamic HTML functions. If no event notification is received in step 292, the process continues to check for a notification until the user quits the web browser or the separate application in step 300, at which point the connection to the web browser is destroyed in step 302.

One example of determining if a relevant object is being touched is provided in the pseudocode below. Dynamic HTML is hierarchical in nature, where characteristics of an object may be provided in parent objects to the object. Since Dynamic HTML is hierarchical, the element passed immediately to a requesting application or function may not be of interest, but something in that element's hierarchy may be of interest. For example, only bold text can be associated with a force effect. The application thus must check whether the current object that is "touched" by the pointer is bold text. The below function checks this hierarchy. Given a Dynamic HTML object, called "elem", this function will determine whether the object is something to which a force-effect is to be applied (i.e., it is "relevant"). If a text object is passed to this function, this function will search the hierarchy of the text object looking for a "B" tagname that indicates the text is bold. It will return null if the object is not relevant, otherwise it will return the relevant tagname.

```
// This is pseudo-code for the TouchingRelevantObject function.
TAG TouchingRelevantObject( HTMLElement elem )
{
    // Is this element valid?
    // This will happen if we've reached the end of the recursion.
    if ( elem IS null )
        return false;
    if ( elem.tagName IS_IN A_SET_OF_TOUCHABLE_TAGS )
        return elem.tagName;
    else
        return TouchingRelevantObject ( elem.parentElement );
}
```

If the mouse pointer happens to be touching a relevant object, i.e. an object associated with one or more force effects (such as a hyperlink), the application calculates the screen coordinates of the object in step 296 using the dynamic HTML functions. The application then generates the appropriate force effect in step 298, such as an enclosure, on the user manipulatable object of the interface device. The force effect can be generated by using high level commands sent to the microprocessor of the interface device 50, or can be generated by direct low level commands from the host application.

Figure 8:
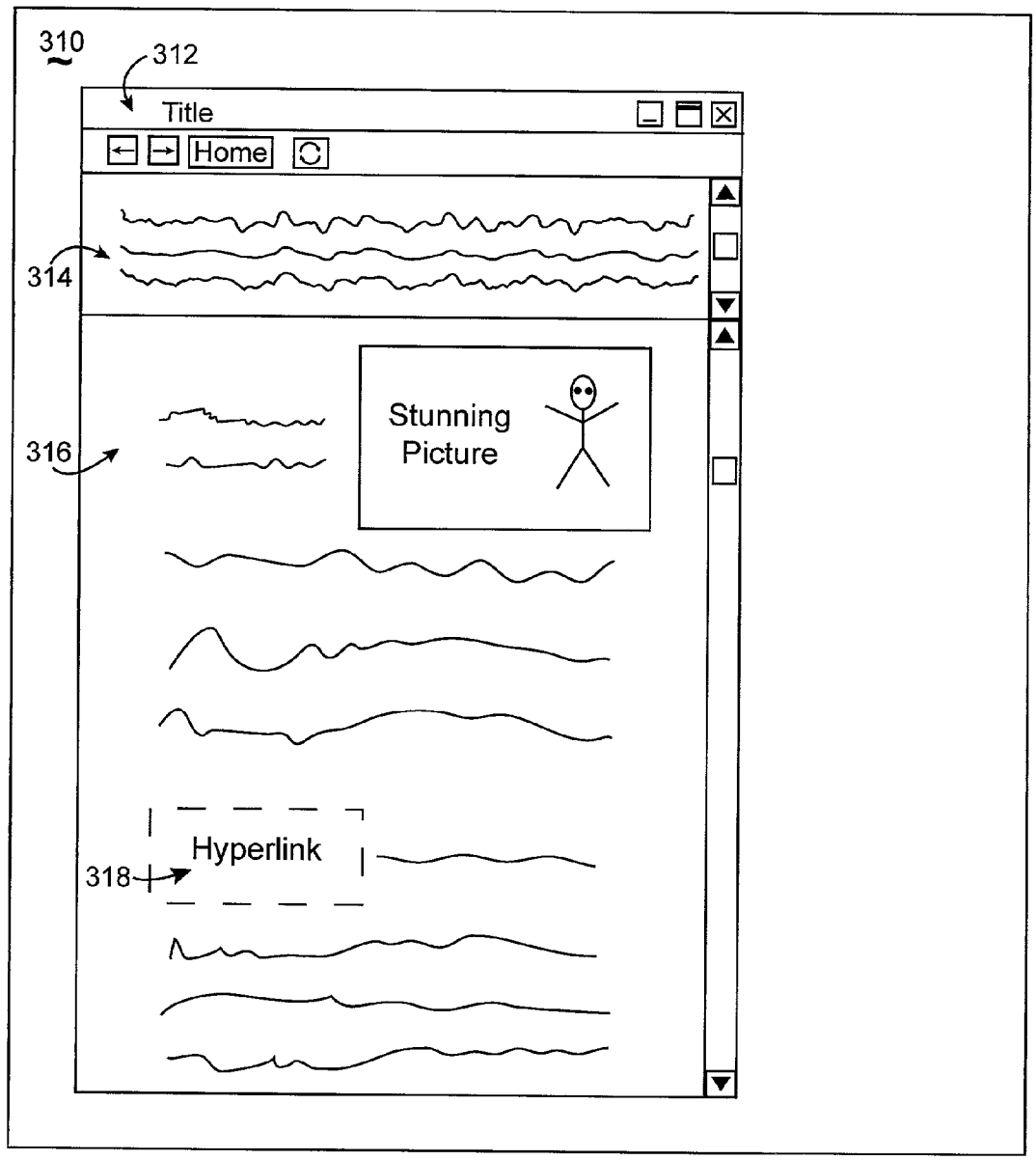
FIG. 8 is a diagrammatic illustration of the coordinate frames provided in Dynamic HTML.

One difficulty of this approach lies in the determination of screen coordinates of the relevant object. The difference between the coordinate frame of the mouse and the coordinate frame of the Dynamic HTML object requires that one of the coordinate frames be transformed to be operable with the other. The mouse pointer position and effects such as enclosures are described in screen coordinates. Dynamic HTML objects such as hyperlinks are described in coordinates relative to other Web page objects; to derive the absolute screen coordinates of a Dynamic HTML object, several coordinate frame transformations may have to be applied based on the returned Dynamic HTML object. An example of the hierarchy of objects and the transformations required to achieve screen frame coordinates are illustrated in FIG. 8, which shows coordinate frames in Dynamic HTML. The frames may include a screen frame (absolute frame) 310, a window frame 312, a web browser client area frame 314 (which is also HTML frame #1), an HTML frame #2 316, and a hyperlink frame 318. A particular frame is specified by its leftmost and topmost coordinates, relative to the coordinate frame containing the particular frame. The hierarchy leading from the hyperlink frame to the screen frame is the reverse order of the frames as listed above, starting with the hyperlink frame and traversing to the screen frame.

As currently implemented, it is not possible to compute the absolute screen coordinates of a Dynamic HTML object by traversing its transformation hierarchy because the farthest traversal is to the client window frame; there are no mechanisms available for transforming this client window frame to the screen frame. Also, traversing this hierarchy can be computationally expensive, relative to the degree of responsiveness that is required in a force-feedback system. If a user moves over a hyperlink object, the enclosure should snap immediately; any delays severely degrade the user experience.

The preferred way to resolve this problem is simple, elegant, and fast. Dynamic HTML returns an "event object" when the application is notified of a mouse interaction; this event object allows the program to query the mouse position in both relative and screen coordinates. These values can be used to ascertain a Dynamic HTML object's transformation between relative and screen coordinates. For example, the relevant "event" object fields that return the desired values are shown below:

offsetX—event X coordinate relative to the srcElement's container's frame offsetY—event Y coordinate relative to the srcElement's container's frame screenX—event X coordinate relative to physical screen size screenY—event Y coordinate relative to physical screen size srcElement—the object that cause the event The relevant DHTML object fields are provided below:

offsetLeft—X coordinate of object's left edge, relative to its container's frame offsetTop—Y coordinate of object's top edge, relative to its container's frame These values indicate the coordinates of the web page object (also known as an "element" of the web page) with reference to the object's "container", which is the frame that encloses the object (such as the web browser). Once these values are obtained, the absolute screen coordinates of the object can be determined as follows:

objectScreenX=event.screen.X−(event.offsetX−event.scrElement.offsetLeft)

objectScreenY=event.screen.Y−(event offsetY−event.scrElement.offsetTop)

Figure 9:
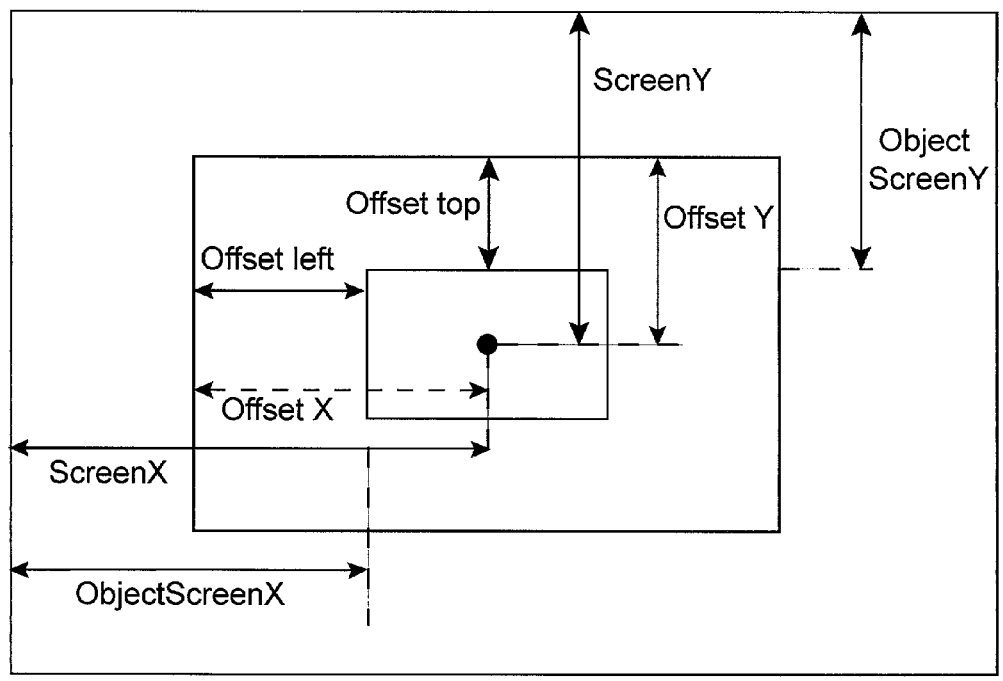
FIG. 9 is a diagrammatic illustration of coordinates used in a transformation to obtain screen coordinates of an object.

These values are illustrated in FIG. 9.

Since generic force effects are often used with normal HTML code having no force effects included therein, the Dynamic HTML is preferably only implemented by the browser or other program providing the generic effects. For example, after the HTML document is received, it is processed into Dynamic HTML by the browser or separate application on the client so that web object properties can be obtained and generic forces applied. Alternatively, the web page can be provided as Dynamic HTML instructions and downloaded in that form.

Figure 10:
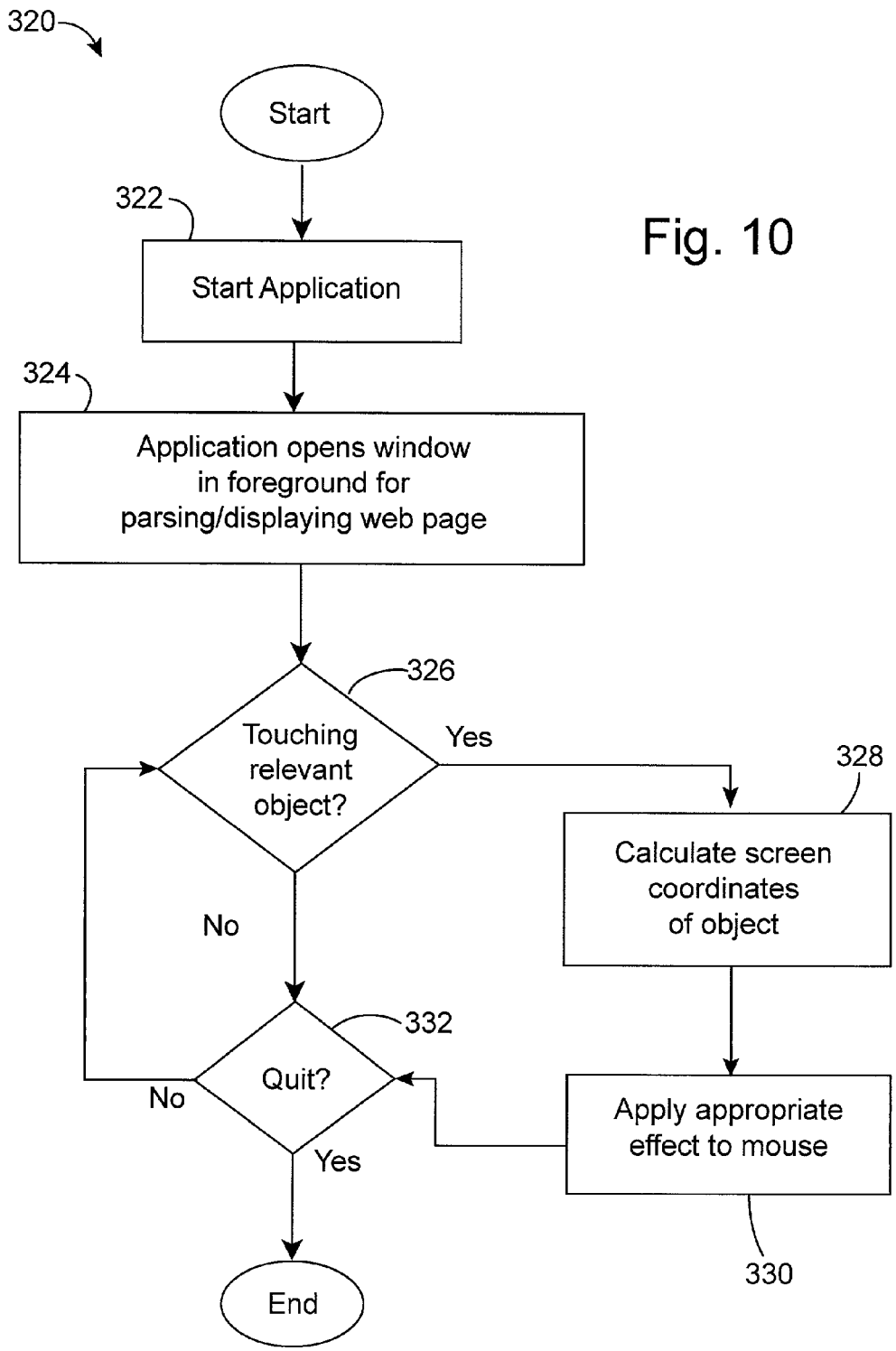
FIG. 10 is a flow-diagram of illustrating a second embodiment of an embodiment using Dynamic HTML to provide force effects in web pages.

A second implementation of integrating generic force effects with Dynamic HTML can be used in which the web browser itself has the ability to check user interactions and apply force effects. As shown in a method 320 of FIG. 10, the user again starts an application program on the client machine in step 322. In step 324, this application opens a browser window in the foreground that hosts navigation buttons and a browser "engine", e.g., an MSHTML object. MSHTML is the rendering engine used by Microsoft's Internet Explorer and is also available for all application developers to use. The MSHTML object performs the parsing and rendering of HTML content. To allow users to feel the displayed objects of a web page, the application program then applies the methodology described above in FIG. 7 with the MSHTML object to directly determine (by calculating screen coordinates) when the mouse pointer is positioned in relation to a relevant web object (in step 326) such that screen coordinates are calculated in step 328 and forces are to be output to cause the force feedback interface device to output the appropriate forces in step 330. The process quits via step 332 when the pointer no longer touches a relevant object.

Figure 11A:
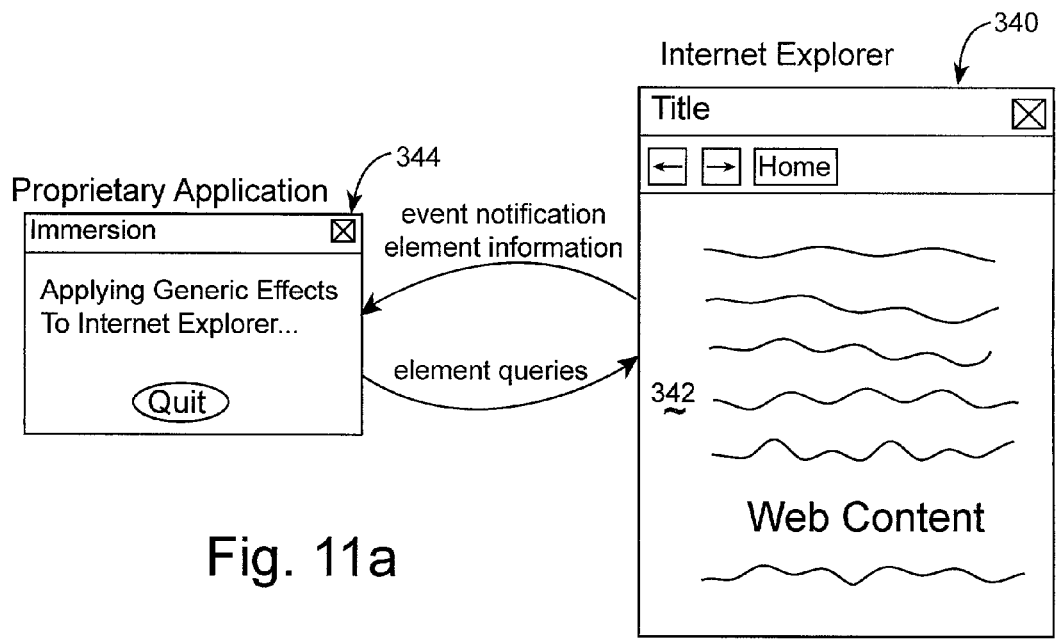
FIGS. 11a and 11b are diagrammatic illustrations of the two embodiments shown in FIGS. 7 and 10.

The two implementations described above are summarized diagrammatically in FIGS. 11*a* and 11*b*. In a first implementation of FIG. 11*a*, a proprietary application includes a connection to Internet Explorer, Netscape Navigator, or other available, standard web browser application. The browser 340 displays web page content 342. The proprietary application 344 also runs simultaneously (e.g. multitasks) which is used to control forces for the web page content. The browser 340 provides event notifications to the application 344 indicating, for example, when the mouse pointer touches a relevant object. Upon event notification, the application 344 verifies if the element is touchable; if so, the application queries the browser 340 for element information such as the element frame in screen coordinates. The proprietary application 344 determines and outputs commands for generic force effects to the API (such as Feelit API) for the mouse or other manipulandum, which are output as force sensations correlated with the web page content displayed by the web browser 340.

Figure 11B:
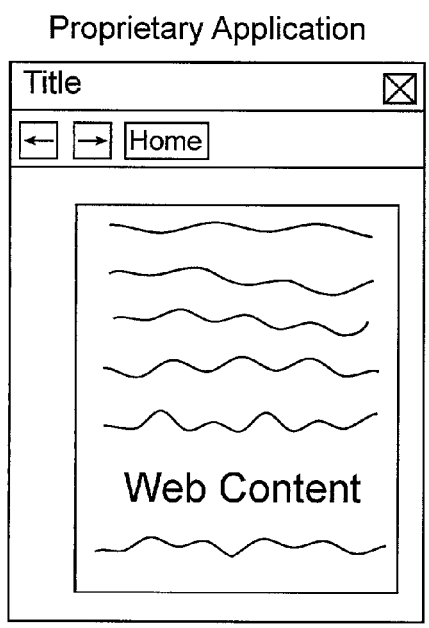
Figure 12:
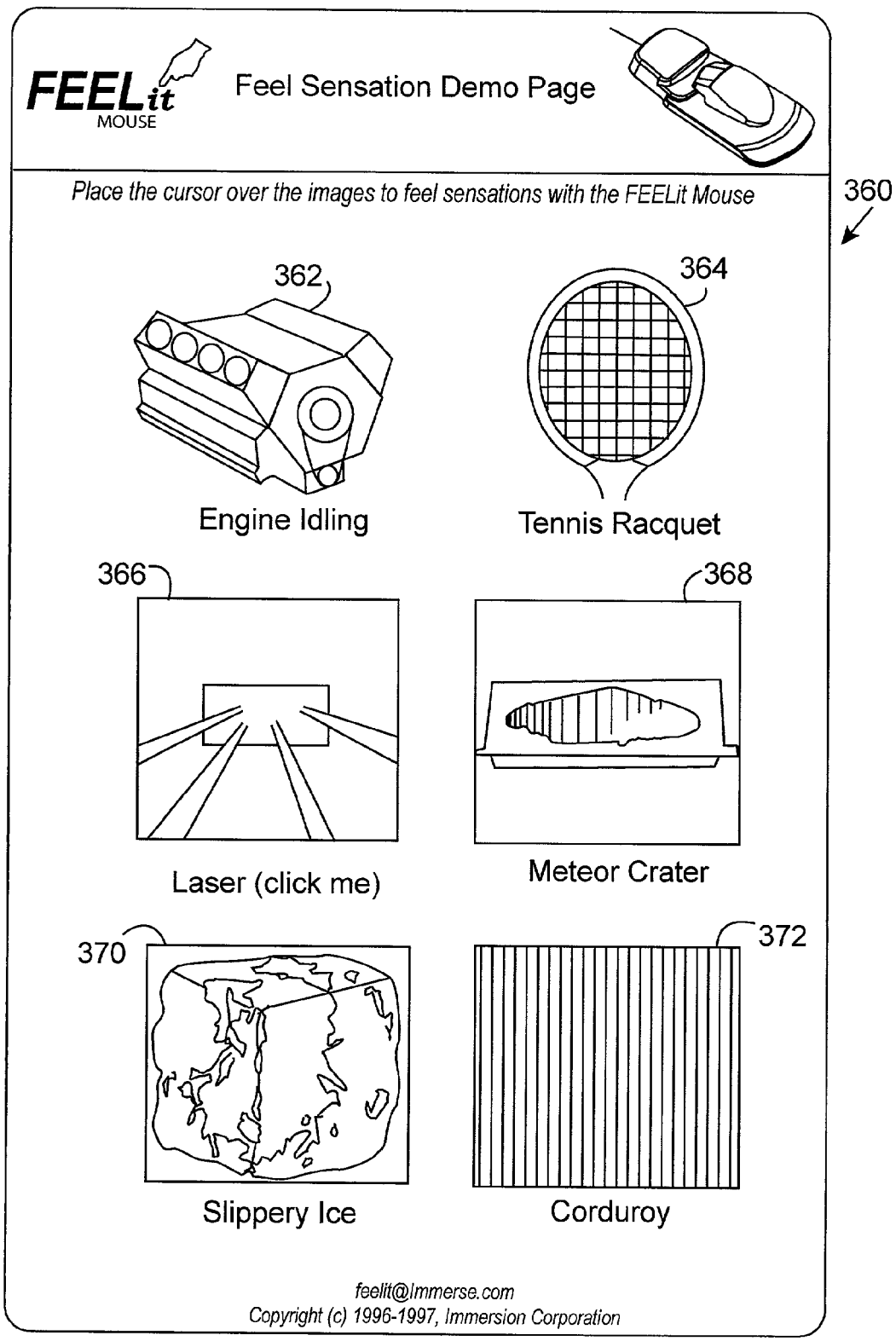
FIGS. 12, 13a, 13b, 14, and 15 are illustrations of displayed web pages in which web page objects are associated with authored force effects using an ActiveX control.

In a second implementation of FIG. 11*b*, a proprietary application 348 hosts MSHTML as described above, and does not connect to a standard, available web browser. This implementation uses the same notification/query mechanism used in the first implementation.

The advantage of the first implementation is that a standard, well known web browser is used as the interface to the web page, which is familiar to users. Also, users can easily take advantage of web browser upgrades and improvements as provided by the browser company. Unfortunately, the connection between web browser and the feel-enabling application program can be tenuous. The connection can be prone to many bugs and may be slow, and may not have the responsiveness required by a force-feedback application. On the other hand, in the second implementation, there is an extremely tight coupling between the browser engine (e.g. MSHTML object) and the feel-enabling application because they are in the same process space. Thus, event notification in this implementation is robust and fast. The drawback is that users must use an interface that is not as full-featured as a proprietary web browser nor as familiar. They are identical in terms of the display of web content, but a proprietary web browser typically has many more features and functionality for manipulating, editing, navigating among web pages, such as "Favorites" and "History" options to provide easier browsing.

The Dynamic HTML embodiment, when used without other tools, can only apply generic effects. In order to incorporate authored effects, it must be used in combination with either Java applets or ActiveX controls, both described below.

One example of providing generic effects to a web page using dynamic, HTML is provided as source code in APPENDIX A. This source code provides, for example, snap enclosures on links.

Active Accessibility

Active Accessibility is a suite of programming libraries and computer programs created by Microsoft Corporation to make the Windows operating system more accessible to the disabled. One feature of Active Accessibility is that it can invoke third-party functions, known as hooks, when a user interacts in predefined ways with the graphical user interface (GUI). For example, an application developer can create a function that is called when the user moves the mouse or opens any window.

Using Active Accessibility to enable generic force effects for Web page objects involves the creation of a program that provides Active Accessibility hooks, including conditions which are to be checked and which functions to call when a condition is met. For example, the program runs on the client machine external to a web browser and is hooked into mouse moves. When the mouse move hook is invoked, the program instructs Active Accessibility to call one or more functions which request information from Active Accessibility to determine characteristics of the web page object that the mouse pointer is positioned over (if any), such as position coordinates, the type of object at those coordinates, the name of the object, other characteristics or properties, if the object is a link, etc. If the object is associated with one or more force effects, the appropriate calculations and force effects are applied. The limitation of this embodiment is that the web browser must support Active Accessibility. Currently only one Web browser does so: Microsoft internet Explorer.

This embodiment can be combined with a GUI force feedback control application (such as the FEELit Desktop from Immersion Corporation) and used to enable generic effects in all browsers that support Active Accessibility. As with the proprietary browser and Dynamic HTML embodiments, this embodiment can be combined with the Java applet or ActiveX embodiments to enable authored effects.

Java Applet

Java is a popular programming language for web page development. An applet is a program written in Java that can execute in a web page while the web browser is the active application of the operating system on the client, as is well known to those skilled in the art. A web page developer can create applets that make use of force feedback functionality, e.g. using the FEELit API from Immersion Corporation. These applets can be similar to any program that can normally be created with such force feedback functionality, but can execute "inside" a web page. An applet typically has a defined area on the web page in which it executes to display visual information or perform other tasks. For example, a developer working on a physics education web page can create an applet that allows a user to feel the force field between two virtual magnets displayed on a web page; the user can interactively move the magnets using the mouse 36 and feel how the force field changes. The feet interactions may be limited to the active area in which the applet executes. However, the fact that Java applets are actually dynamic programs, rather than static content, allows an endless range of possibilities for touch interaction with web pages.

There is one barrier to implementing this embodiment, but it is easily overcome. The Java language was created to be platform independent and provide strong security. A force feedback instruction set such as the FEELit API from Immersion Corp. may violate security restrictions inherent in Java. However, Java has mechanisms for incorporating native (platform-specific) methods into Java applets. These mechanisms can be used to create a Java-compatible version of the FEELit API, allowing Java programmers to easily add force effects to their applets.

page, and let the user manipulate it in real-time, e.g. by selecting a point on the graph and moving it, displaying a portion of the graph in greater detail, etc. Another feature of ActiveX controls is that they can be scripted. This means that a content developer can embed an ActiveX control in a Web page and control it with a scripting language. For example, a JavaScript text box can be scripted to change the title of the graphing control's title bar. Another way to perform this feat is to create a Java applet; however, the advantage of ActiveX controls is that they can be coded in any language. This advantage is also potentially a drawback because a particular ActiveX control will only work on one platform, whereas a particular Java applet will work on any platform.

There are two fundamental ways in which to use ActiveX controls to add feel to web pages. The first way is to create an ActiveX control that contains dynamic visual and force content. Thus, each ActiveX control embedded in a web page would have its own predefined force effects, and only be able to perform those effects. This approach is similar to that of the Java applet, except that the implementation language is different. In particular, as currently implemented, the force content of an ActiveX control is limited to the active area of the ActiveX control, just like a Java applet. This approach is faster than the second "force-only" approach since no scripting in HTML is required.

A second, more versatile, and preferred approach is to create a "force-only" ActiveX control that is solely responsible for generating different force effects (alternatively, a small number of ActiveX controls can be provided to control forces). This ActiveX control is embedded in (referenced by) the web page file and can be commanded with scripting instructions to create, modify, and trigger force effects. This scripting functionality allows content developers to easily tap the capabilities of the ActiveX control without needing to do any custom programming. For example, the force-only ActiveX control can be called by JavaScript or HTML instructions in the web page with a command to perform a particular force effect. The ActiveX control would then control the force feedback device to output the commanded force effect(s). For example, one way to call the ActiveX control "FeelControl" with a script in the HTML code of the web page is as follows:

```
// This HTML code line demonstrates how to make an image vibrate when clicking on it.
// This force-only ActiveX control has an ID of FeelControl and can implement the
// force effect:
//       Vibration( long period, long duration )
//           period -- in milliseconds
//           duration -- in milliseconds
//
<IMG src = "myPicture.gif" onmousedown="FeelControl.Vibration ( 100, 1000 ) ">
```

This embodiment can support authored effects and may be used in conjunction with the embodiments described above that support generic effects, if desired.

ActiveX Control

The final embodiment of incorporating feel into web pages described herein is the use of ActiveX controls implemented within the ActiveX language by Microsoft Corporation. ActiveX controls are programmable objects that can be "embedded" into (i.e. referenced and used by) web pages, as is well known to those skilled in the art. These objects can be written in any language. The primary purpose of ActiveX controls is to add functionality to a web page that would normally be difficult, or even impossible, using HTML and scripting languages. For example, a "graphing" ActiveX control can take spreadsheet data, display a graph of it on a web A central authority, company, organization, etc. can develop and refine the force-only ActiveX control and allow web page authors to incorporate the force-only control into their web pages. For example, a web page author can embed a reference to the central web site to download the force-only ActiveX control. The ActiveX control can be downloaded to the client with the web page if the control is not already resident on the client i.e., once the control has been downloaded to a client, it does not need to be downloaded again until the control has been updated to a new version or otherwise changed by the central authority. This is because the control is resident on client storage Such as a memory cache or hard disk after it has been downloaded the first time and can be accessed locally by other web pages that embed it instead of downloading it. With such a control, a web page author can access the full functionality of a force feedback command set such as the FEELit API from Immersion Corporation using only the ActiveX control and a scripting language. Coupling this with Dynamic HTML yields a powerful tool for authoring feel into web pages.

To illustrate the usefulness of the second approach, several example web pages are illustrated in FIGS. 12-15. The web page shown in FIG. 12 includes several images that represent tactile experiences, where the user is able to feel a force associated with the image by moving the pointer over the image and/or maintaining the pointer on the image. For example, a user can move and maintain the mouse pointer over image 362 to feel the force of an engine starting up and revving. Image 364 provides a texture feel as if fingers were moved over tennis racket strings. Image 366 provides a sequential jolt and vibration similar to the sound effect of a laser. Image 368 provides an elliptical contour force obstruction to allow the user to feel the edge of the depicted crater. Image 370 provides a "slippery ice" sensation, where the mouse is assisted with forces to make it difficult to maintain the pointer on the image. Finally, image 372 provides a texture similar to feeling a corduroy cloth when the mouse pointer is moved over it. The ActiveX control commands a texture force to be output on the mouse so that the user can feel it. An example of source code to implement these forces with a force-only ActiveX control is provided in APPENDIX B. This example uses hard-coded force effects; in other embodiments, force effects stored in separate files can be used with the ActiveX control.

Figure 13A:
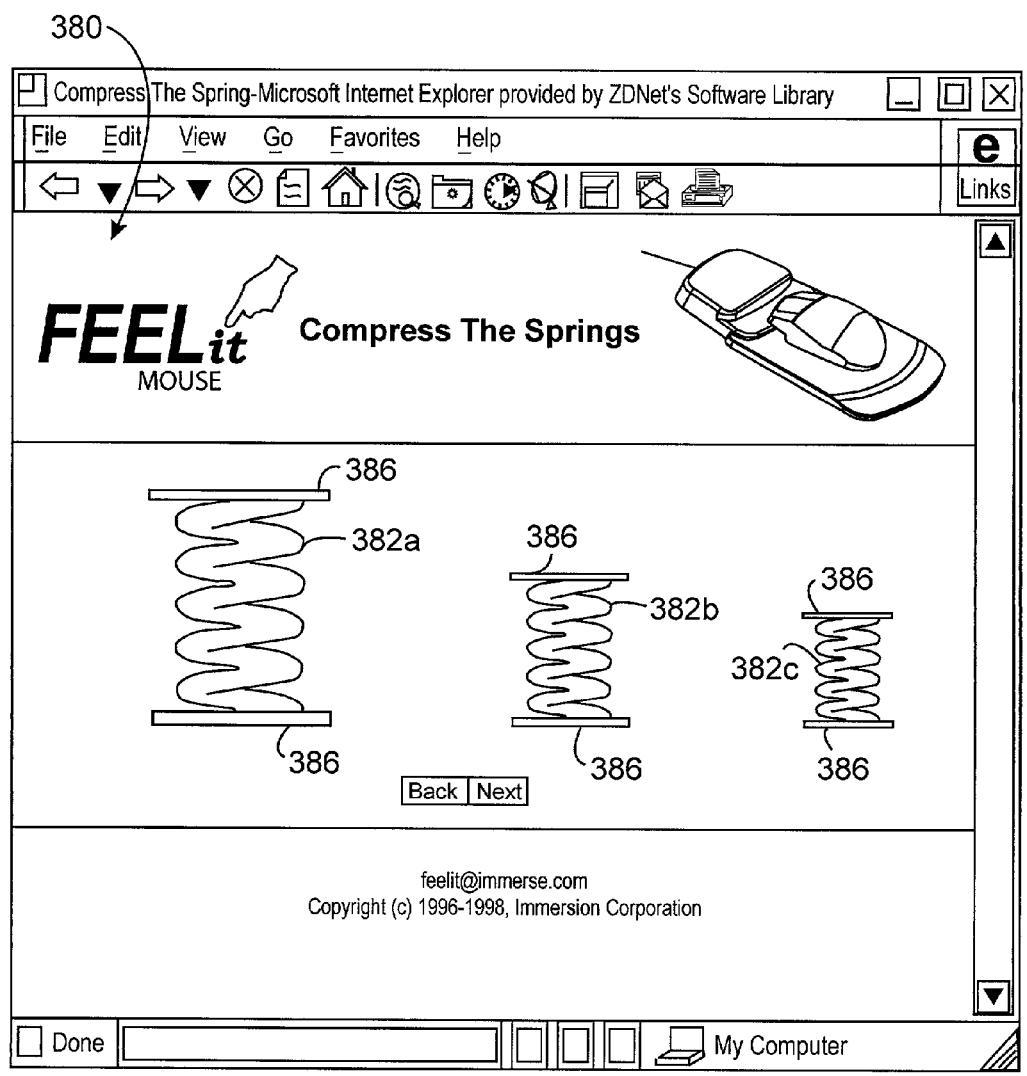
Figure 13B:
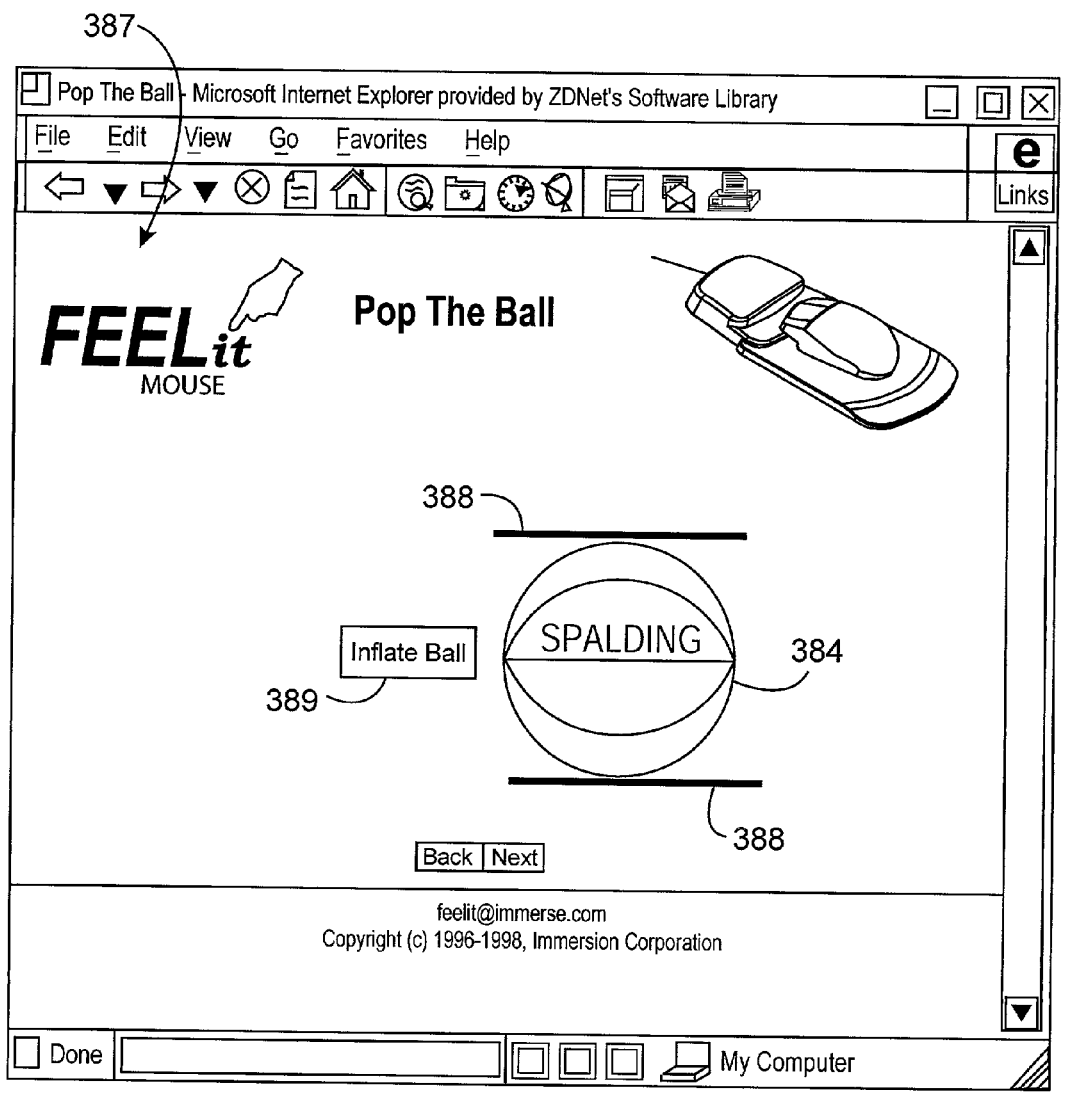

The web page 380 shown in FIG. 13a and web page 387 in FIG. 13b are interactive, dynamic multimedia demonstrations with feel. In web page 380, a user may compress any of springs 382a, 382b, and 382c using the mouse pointer by pushing the mouse pointer down on the end lines 386 of the springs. A spring force is output on the mouse to resist the compression motion. In web page 387, the user may similarly push the mouse pointer against end lines 388 to compress the ball 384. If the user compresses the ball 384 too much, it "pops" both visually and haptically, i.e. a picture of a punctured, flattened ball is displayed and the user feels a jolt of the ball popping. The user can then return the ball to its original state by pressing button 389.

Figure 14:
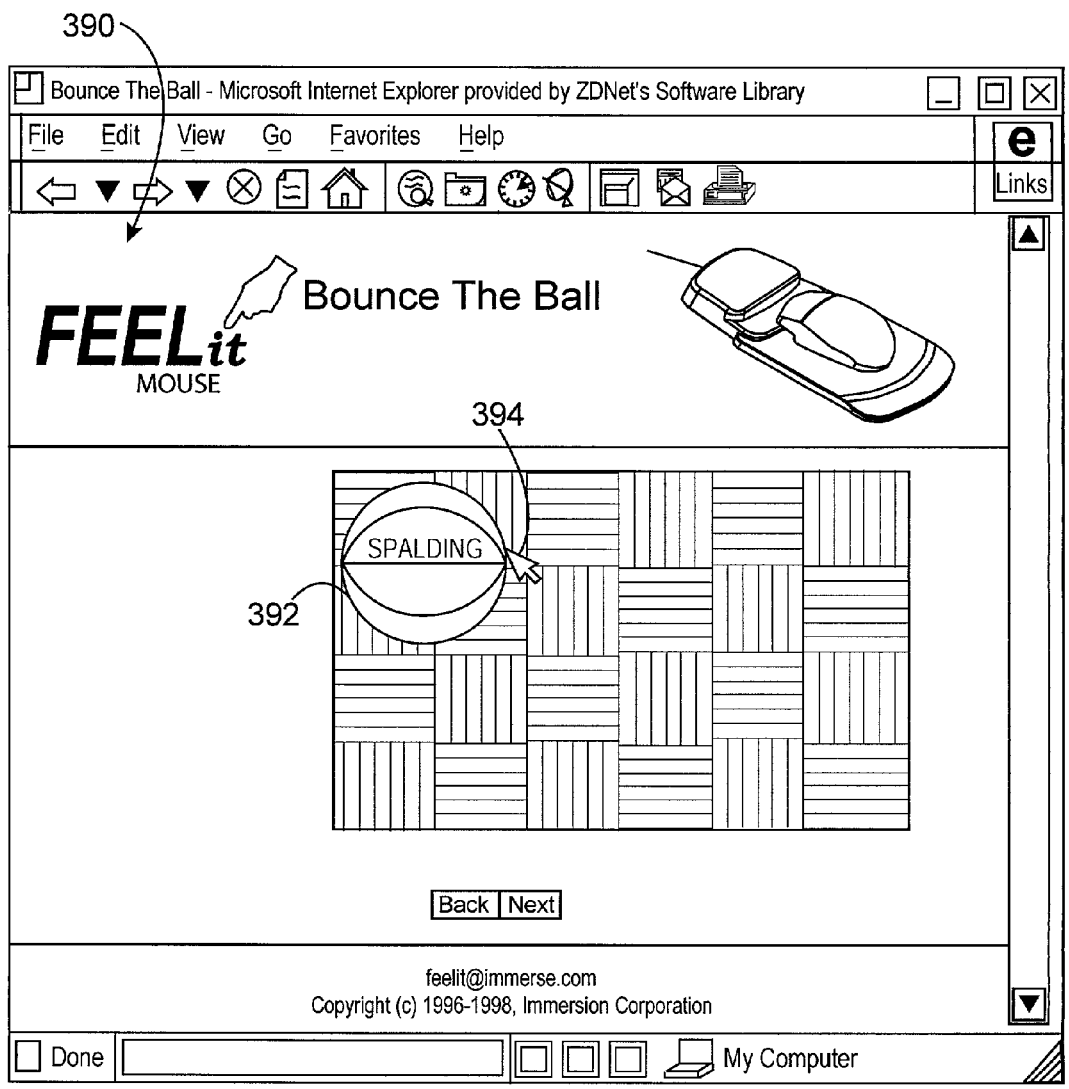

The web page 390 shown in FIG. 14 allows a user to move a basketball 392 around a field or "court" by "pushing" the ball with the pointer 394. The mouse pointer is prevented from moving inside the ball 392 and a barrier force is output on the physical mouse when the pointer moves against any side of the ball, so that the user can feel the outline of the ball. In addition, the mouse movement against the ball causes the ball to move in the same direction as the pointer, as if pushed by the pointer. The mouse will feel the force of motion of the ball if the pointer is moved in front of the moving ball.

Figure 15:
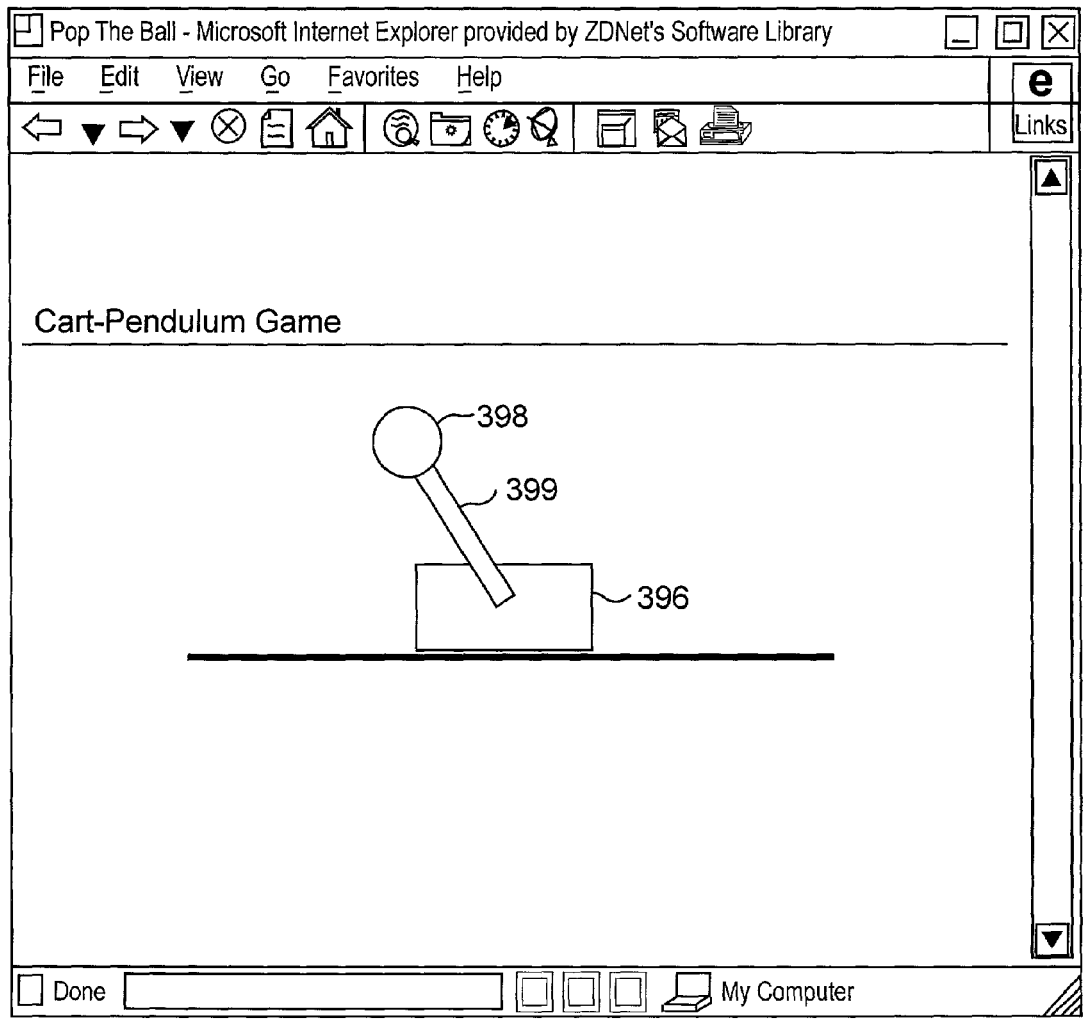

Finally, the web page if FIG. 15 illustrates a dynamic force simulation including a moveable block or "cart" 396 with an upside-down pendulum 398 extending from it on a pivotable rod 399. The pendulum is biased by gravity to pivot around its connection point to the cart. By moving the cart under the moving pendulum by pushing the call left and right with the mouse, a user can try to keep the pendulum from falling underneath the cart. As the pendulum and cart moves, appropriate forces are output on the mouse 36 depending on the motion/position of the pendulum and cart and accounting for a simulated weight of pendulum and cart. This can serve as either a game, a physics lesson, or both. These demonstrations only begin to hint at what is possible using web scripting languages and ActiveX controls. An example of source code used to implement the dynamic force examples of FIGS. 13a, 13b, 14, and 15 is provided in APPENDIX C.

Both Java applets and ActiveX controls of this embodiment only support authored effects. However, it is possible to emulate generic effects using the second approach. Mechanisms for doing this are described in the next section.

Implementing Generic Effects Using ActiveX Controls

The embodiments described above that support generic effects are the Proprietary Browser, Active Accessibility, and Dynamic HTML embodiments. If none of these embodiments are available, another option may be used. Using mechanisms available in a force-only ActiveX control (described above), generic effects can be added to existing web pages as authored effects, with no need for the author of the web page to add the force effects manually.

The first method of achieving this is to pre-process an incoming HTML file. Whenever the web browser receives an HTML file, a separate program can process it before it is parsed and displayed. This processing step would modify the HTML file, embedding the force-only ActiveX control, adding JavaScript code to facilitate force-effect scripting, and utilizing Dynamic HTML to assign effects to web page objects such as hyperlink objects. The types of effects added to the web page can be determined from a user-configurable preferences set or control panel, just as normal generic effects would be. For example, the user previously designated which types of force effects would be associated with which types of web page objects, and these preferences are read from a stored file or other computer-readable medium (or default mappings are used). The end result would be the experience of generic effects although they are actually and transparently inserted into the web page as authored effects by a n external program.

The major drawback to this approach is that it is not seamless. In particular, it is difficult to assign a program to process an incoming HTML file. Few browsers, if any, support this functionality. In addition, it may be time consuming for a user/client to have to download an HTML file, pass it to a pre-processing program, and then load it into a web browser.

A different embodiment utilizing a proxy server can eliminate some of the difficulties of the above-described embodiment. A proxy server is a server computer that receives Hypertext Transport Protocol (HTTP, the underlying communication protocol of the World-Wide Web) requests from a client computer and performs that request on its behalf. Proxy servers are often used to allow Web access beyond a firewall; the proxy server has special privilege to access the Internet beyond the firewall, so all HTTP requests must go through it. Proxy support is common feature in web browsers and is extremely easy for a user to configure.

Figure 16:
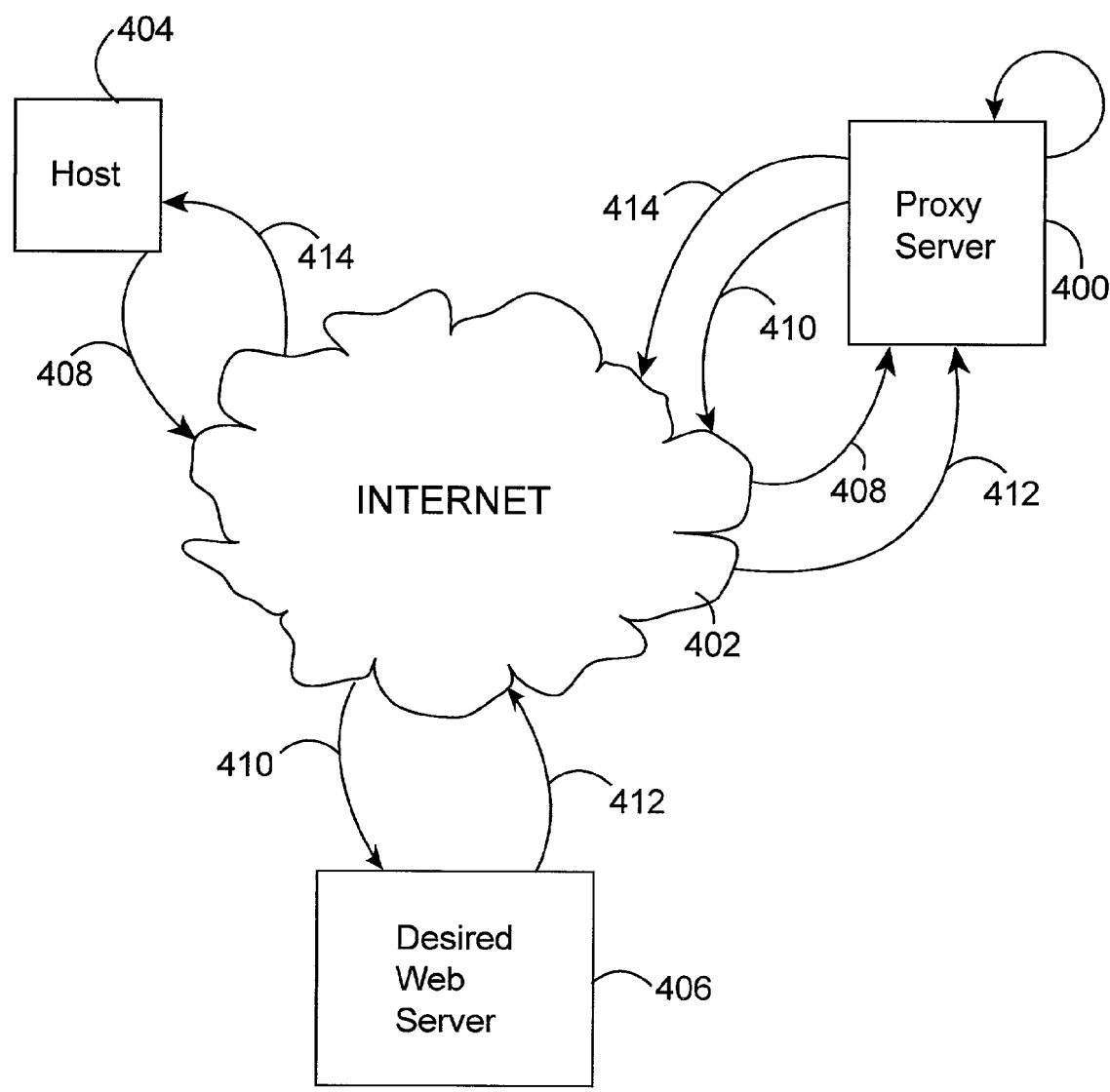
FIG. 16 is a diagrammatic illustration showing a proxy server for providing preprocessing to web pages to add force effects.

FIG. 16 is a block diagram illustrates the use of a proxy server for force feedback functionality over the Web, in which generic effects are emulated with authored effects. To solve the pre-processing problem, an interested party, company, organization, etc. can set up a proxy server 400 connected to the Internet 402. This proxy server 400 accepts all HTTP requests from client computers, such as requests to receive particular web pages. For example, a host computer 404 is to receive a web page from a desired web server 406. The host 404 issues a request 408 to the proxy server 400. The proxy server 400 then issues a request 410 on the host's behalf, which is received by the requested source 406, such as a web server computer over the Web. The web server 406 then fetches the desired document/web page and sends the document 412 to the proxy server 400.

After receiving the requested document 412, a normal proxy server would then pass the requested web page back to the client; however, the proxy server 400 of the present invention first applies the pre-processing (described above) to the web page document to modify the web page file (embedding a force-only ActiveX control, adding JavaScript code to facilitate force-effect scripting, and assigning effects to web page objects such as hyperlinks), if the document is an HTML file. The proxy server may receive and read user preferences from the client to determine which force effects to assign to which web page objects. If the document is not an HTML file, no pre-processing is performed. The proxy server 400 then transmits back the new generic-effect-enabled web page 414 (or other type of document if no preprocessing was performed) to the client computer 404. Thus, the client's user is able to feel the web page in a seamless manner, and without having the client expend time in preprocessing operations.

Plug-in Embodiment

Another embodiment for implementing force effects is to provide a "plug-in" extension to the web browser at the client machine, such as Netscape Navigator. The plug-in, for example, can implement authored force effects, where the plug-in handles particular force-related commands or information in a received HTML file. A plug-in may also or alternatively implement generic force effects for a web page by referring to the generic effects on the client machine when an appropriate event takes place, such as a pointer moving over a hyperlink. The plug-in software can be a proprietary extension of the web browser software developed, for example, by Immersion Corporation. A plug-in is similar in function to the ActiveX control described above.

In one embodiment, instructions are provided in the received web page which define an authored force effect for the plug-in. For example, an <EMBED . . . > tag can define a force button object that will be displayed on the client machine. Other force objects besides button objects can also be defined and displayed, such as links, text, sliders, game objects (balls, paddles, etc.), avatars, windows, icons, menu bars, drop-down menus, or other objects. In a first line of the <EMBED . . . > command, the force button object can be defined by a "IFF" extension file, namely "FORCEBUTTON.IFF." The <EMBED . . . > command is an existing functionality of HTML. It essentially embeds function calls which are handled by the web browser. If the suffix of the specified file is a known, standard suffix type, the call is executed directly by the web browser. If, however, the suffix (.IFF in this instance) is not a standard feature of the web browser, the browser will first took for a "plug-in" to implement this feature and, if a suitable plug-in is not found, it will look for application programs implementing this feature. In the preferred embodiment of the present invention, a plug-in including a reference to a Dynamically Linked Library (DLL) is provided to give functionality to the .IFF suffix. The DLL can be provided local to the client machine or on another linked resource.

In the <EMBED . . . > specification, the size of the button can be specified, the initial state of the button ("up" or "down"), and the force effect associated with the button, such as "vibration." Parameters defining the character and nature of the force effect can also be specified (start time, length, frequency, magnitude, etc.). A "trigger" for the force effect can be specified, such as a function "MOUSEWITHIN" with its associated parameters, and by a function "BUTTONSTATE." The function MOUSEWITHIN determines whether the pointer icon, the position of which is controlled by the force feedback device, is within the specified boundaries defining a region of the force button. This region can be specified by the parameters. The function BTJTTONSTATE determines whether a button or switch of the force feedback device is in the desired state to trigger the force object event (e.g., a button event in this example). The image file and text representing the force button can also be specified. Other force effects, triggers and parameters can also be associated with the force object. For example, a force (such as a vibration) can be triggered if the pointing icon is moved a predetermined velocity or within a predefined range of velocities within the force object. Or, a trajectory of the pointing icon on a force object can trigger a force, like a circle gesture.

The plug-in embodiment also provides for programmability of the embedded force feedback object. An optional programmable command can be inserted into the EMBED command and can include, for example, an iterative loop to cause a force effect to be repeated a specified number of times and/or to cause a wait for a specified time after a force effect has occurred. By providing programmability to the force feedback object, force feedback effects based upon past events and upon a complex interaction of factors can be provided.

If there is an embedded "tag" for a force effect in the HTML file, e.g. a tag or file having an .IFF reference, then the plug-in software is used to interpret the .IFF file. In one embodiment, a "framework" is created for the force effect (or "force object"). The framework provides a particular set of generic features to implement the specified force object, and preferably includes no specific parameters or functions for the force object. A name and associated parameters from the HTML file are then parsed and the force object is built upon this framework based upon the parameters. For example, one name might be "BUTTONSTATE" and its parameter might be "UP" (or "UNSELECTED").

The plug-in software can monitor the position and button state of the force feedback device. The plug-in creates a force feedback command in response to the detected position and state (if appropriate), and a command is sent to the Dynamically Linked Library (DLL) to place a force feedback command on the interface which can be parsed and interpreted by the force feedback device.

It should be noted that the force feedback driver (browser plug-in or DLL) can have the ability to interact with Java code. In this embodiment, the plug-in reads and executes Java commands using the browser's run-time Java interpreter. It should also be noted that the force feedback device itself can have a Java interpreting chip on board, permitting the plug-in driver to download Java code to the force feedback device to be executed on the device. Java and Java interpreting chips are available under license from SUN Microcomputers of Mountain View, Calif.

The embodiments disclosed herein can have the ability to interact with instructions provided in other languages besides HTML. For example, virtual reality 3-D graphical environments are increasingly being created and implemented over the World Wide Web and Internet using languages such as the Virtual Reality Modeling Language (VRML). In these 3-D graphical environments, users may interact with programmed 3-D objects and constructs using client computer 14 or 16, and may also interact with 3-D graphical representations (or "avatars") controlled by other users over the World Wide Web/Internet from other client computers. Force feedback commands and parameters can be provided in the instructions or files of these other protocols and languages and received by a client computer system in an equivalent manner to that described above so that force feedback can be experienced in simulated 3-D space. For example, embedded force feedback routines for authored force effects can be included in the VRML data for a virtual environment so that when the user moves into a virtual wall, an obstruction force is generated on the user-manipulatable object. Or, when the user carries a virtual object in a controlled virtual glove, the user might feel a simulated weight of the virtual object on the user manipulatable object. In such an embodiment, the force feedback device preferably provides the user with three or more degrees of freedom of movement so that input in three dimensions can be provided to the client computer, Alternatively, generic effects can be provided with VRML files having standard object types (walls, ramps, stairs, ice, avatars, gloves, chairs, guns, etc.)

Authoring Tool for Adding Force Functionality to Web Pages

Associated with the methods of providing web pages having force effects as described herein are methods for allowing authors to easily create web pages with force effects. A web page author does not have an intuitive sense as to how forces will feel when assigned to particular objects or adjusted in certain ways, and thus must go to great effort to develop characteristics of forces that are desired for a specific object or interaction. For example, a programmer may wish to create a specific spring and damping force sensation between two graphical objects on a web page, where the force sensation has a particular stiffness, play, offset, etc. Current web page authoring tools do not allow the design of force effects associated with web page objects. Furthermore, current force effect design tools are not oriented to the particularities of web page authoring, such that a web page designer is without a professional development tool to assist in authoring force effects.

The web authoring application interface described herein is one example of a force-enabled tool for authoring web pages. For example, the interface herein ("FEELit Studio") is described in connection with the I-Force Studio® available from Immersion Corporation, which is a force-effect authoring interface intended for use with application programs such as game programs. This interface can be used with mouse 36 (e.g., the FEELit Mouse developed by Immersion Corporation). The application allows users inexperienced with HTML syntax and unfamiliar with force feedback to quickly create HTML pages with feel content, along with standard content such as graphics, text, and sound. The application uses common user interface features found in most web authoring applications today. These features should allow the user to easily insert and place content and immediately feel, see, and hear the results. Once the web page is saved as a file by the authoring interface, the user can send the created web page to a web server to be accessible to end users over the Internet or other network; or, the saved web page might be already available over the Internet if it is resident on a machine (such as a client machine) having appropriate accessibility over the Internet (or other network).

Adding force effects to web pages can be very simple. However, to add effective force effects, the feel sensations should appropriately match the rest of the web page content. This requires a creative and interactive process where parameters are defined, experienced, and modified until the feel sensations are fine tuned. A clumsy and non-intuitive design process means the web author will spend much less time being creative.

The web page authoring tool of the present invention is used for authoring web pages that include force effects. In one embodiment, the web authoring tool is an HTML editor, such as an editor that is provided with a web browser, with additional force functionality.

Figure 17A:
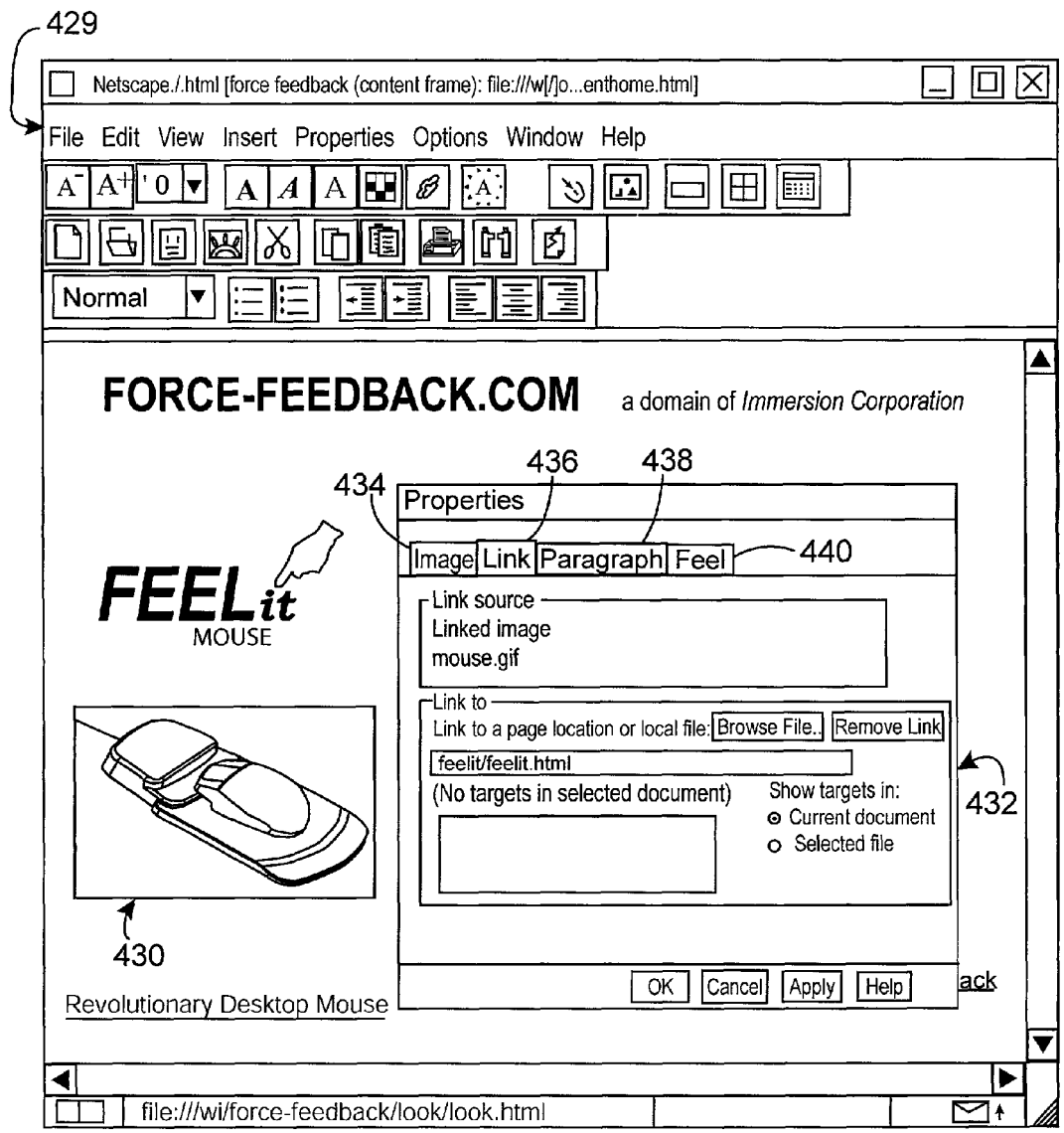
FIGS. 17a and 17b are illustrations of embodiments of web page authoring applications of the present invention that includes force feedback editing functionality.

FIG. 17a is a screenshot of an HTML editor 429 that has been modified according to the present invention to include the ability to design and add forces to web pages according to the present invention. The HTML editor is a WYSIWYG (What You See Is What You Get) editor for creating a web page, meaning the author sees exactly how the web page will look to others as the author edits the page. The author may type text directly into the editor as it will appear, and can place images and other web objects using GUI tools. The author may assign text, an image, or other object as a hyperlink using menu controls. The HTML editor then outputs the finalized web page as an HTML file that includes all the required HTML instructions necessary to implement the created web page layout. This GUI method of creating a web page is in contrast to creating a web page directly using HTML code. When using the editor, the obtuse syntax of the HTML document is hidden from the author as well as the end user.

For example, the logo and image on the web page shown in FIG. 17 is provided with HTML code specifying the position of the logo and image and references the image file used to display the image. The WYSIWYG HTML editor provides a more intuitive method of creating the logo and picture. The user simply places the cursor where he or she desires the picture to appear on the web page and then selects the "insert Image" command from either the "Insert" pull-down menu or the right-click context menu. A dialog box is displayed and allows the author to specify an image file. A similar process is used to make the image a hyperlink to another web page. An HTML editor which visually shows what the page will look like rather than display the underlying source text used to construct the page is much easier to use and understand. The same can be said for adding feel sensations.

The HTML editor of the present invention not only is a WYSIWYG editor for visual design of web pages; it is also a WYSIWYF (What You See Is What You Feel) editor, meaning the author immediately sees and feels exactly how the web page will feel to others as the author edits the page. Just as the obtuse syntax of the HTML document is hidden from the author, the mechanism enabling feel content in the web page should be abstracted from the author. This mechanism can be ActiveX and JavaScript components or some other technology such as the methods described above. The author is presented with a set of controls and tools that allows quick and simple addition of compelling feel content without having to understand the underlying technology. Authors may easily assign feel properties to all web content, including graphics and text. Designed force effects can be saved as a resource and can be reloaded and modified. End-users can also customize the sensations they feel on web pages authored with the authoring tool.

For example, as shown in FIG. 17a, a "Properties" dialog box 432 can be displayed in the HTML editor when the image 430 of the mouse on the web page is selected and the properties menu from a drop-down menu is selected. This dialog box 432 is used to add to or change properties of the selected object. Thus, an image file can be associated with the selected object (in this case, "mouse.gif") using the "image" tab 434, the object can be designated a link object and the linked location is specified in the input field using the "link" tab 436, or the placing of the image or associated text can be changed using the "paragraph" tab 438.

Figure 19A:
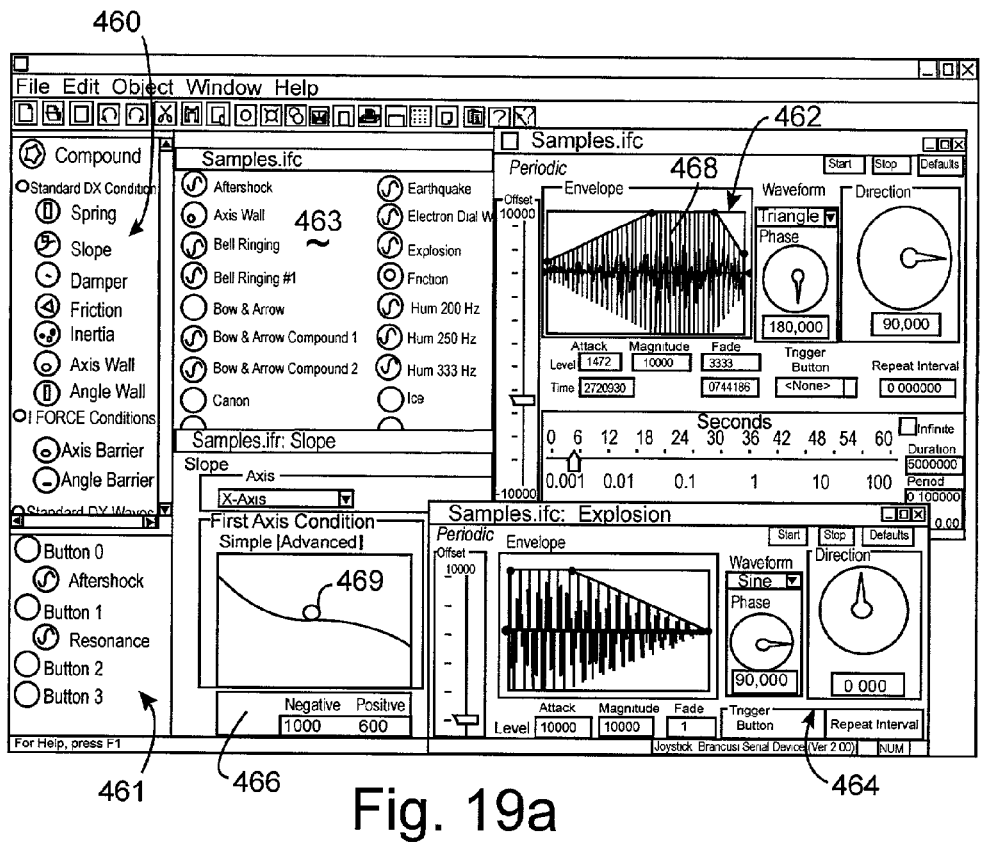
FIGS. 19a, 19b, and 19c are illustrations showing force effect editing interface examples which can be used in conjunction the authoring application of FIGS. 17a-17b.
Figure 19B:
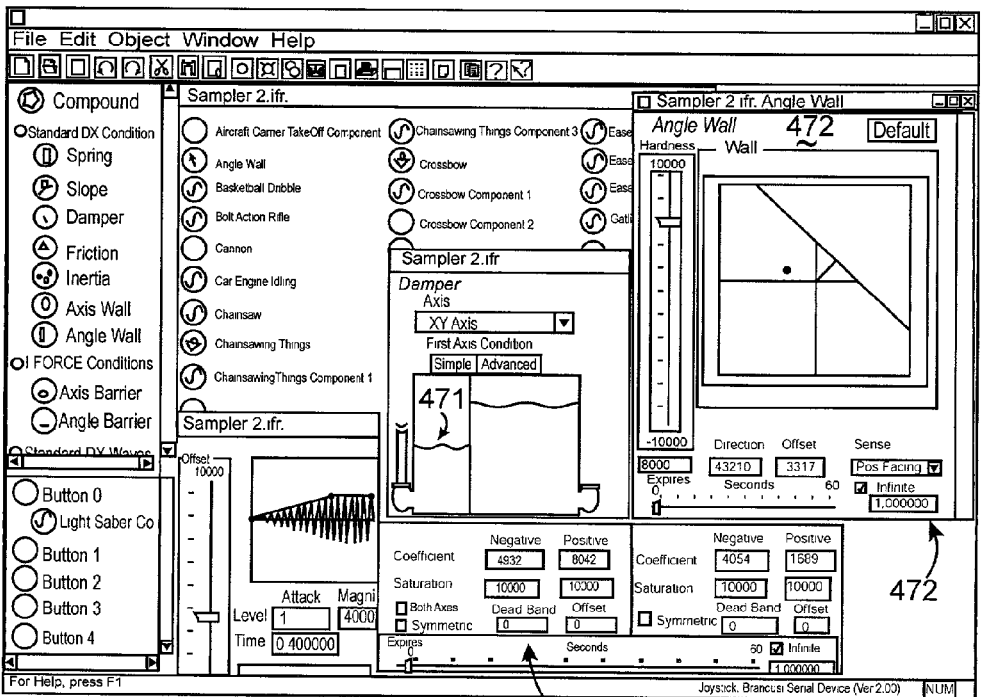
Figure 19C:
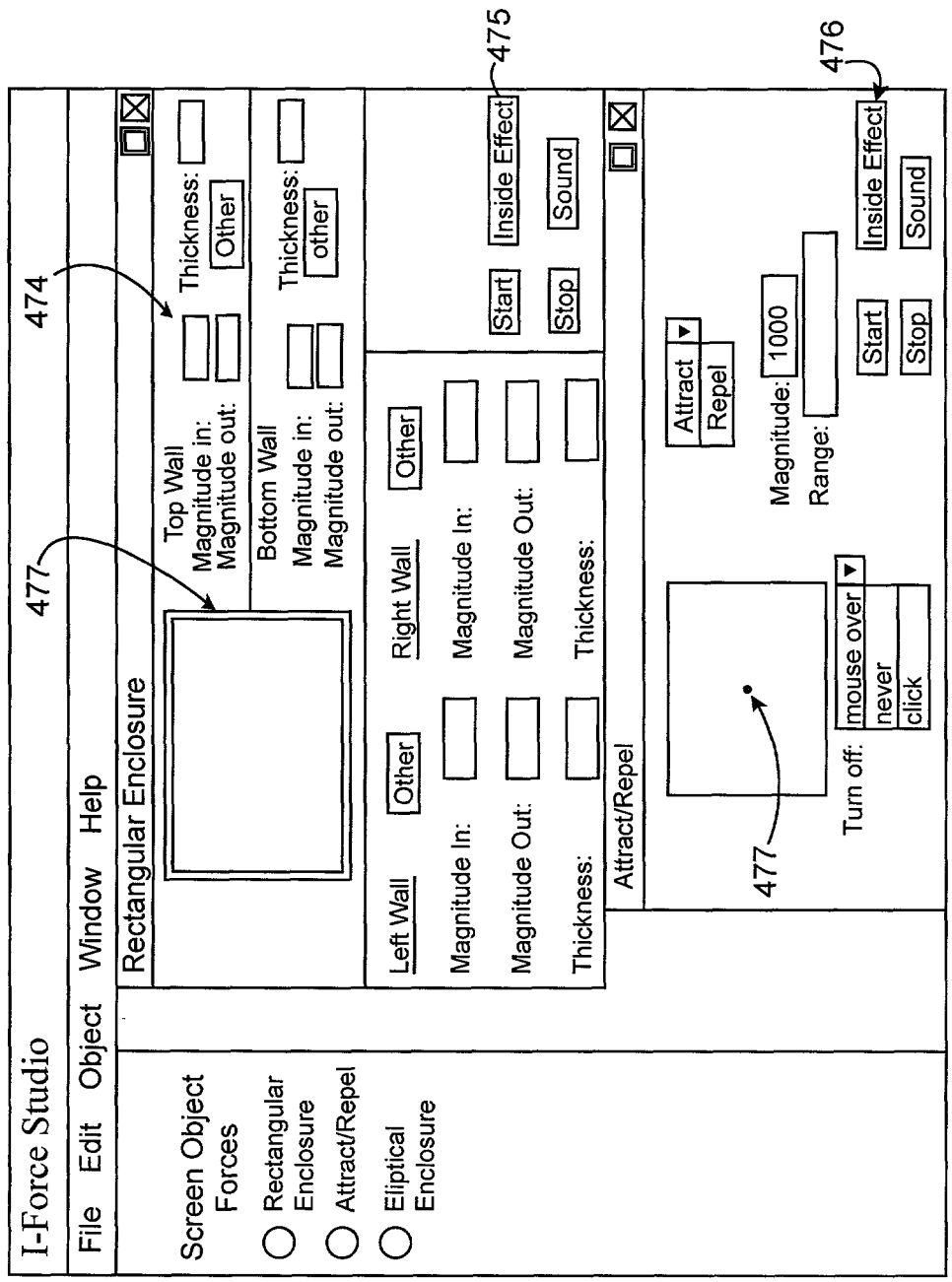

A fourth tab 440 of the present invention is named "Feel" and is provided in addition to the "Image," "Link," and "Paragraph" tabs. The Feel tab can be selected to bring up a new screen, page, or dialog box presenting a number of options for the author to select in designing forces to add to the image 430. This feel property page would allow the user to customize the feel of the image using one or more force effects. A list of force effects can be presented from which the user can select one or more. Also, in some embodiments a full design interface as shown in FIGS. 19a-19c can be presented to allow a user to design forces as well as assign them to web page objects.

Figure 17B:
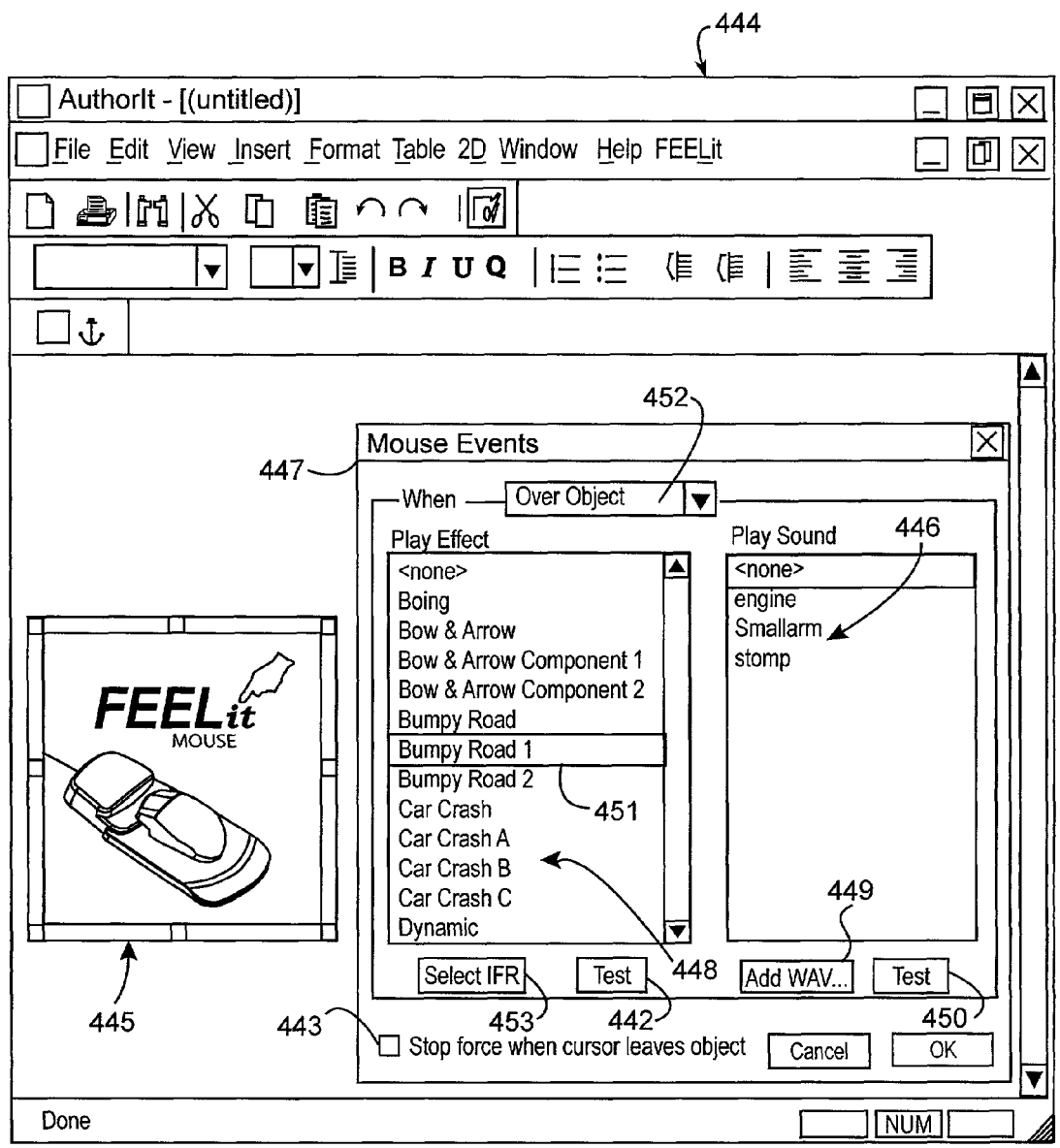

FIG. 17b illustrates another example of providing options for the user to assign a force effect for a web page object. In web page authoring tool 444, the user has selected the web page object 445, an image, and has commanded the force and sound assignment window 447 to open, e.g. with a click of a right mouse button or the selection of a menu item. Assignment window 447 allows the user to assign one or more force effects from a list 448. In the example shown, the user has selected "BumpyRoad" force effect 451.

The user may also select via the control menu 452 the conditions or "events" required for one or more selected force effects to be "played", i.e., output using the force feedback device 50. For example, the control menu 452 allows the user to select whether the force effect will be output when the mouse cursor is over the associated web page object, or when the user clicks a button of the mouse while the cursor is over the object, or when then the user double-clicks a button of the mouse while the cursor is over the object. Other events related to the web page object can also be assigned and/or defined by the user. A toggle button 443 allows the user to select whether a force continues to "play" after the cursor moves out of the boundaries of the web page object. For example, some time-based force effects have a particular duration after being started that can continue after the cursor leaves the object.

The user can also select a different "resource" file using button 453 to provide a different list 448 of force effects; each resource file, for example, can include different force effects. A resource file or force effect in list 448 can be stored on a local client machine (e.g. for generic effects or downloaded authored effects) or can be stored remotely over a local-area network or the Internet and downloaded as necessary. The content of a force effect file is typically much more compact in size than the content of image or sound files, since a force effect need only be characterized in a force effect file using parameters such as magnitude and duration. The parameters are utilized by resources already resident on the client machine to output the characterized force. For location-based force effects requiring more input than simply selecting a force effect, another assignment window can be displayed. For example, if an enclosure force effect is desired to be assigned to web object 445, the user could draw the exact shape and size of the enclosure in an interface as shown below in FIGS. 20-24. Or, the user can designate the exact location on the web page displayed in the interface 444 where an attractive force is to be centered.

A test button 442 preferably allows the user to test a selected force effect from the list 448. For example, the Bumpyroad force effect 451 would cause the mouse grasped by the user to immediately shake after the test button was selected. For location-based forces such as an enclosure or attractive force, the user can test the force effect by moving the cursor to the selected web page object 445 as will be displayed in the web page, as if the web page had been downloaded (in some embodiments, all force effects having a "cursor over object" event can also be tested this way). For example, if an enclosure surrounded image 445, the user could test the enclosure forces by moving the cursor into and out of the displayed image 445. The bumpy road effect 451 can be tested in some embodiments by moving the cursor over the object if the event 452 requires such.

The user can also preferably associate audio feedback with web page objects using the web page authoring tool of the present invention, where the audio effects are synchronized with any force effects of the web page object. For example, in editor 444, a list of sound files 446 is displayed which are available to be associated with the web page object 445. These sound files can be stored on a client machine or on a different machine accessible over a network, and are preferably in a standard format, such as wav or mp3. The add button 448 allows the selected sound file to be associated with the selected web page object, and the sound will be played when the event in window 452 occurs (any assigned force effect 451 will also begins at the designated event). The test button 450 allows the selected sound file to be played immediately in the authoring tool (assuming output speakers are connected to the computer displaying the web page authoring application). Once a sound file has been associated with a web page object, the output of the sound is automatically synchronized with the output of the associated force effect. Since many force effects have much less impact or immersiveness on a user without sound, this feature allows straightforward association and synchronization of force effects and audio effects.

An example of HTML code for a web page including an image such as image 445, which has been associated with an "engine" force effect and an "engine" sound, follows. This code uses JavaScript to call a force-only ActiveX control, as described above. The force-enabled authoring tool preferably automatically generates this code when the user wishes to save the created web page.

```
<!DOCTYPE HTML PUBLIC "-//W3C//DTD W3 HTML//EN">
<HTML>
<HEAD>
<META content="text/html; charset=iso-8859-1" http-equiv=Content-Type>
<META content="'MSHTML 4.72.3110.7'" name=GENERATOR>
</HEAD>
<BODY onload="openforceresource('F:/web/Sounds.ifr');">
<object ID="_engine" WIDTH="0" HEIGHT="0"
        CLASSID="CLSID:05589FA1-C356-11CE-BF01-00AA0055595A">
    <param name="ShowControls" value="0">
    <param name="ShowDisplay" value="0">
    <param name="AutoStart" value="0">
    <param name="AutoRewind" value="1">
    <param name="FileName" value="F:\web\sound\engine.wav">
</object>
<P>.</P>
<OBJECT classid=CLSID:5DFDD466-5B37-11D1-A868-0060083A2742
        codeBase=FeelMe.CAB#version=2,0,0,0 height=1 id=FeelObject width=1>
    <PARAM NAME="_Version" VALUE="65536">
    <PARAM NAME="_ExtentX" VALUE="26">
        <PARAM NAME="_ExtentY" VALUE="26">
        <PARAM NAME="_StockProps" VALUE="0">
```

```
</OBJECT>
<SCRIPT id="FEELit Base JavaScript" language=Javascript>
var loaded = false;
function openforceresource (url)
{
        FeelObject.OpenForceResource (url);
        loaded = true;
}
function doeffect(force, file)
{
        if (loaded) {
                var result = FeelObject.StartEffect(force, file);
        }
}
function noeffect(force, file)
{
        if (loaded) {
                var result = FeelObject.StopEffect(force file);
        }
}
function forcecleanup( )
{
        if (loaded) {
                FeelObject.Cleanup( );
                loaded = false;
        }
}
</SRIPT>
<P> </P>
<P><IMG align=baseline alt="" border=0 hspace=0 onclick="" ondblclick=""
onmouseout="" onmouseover="doeffect('Engine'); _engine.Stop( );
_engine.Run( );"
    src="F:\web\feelit.gif"></P>
<P align=right id=FeelMeLogo>
<A href="http://www.immerse.com/">
<IMG alt="FEEL ME!" height=31 src="FeelMeMini.gif" width=50></A></P>
</BODY>
</HTML>
```

The web page authoring tool 444 also preferably allows an author to add a graphical identifier and/or link to the created web page that indicates that the web page includes force feedback functionality. For example, the identifier can be a particular logo (e.g., text or a graphical image) that is easily recognized. This identifier can be automatically added at a particular predefined/customized location on the web page, such as the corner or the bottom center of the page, etc., when the web page is written to a file using the authoring tool of the present invention, if the web page includes one or more force effects (or the identifier can be included in any web page written by the force-enabled authoring application). The identifier can also be of a predefined, customized size. When a user of a client machine downloads the force feedback web page, the force identifier is thus also displayed so that the user knows whether force-feedback peripherals are supported by the web page; if desired, the identifier might also indicate that authored force effects are included in the web page. Furthermore, in some embodiments the graphical identifier can be a hyperlink that, when selected with the cursor, will cause a force-feedback related website to be downloaded on the client machine. The force feedback website can provide force feedback resources such as additional force effects, guides, updates, etc. The user can preferably set an option as to whether the identifier will automatically be included in a web page created by the web editing tool.

The force-enabled web page authoring tool of the present invention is interactive, intuitive, and allows users to instantly feel exactly what they create. For example, after a user assigns a force effect to an image in the web page, the user can test the force effect by simply moving the cursor over that image while the web page is displayed in the authoring tool. If the force effect is not quite what the user wanted, a different force effect can be immediately assigned. In some embodiments, the user can enter a "test" mode of the authoring tool to feel force effects, which is separate from an editing mode.

Figure 18:
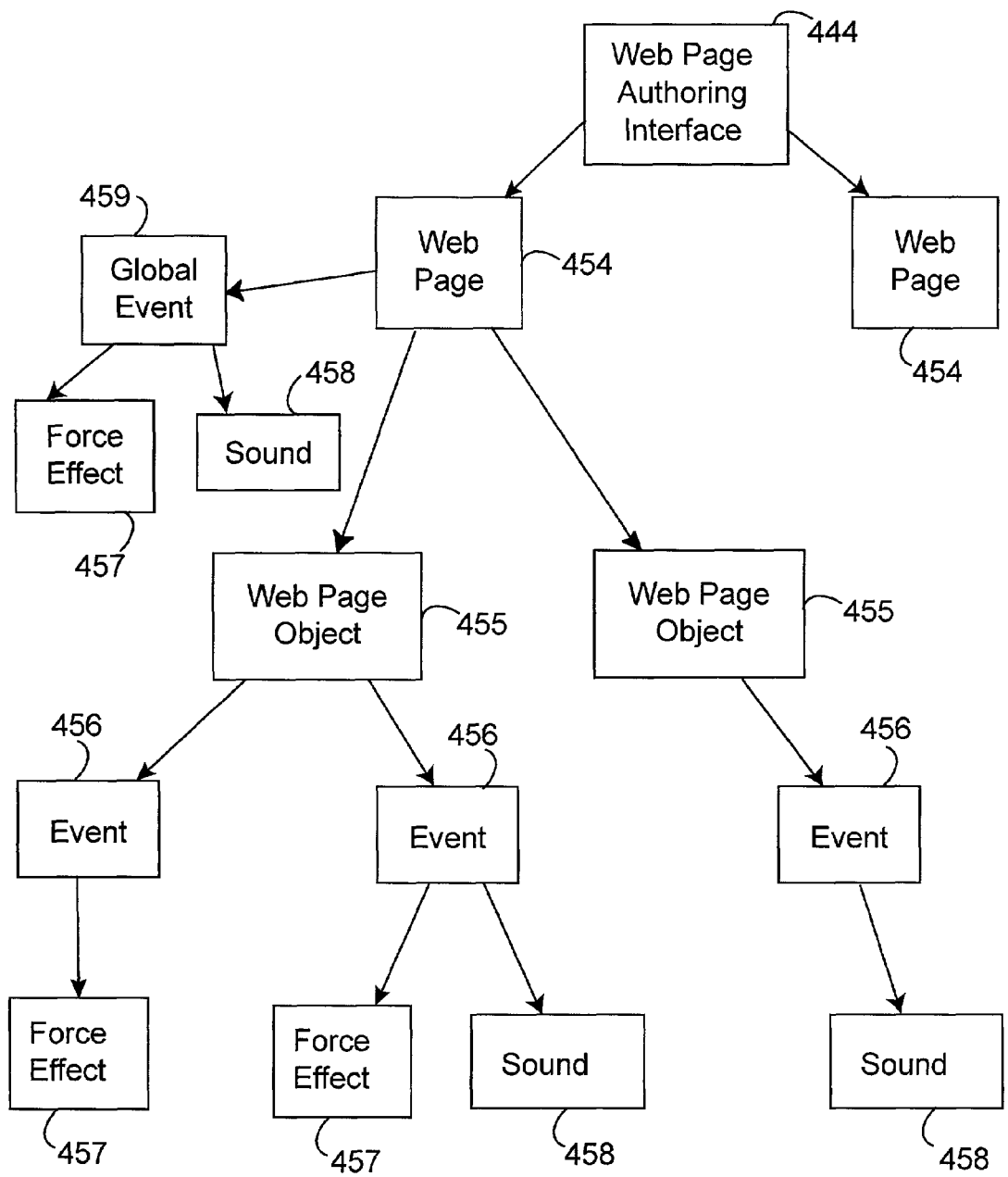
FIG. 18 is a block diagram illustrating the web page authoring interface of the present invention and web pages produced by the authoring interface.

FIG. 18 is a block diagram illustrating the web page authoring interface of the present invention and an example of a web page structure produced by the interface. The authoring interface 444 (or 429) creates or edits one or more web pages 454, where multiple web pages can be loaded into the interface at one time if desired. Each web page 454 includes one or more web page objects 455, such as images, text, animations, etc. Each web page object can include one or more events 456, which are the conditions needed to play or activate an effect assigned to the event, such as a cursor located over the object or a click of a mouse button. Thus, each event 456 can be assigned to one or more effects, such as force effects 457 or sound effects 458 (also, a single force effect or sound effect can be assigned to multiple different events). As shown, events can be assigned force effects and no sound effects, sound effects and no force effects, or both force effects and sound effects. In addition, each web page 454 can preferably be assigned one or more global events 459. Global events are not associated with a particular web page object 455, but are applied universally. Each global event has one or more force effects 457 and/or one or more sound effects 458 associated with it, similar to the events 456. For example, one global event can occur when the web page is fully downloaded by a client, at which point the assigned force effect(s) and sound(s) are played. A different global event can occur when the web page is exited by the client machine. Other global events can be a mouse click or double-click when the cursor is not over any web page object (e.g., over the background), when a key on the keyboard is pressed, etc.

FIGS. 19a, 19b, and 19c illustrate examples of force sensation design interfaces that can be displayed to edit the force effects for an object in the HTML editor. Alternatively, a separate force design application, such as I-Force Studio, can be run if the user wishes to modify or create a force effect. The shown interface windows are similar to the force sensation design tools provided in I-FORCE Studio® available from Immersion Corporation. These design tools provide a fully animated graphical environment for rapidly adjusting physical parameters of feel sensations, and then optionally saving them as "feel resources." Authors may craft tactile feel sensations by stretching springs, manipulating surfaces, placing liquids, and adjusting other graphical representations and physical metaphors that represent each associated force feedback phenomenon. The design tools also empower end users with the ability to edit the "feel resource" using the same intuitive animated graphical controls used by the web page author. A user with no programming experience or familiarity with force feedback can quickly design high-fidelity, compelling sensations using these design tools. Such graphical manipulation for design of force effects is described in greater detail in U.S. Pat. Nos. 6,147,674 and 6,169,540, both incorporated herein by reference.

FIG. 19a shows a number of windows for adjusting parameters for several different force effects. The author can select a desired force effect from the displayed list 460 of effects, and may select one or more buttons on the force feedback device 50 from list 461 to be associated with the force effect. Window 463 shows a list of force effects organized under the "Compound" force effect main heading in list 460, any of which can be selected by the web page author (or user). Examples of windows for force effects that have been selected from list 460 and 463 are also shown. Window 462 shows the parameters and graphical representation of an "earthquake" compound force effect. Window 464 shows the parameters and graphical representation of an "explosion" compound force effect. Window 466 shows the parameters and graphical representation of a "slope" force effect (i.e. spring force with a negative coefficient). In all of these windows, the author may adjust the parameters by entering values into fields or by adjusting various portions of the graphical representation, e.g., dragging control points on the displayed "earthquake" wave 468 to adjust amplitude and frequency. Parameters like frequency, duration, attack and fade levels, and direction are also adjustable by dragging graphical controls. The author may adjust the slope effect by balancing the ball 469 on the slope. In all these cases (assuming the author has a force feedback device 50 connected to the computer on which the force effects are designed), the author may immediately and directly feel the designed force effect on the mouse 50 by pressing an appropriate "output" control.

FIG. 19b shows other force effects that can be designed or adjusted by the user. A feeling of water or mud can be easily designed in the damper window 470 by adjusting the liquid level and then feeling viscosity forces on the mouse 36 change as the simulated liquid 471 flows out of the graphical container. Window 472 shows the design of an "angle wall" that provides a barrier force to the user object at a specified angle, and which can be adjusted using a graphical representation of the wall. When adjustments are made to the parameters, the author immediately feels the new effect on mouse 36 and can judge if the changes enhance the feel or not. Apply and Undo commands allow the user to easily keep or discard changes. A user can save, copy, modify, or combine predefined effects to create a library of favorite feel sensations. The authoring tool also provides fully customizable sensations and numerous preset examples: custom sensations can be created or predefined effects can be used or modified.

FIG. 19c shows examples of a design window 474 for designing an enclosure force effect and design window 476 for an attract/repel force effect. The various force characteristics of the walls of the enclosure can be designed, and the interior of the enclosure can be assigned a force effect using button 475. The attract/repel force effect can be characterized by magnitude, conditions for activation or deactivation, radius/range, etc. Any designed forces can be immediately tested by moving the cursor within the design window over or near the appropriate graphical representation 477. The forces shown in FIGS. 19a and 19b are not generally referenced to a screen location; for example, the output of a vibration or a damping force does not depend on the location of a pointer on a screen. However, the force effects of FIG. 19c and many other web-related and graphical-user-interface related forces are associated with a particular screen location. For example, an enclosure is a box- or elliptical-shaped object having walls at a particular screen location which provide forces on a manipulandum based on the location of a cursor with respect to the enclosure walls. An attraction force typically attracts the cursor and manipulandum to a particular location on the screen. The user should be able to immediately test these types of screen-location forces using a cursor in the design interface. Thus, in one embodiment, the location with reference to the frame of a particular force design window should be converted to full screen coordinates so that the location of the graphical representation 477 of the force effect is known to the force feedback device and forces can be output at the appropriate location when the cursor interacts with the graphical representation 477.

The design interface includes intuitive graphical metaphors so that the user may adjust force feedback parameters using easy-to-understand controls. It is fully interactive and animated, so that the force effect parameters can be adjusted by dragging the pictorial control points, adjusting sliders and dials, or typing in numbers directly. The resulting sensations are output in real-time to the interface device 50 as the user manipulates the parameters. If a user designs a slippery force effect, he/she can immediately run the cursor over a representation to feel the slipperiness. If the feeling is too strong or too subtle, there is a simple control or dialog box to adjust the slipperiness and immediately feel the changed effect. The design tool uses real world metaphors like the liquid, slope, and walls in the above interface to ensure users unfamiliar with force feedback will have an intuitive understanding of the functions of all the controls.

In addition, a force design interface such as shown in FIGS. 19a-19c (e.g. I-Force Studio from Immersion Corp.) preferably is provided with the ability to allow users to test audio feedback that is to be associated with one or more force effects. Preferably, a user can designate audio data, such as a "wav" file, mp3 file, or other sound data, to be associated with a designed force effect. This can be accomplished by presenting a list of audio files and selecting one or more to be associated with a particular audio effect. The user can then "play" the force effect to test it, and the audio effect will play in synchronization with the force effect, i.e. the sound will start when the force effect starts (for a force effect having a duration); or the sound is played whenever the force is output (for some continuous force effects). Thus a user may iteratively adjust a force to match the variances in a sound as the sound is played, allowing the user to adjust the force effect and/or the sound for more effective presentation and mutual interaction.

Figure 20:
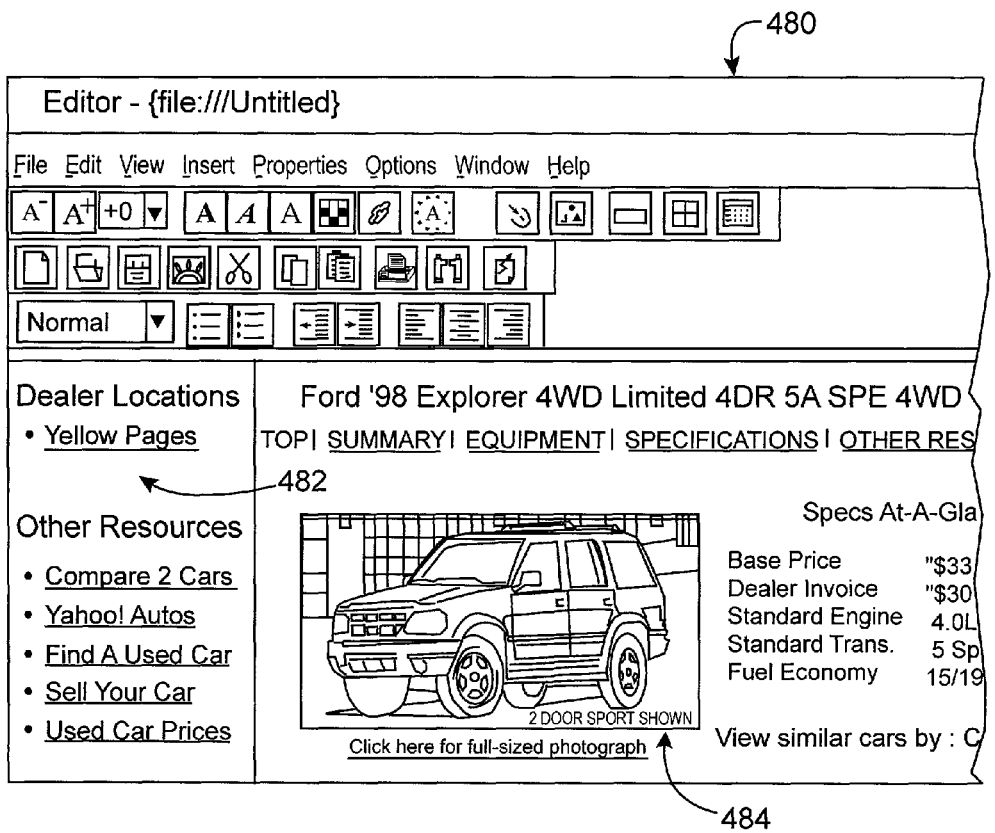
FIGS. 20-22 illustrate a web page editor displaying an image in a web page and providing an outline function to add force effects to portions of the image.

FIGS. 20-25 illustrate a web authoring feature of the present invention to conveniently add force sensations to web pages in a completely customizable, spatially-related fashion. FIG. 20 shows a portion of a web browser editor 480 that is displaying a web page 482 being edited by a web page author. The web page includes text and an image 484. The author wishes to quickly add force sensations to the image in particular areas of the image.

Figure 21:
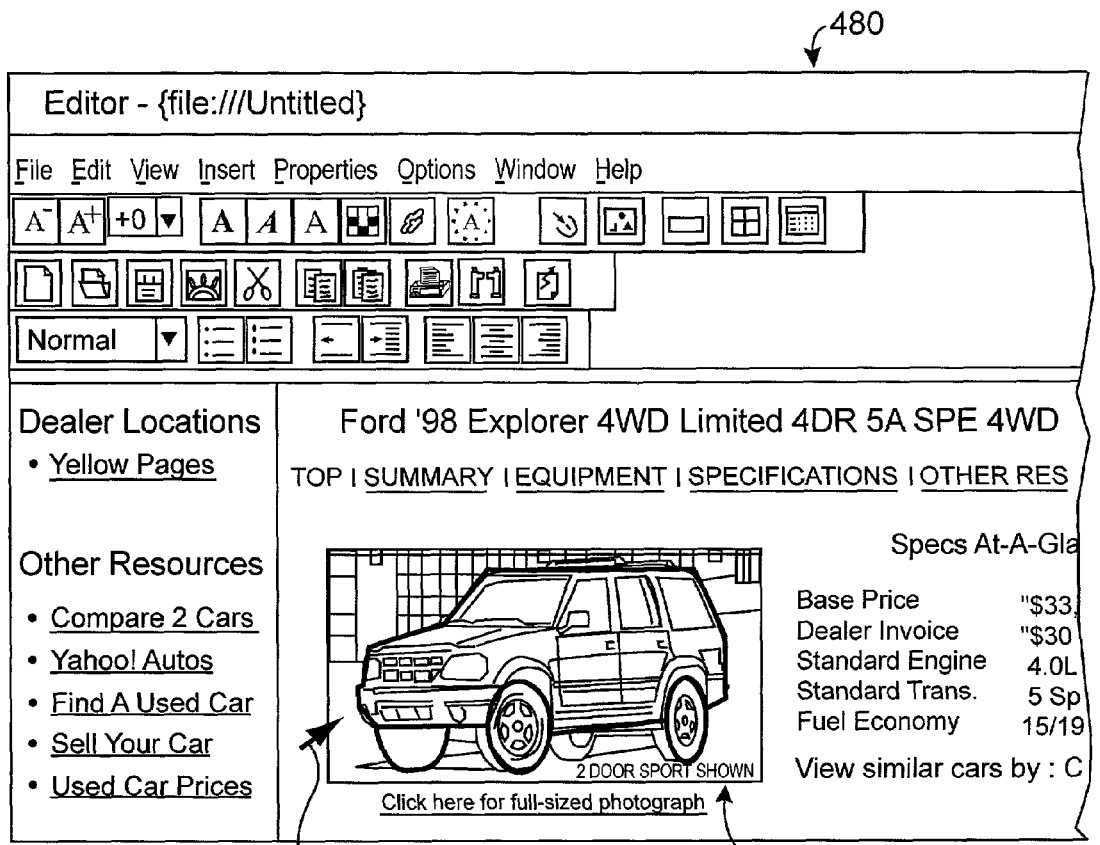

FIG. 21 illustrates the same web page and the use of a drawing tool to add force sensations to an image by defining spatial features of the added feel. The author controls cursor 486 to draw an outline 488 around the image of the truck portion of the image 484. The outline can be drawn using any number of well-known functionality tools of drawing or CAD programs (i.e. line drawing tool, freehand tool, an algorithm that automatically outlines a desired object in a bitmap, etc.). In addition, the author has drawn outlines 490 around the wheel portions of the truck image, and has drawn interior lines 492 to represent other force sensations. These outlines are intended to define the areas on the web page where forces are to be felt by a user with a mouse pointer. The outlines and lines are invisible to a user who has downloaded the web page and displayed it normally in a web browser, but are discerned haptically by the user with a force feedback device 50.

Figure 22:
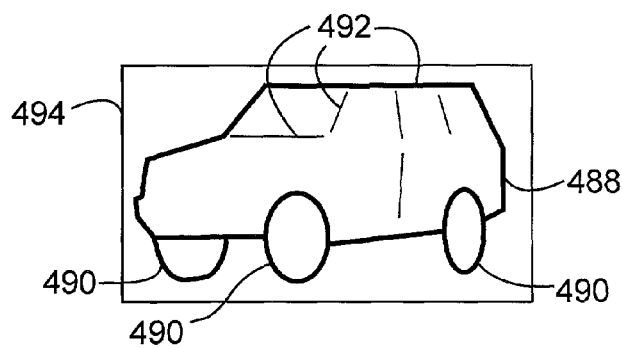

The outlines and lines of image 484 drawn by the author are shown more clearly in FIG. 22 without the image. Border 494 represents the extent of the entire image 484. Body outline 488 and wheel outlines 490 may be associated with force sensations by the author using the web page editor; for example, a particular outline can be selected and one or more force effects can be assigned to the outline or to a particular interaction with the outline. For example, outline 488 and outlines 490 can be designated by the author to be enclosures having barrier forces on the borders of the enclosures that provide a slight wall resistance to the mouse 36. When a user downloads the web page to a client machine over the Internet, the user can move his or her mouse pointer to the borders of outlines 488 and 490 and feel the outline of the truck and its wheels. In another example, the enclosures may be associated with gravity forces when the pointer is moving into the enclosure and vibration forces when the pointer is moving out of the enclosure. The author can assign a different force effect to each portion or side of an outline, the interior of the outline, a portion of an outline, etc. Force effects may be defined that occur externally to the outline but are caused by a pointer or button interaction with the outline.

The lines 492 drawn in the interior of the outline 488 are correlated with borders of windows on the truck image and may be associated, for example, with "bumps" or barrier forces (i.e. the mouse 36 is subjected to a bump force when the pointer 486 is moved over a line 492). This allows a user who interacts with the web page in a browser to feel physical features of the truck while he or she moves the pointer inside the outline 488. The user can likewise draw an outline within outline 488 to provide an enclosure (which is preferably a closed shape). For example, the windshield of the truck can be provided with a smooth or ice texture (which causes forces to bias or amplify movement of the mouse 36 within the enclosure and cause difficulty in stopping the mouse movement as if slipping on ice) while the other interior areas of enclosure 488 are provided with a bumpier texture.

By simply drawing lines or contours in desired places over the image 484, the author can add forces at a desired location or region on the web page. This allows careful correlation between spatial location of feel sensations and images or portions of images. In addition, the author can quickly designate multiple areas inside images, text, or other objects which may have different force effects associated with them. This feature allows greater complexity of forces to be assigned to web pages to a level of detail greater than the level of web page objects. Preferably, an author is also able to draw similar force lines or regions on any portion of the web page, e.g. on the background, on text, on link objects, on animations/video objects, etc.

Figure 23:
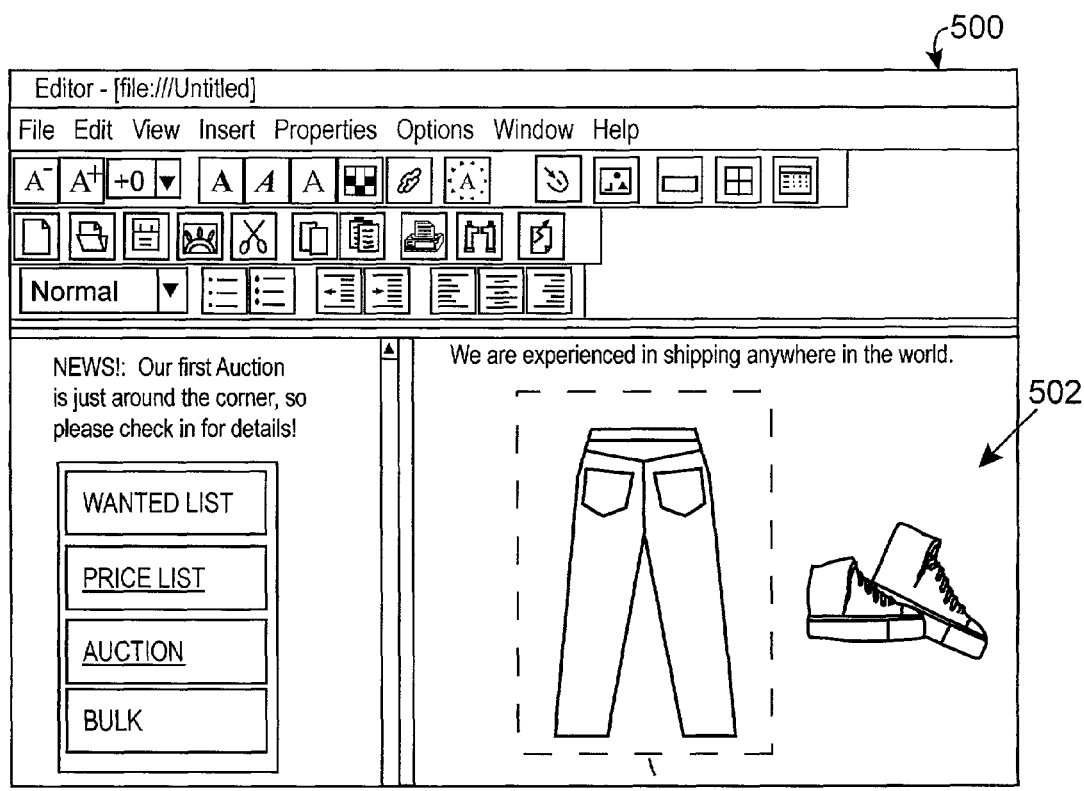
FIGS. 23 and 24 illustrate the web page editor of FIGS. 20-22 adding force effects to a different image.
Figure 24:
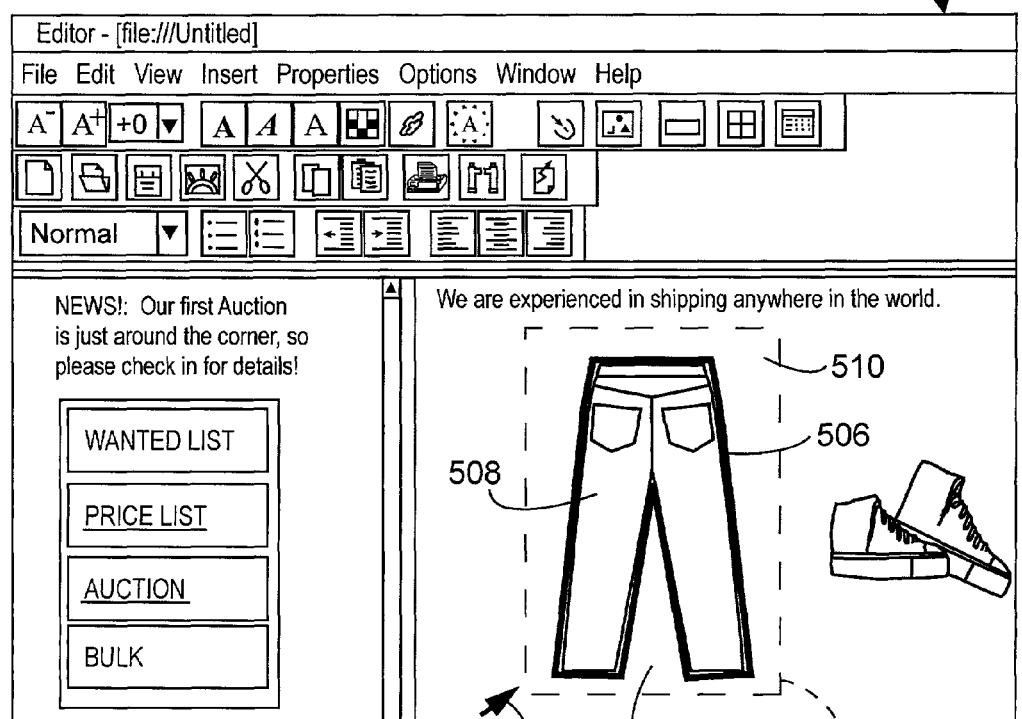

FIGS. 23 and 24 illustrate another example of the use of the spatial force editor described above. In FIG. 23, web browser editor 500 is displaying a web page 502 which includes an image 504 that an author wishes to edit to add force sensations. In FIG. 24, the author has used pointer 486 to draw an outline 506 around the jeans portion 508 of image 504. The author then assigns the outline 506 a force effect such as a texture. For example, a corduroy or rough-cloth type texture can be provided so that a user who view the web page will feel forces that simulate a cloth-like texture when the mouse 36 is moved to move the pointer over the jeans portion 508. However, when the user's pointer is moved over the other (non-jeans) portions of image 504 (such as the white background areas 510), no texture will be felt. The outlining feature allows a web page author to designate particular areas within images or other objects to have desired forces.

In another embodiment, the force feedback web page editor of the present invention can include an "auto trace" function which will automatically outline a desired sub-region in an image or other object. For example, some existing software such as Streamline® from Adobe Systems Incorporated will automatically trace areas or objects within bitmaps which the user designates to create an outline or boundary so that the user need not manually trace the areas. In the present invention, the author can cause an area in a bitmap to be outlined automatically and then assign force effects to the outline.

It should be noted that users may modify downloaded web pages in a similar fashion as described above to add force sensations to areas on web pages. The outlines 488, 490, and 506 and lines 492 are visible to a user or author when the web page is displayed by an HTML (or other) editor having the required force functionality, and the images and forces may be manipulated by anyone using the editor. The outlines and lines are preferably invisible when the web page is displayed in normal downloading/browsing mode by a web browser (unless, for example, the viewer desires to see the outlines and enables a "view force outlines" option in a web browser).

Figure 25:
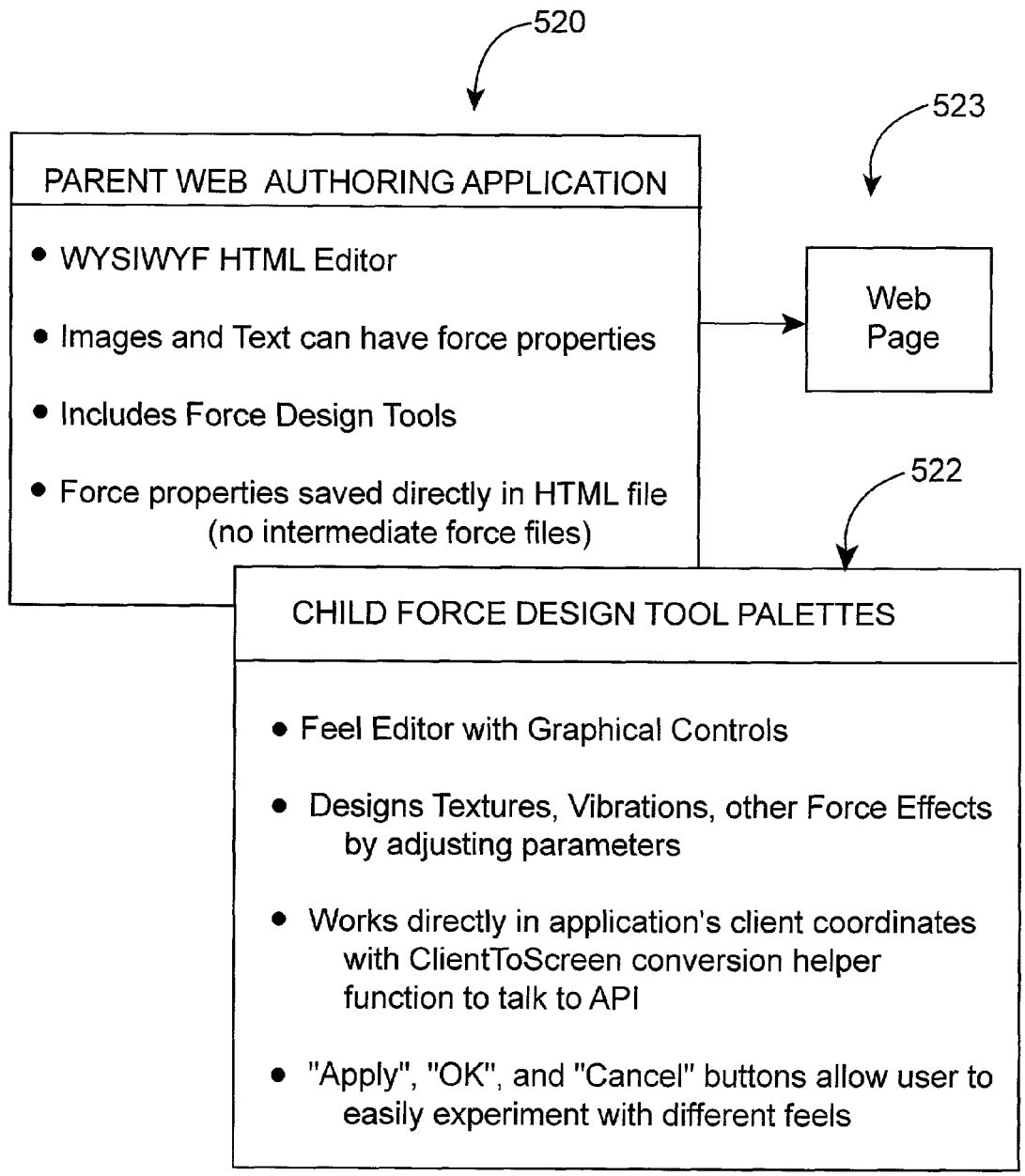
FIG. 25 is a diagrammatic illustration showing features of a first embodiment of the force feedback web page editor of the present invention.

FIG. 25 summarizes an embodiment in which a single all-in-one web authoring application (the HTML editor shown) contains fully functional force design tools which allow the user to design feel sensations directly within the application in addition to designing the text and graphics of the page.

A web authoring application 520 includes an HTML editor which can import images, add text, animations, or other web objects as allowed by conventional web page authoring tools. Application 520 also includes force assigning capabilities according to the present invention, so that images, text, or other web page objects can be assigned force properties. For example, an image object can be selected and then assigned a force effect, as shown in FIGS. 17a and 17b. In addition, sound files can also be associated with the web page objects, as shown in FIG. 17b.

Furthermore, force design tools are also included in the application 520. The forces can be designed in child force design tool "palettes" 522 which are part of the parent application 520. The palettes each include a feel editor with graphical controls in a design window, where each palette is for designing a different type of force effect, like the different force effect windows shown in FIGS. 19a-19c. The user can design textures, vibrations, and other force effects by adjusting graphical and numeric parameters; such parameters can include effect type, magnitude, direction, type-specific parameters (e.g. frequency, spacing), duration, triggers by button-press or mouse-over, and the active region of an object (the default active region coincides with text box/image borders, but can also be customized with user-specified coordinates and borders, such as borders being outside, inside, or nonexistent and having specified direction and thickness). To implement and allow the user to test those types of force effects in which the location on the screen of the graphical representation needs to be known (e.g. for enclosures, attraction/repulsion forces, etc. such as shown in FIG. 19c), the design tool palettes 522 work directly in the application's client coordinates (i.e. the window of the palette) with a conversion function to provide full screen coordinates that are typically used directly with an API and force feedback mouse (similar to the coordinate conversion described with reference to FIG. 8). Interface buttons allow the user to experiment with different force effects when designing the effects for the web page object. Thus, the user can iteratively design force effects quickly and easily by testing the effects directly in the design interface.

The application 520 outputs a force-enabled HTML file 523 which can be stored on a server and downloaded by a client machine. The force effect content (parameters, etc.) that were designed or modified in the force design palettes can be saved directly in the HTML file along with all the other text, graphics, and other non-force content, and no intermediate force effect files are required. In other embodiments, a force effect file can be created using the design palettes 522 and the produced HTML file can included reference the separate force effect files which are downloaded with or after the web page. For example, the HTML file can include Javascript which references a force-only ActiveX control, a media ActiveX control to enable any sounds, force effect files (unless force content is included in the HTML), and sound files. Other formats and implementations can also be used for the HTML file. In addition, there can be an option provided in the authoring tool to allow standard HTML code to be generated without force information.

Figure 26:
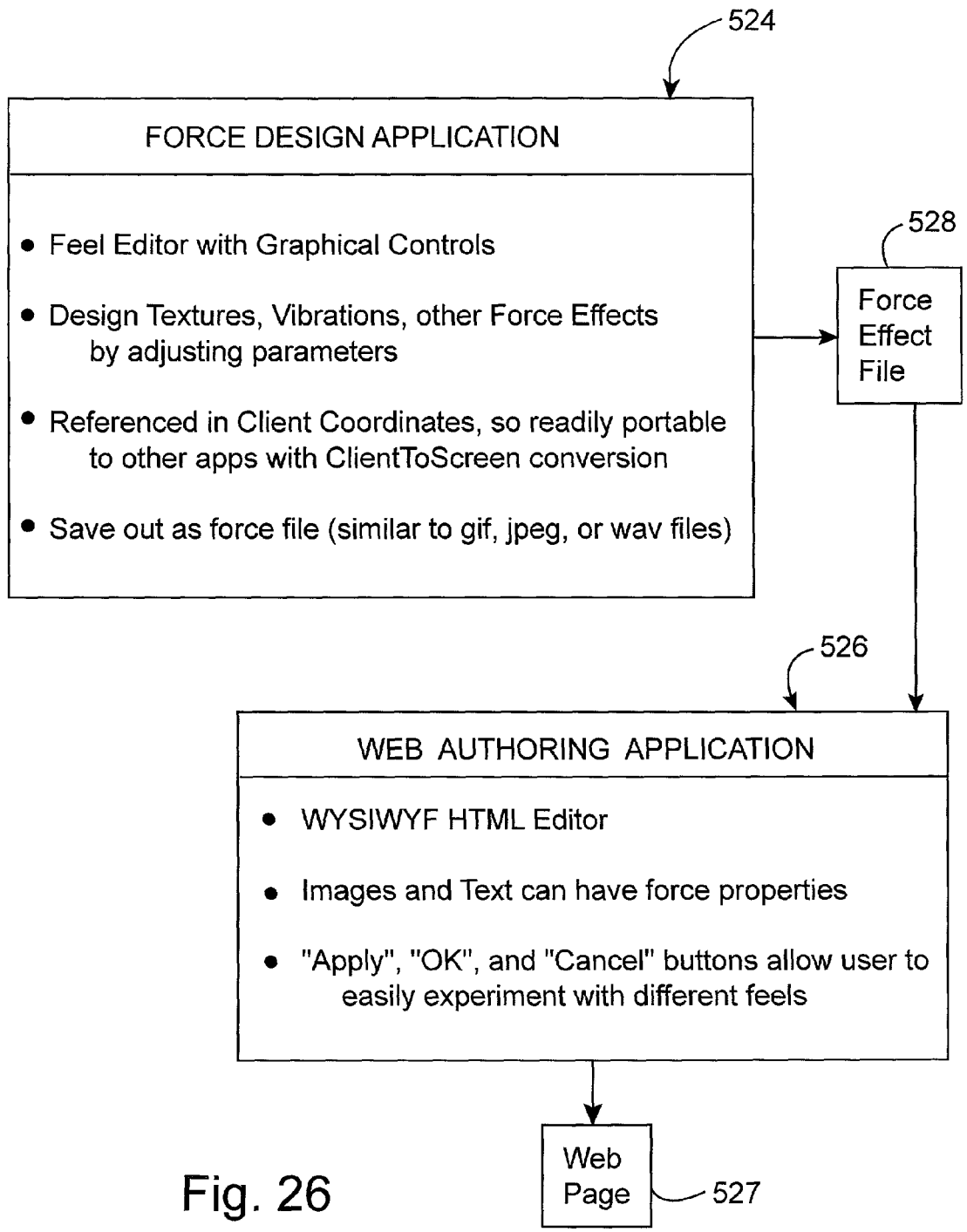
FIG. 26 is a diagrammatic illustration showing features of a second embodiment of the force feedback web page editor of the present invention.

FIG. 26 illustrates an alternative embodiment of a force feedback web page authoring tool, in which a stand-alone force design application 524 is provided which only is capable of designing feel sensations, and a stand-alone force-enabled web authoring tool 526 for designing the web page including graphics, text, and links is separately used. The force design application 524 includes a feel editor with graphical controls, such as shown above in FIGS. 18 and 19, where the user can design force effects and adjust parameters to test the effects. An example of Such an editor is I-Force Studio from Immersion Corp. The parameters can include effect type, magnitude, direction, type-specific parameters (e.g. frequency, spacing), and duration. Screen-position force effects such as enclosures are referenced in client (window) coordinates, which are readily portable to other applications after converting them to full screen coordinates. The application 524 can save out force effects as force effect files 528, which can be standardized with a file extension (e.g. "IFR"), for example.

The separate web authoring application 526 references one or more force effect files 528 that were created by the force design application 524. The web authoring application provides a force-enabled HTML editor in which web page objects may be assigned force properties. The application 526 allows a web page object to be assigned a force effect stored in the force effect file 528 that was designed in the design application 524, and to associate sound files with the force effects. For example, the editor of FIGS. 17a or 17b can be utilized as the standalone application 526 that imports a resource file including one or more force effects as shown in FIG. 17b. If a user wishes to design or edit a force while the authoring tool 526 is running, the force design application can immediately be run and displayed as well. The authoring tool of the present invention thus includes seamless web authoring integration with other force feedback design tools such as I-Force Studio.

Application 526 is used to save a web page 527 in HTML code, where the web page 527 includes tags or references to force effect files and sound files, much the same way that standard HTML includes references to image files. Alternatively, the HTML file can include the force content as described above. In one preferred embodiment, the application 526 saves an HTML file including Javascript code, references to used ActiveX controls, a name of a force effect file and a name of a force effect within the file, and a name of a sound file (if applicable). The Javascript code preferably accesses a force-only ActiveX control to enable forces (as described above) and, for example, accesses a different media ActiveX control (such as ActiveMovieControl from Microsoft) to enable sounds when a user downloads the force-enabled web page. Events can be provided as event handlers in the HTML code that pass information to the JavaScript instructions. Other implementations can also be used, for example as described herein.

The web authoring tool of FIG. 25 or 26 can use different implementations to add force effects to HTML code. For example, in one embodiment, the authoring tool takes an existing HTML document (or creates a new document), internally uses Dynamic HTML to obtain object information and add force effects. As explained above, the authoring tool can output a web page in normal HTML including additional code for implementing the force effects (such as JavaScript which calls a force-only ActiveX control).

When a web browser of a client machine is used to download the force-enabled web page produced by authoring tool of FIG. 25 or FIG. 26, the browser parses the HTML and JavaScript to display the web page and implement the forces and sounds. The ActiveX controls referenced by the JavaScript are typically already resident on the client machine or may be downloaded as needed. The force effect files and sound files referenced in the HTML are downloaded (similarly to downloading any referenced images in standard HTML) or may already be resident on the client.

End User Customization of Feel Content

Another type of force design capability can be provided to allow an end user, rather than just an author of a web page, to customize force effects for all web pages or for a particular web page. The generic force effects described herein allow end users to experience generic feel sensations for web page objects of a particular type. For example, all hyperlinks can feel like gravity wells, and all images can feel like a glass surface. Ideally, the user on a client machine should be able to adjust the set of generic feel effects to suit his or her preferences. For example, the user may want all hyperlinks to generate a vibration instead of a gravity well. Customization ability already exists in most browsers for characteristics like the color of hyperlinks—the web browser automatically assigns the hyperlink a color based on the user preference. However, web authors can override those default colors to make the hyperlinks match a web page's color scheme. Two possible ways of allowing end users to customize the set of generic feel effects are described below.

One method is to allow the user to adjust user preferences with a central control panel, either associated with their local GUI force preferences or with the Web browser preferences. This control panel could allow a force file to be specified as the desired force effect for a specific type of web page object. The force file can include all the parameters and data necessary to characterize the desired force effect. In addition, a force file can specify force effects for a whole set of different web page objects, or all the objects on a particular web page. Furthermore, in some embodiments as described above, different sets of generic force effects can be specified for different web pages. Thus, a set of generic force effects could apply only to a particular associated web page.

Another method for feel customization is to encapsulate all the force design functionality in an ActiveX object (or other programming construct) embedded in the HTML page, as described in greater detail above. In this case, any user browsing a web page with the Force Design ActiveX object embedded within has the force design tools readily available to customize all the feel content on the web page. The user would not need to have a force design web authoring interface or a force-enabled web authoring application installed to perform this customization. For example, a web page that includes a texture and a vibration references a force-only ActiveX object that enables and outputs these two forces on the client machine. A user interface can also be included in the ActiveX object downloaded to the client machine to allow a user to edit the texture force or the vibration force. The user interface need not be fully functional, since it is downloaded with the web page (and bandwidth may need to be conserved); and the user interface need not enable the user to edit/design all possible or even most types of forces, just the forces provided on the web page with which it is included. Alternatively, a more fully functional user design interface can be provided in the downloaded ActiveX object.

The authoring tools described herein have focussed on allowing web content authors to easily add compelling feel content to their HTML pages. These HTML pages would then be seen, heard, and felt by end users over the WWW. However, end users may also be interested in using these tools, even though they may not be authoring web pages. For end users, these tools can also offer a means of customizing the feel content in existing web pages to suit their preferences. Such a feature is relevant in light of the fact that some browsers, such as Microsoft's Internet Explorer 4, provides an "Active Desktop", which treats the entire operating system on the client machine as a web page. Therefore, the web page authoring tools can conceivably be used to customize the feel of files, folders, icons, scroll bars, buttons, windows, and other objects displayed in a GUI of an operating system.

While this invention has been described in terms of several preferred embodiments, there are alterations, permutations, and equivalents which fall within the scope of this invention. It should also be noted that there are may alternative ways of implementing both the process and apparatus of the present invention. For example, although specific reference is made to the World Wide Web, the features of the present invention can be provided with use of other networks and network protocols. In addition, the features described herein can be combined partially or wholly with one another if desired to achieve a desired particular implementation.

What is claimed is:

1. A method comprising:
   receiving, by an electronic device, a web page, the web page comprising a web page object corresponding to an embedded feel sensation and a second feel sensation, the embedded feel sensation referenced by markup associated with the web page;
   receiving, by the electronic device, a location of a cursor based on information received from an input device;
   determining whether the location of the cursor corresponds to the web page object;
   in response to determining that the location of the cursor corresponds to the web page object, generating, by the electronic device, a force feedback signal configured to cause the second feel sensation rather than the embedded feel sensation based at least in part on a determination that the second feel sensation overrides the embedded feel sensation; and
   outputting the force feedback signal to the input device.

2. The method of claim 1, wherein the web page is received through a network, wherein the network comprises the Internet.

3. The method of claim 1, wherein the location of the cursor comprises a first location and wherein determining whether the location of the cursor corresponds to the web page object comprises:
   determining a second location corresponding to the web page object;
   determining whether the first location corresponds to the second location; and
   in response to determining that the first location corresponds to the second location, determining that the location corresponds to the web page object.

4. The method of claim 1, wherein the input device comprises a simulation device comprising a processor.

5. The method of claim 1, wherein determining whether the location of the cursor corresponds to the web page object comprises:
   determining a region of the web page corresponding with the web page object;
   determining whether the location of the cursor corresponds to a portion of the region of the web page; and
   in response to determining that the location of the cursor corresponds to the portion of the region, determining that the location of the cursor corresponds to the web page object.

6. The method of claim 1, wherein determining whether the location of the cursor corresponds to the web page object comprises:
   determining a region of the web page corresponding with the web page object;
   receiving an input signal from the input device, the input signal corresponding to a button on the input device being depressed;
   determining whether the input signal is received while the location of the cursor corresponds to a portion of the region of the web page; and
   in response to determining that the input signal is received while the location of the cursor corresponds to the portion of the region of the web page, determining that the location of the cursor corresponds to the web page object.

7. The method of claim 1, further comprising:
   extracting, by the electronic device, the embedded feel sensation referenced by the markup.

8. The method of claim 1, wherein the embedded feel sensation comprises an authored force effect and the second feel sensation comprises a generic force effect.

9. The method of claim 1, wherein the embedded feel sensation comprises a generic force effect and the second feel sensation comprises an authored force effect.

10. The method of claim 1, further comprising generating a force feedback effect associated with the second feel sensation.

11. The method of claim 1, further comprising:
receiving the force feedback signal; and
generating a force feedback effect.

12. The method of claim 1, wherein the markup references a java applet or an ActiveX control comprising the embedded feel sensation.

13. A non-transitory computer-readable medium storing instructions to cause a processor to:
receive a web page, the web page comprising a web page object corresponding to an embedded feel sensation and a second feel sensation, the embedded feel sensation referenced by markup associated with the web page;
receive a location of a cursor based on information received from an input device;
determine whether the location of the cursor corresponds to the web page object;
in response to determining that the location of the cursor corresponds to the web page object, generate a force feedback signal configured to cause the embedded feel sensation rather than the second feel sensation based at least in part on a determination that the embedded feel sensation overrides the second feel sensation; and
output the force feedback signal to the input device.

14. The non-transitory computer-readable medium of claim 13, wherein determine whether the location of the cursor corresponds to the web page object comprises:
determine a region of the web page corresponding with the web page object;
receive an input signal from the input device, the input signal corresponding to a button on the input device being depressed;
determine whether the input signal is received while the location of the cursor corresponds to a portion of the region of the web page; and
in response to determining that the input signal is received while the location of the cursor corresponds to the portion of the region of the web page, determine that the location of the cursor corresponds to the web page object.

15. The non-transitory computer-readable medium of claim 13, further comprising instructions to cause the processor to:
extract the embedded feel sensation referenced by the markup.

16. The non-transitory computer-readable medium of claim 13, wherein the second feel sensation comprises an authored force effect.

17. The non-transitory computer-readable medium of claim 13, wherein the second feel sensation comprises a generic force effect.

18. The non-transitory computer-readable medium of claim 13, wherein:
the embedded feel sensation comprises an authored force effect and the second feel sensation comprises a generic force effect; or
the embedded feel sensation comprises a generic force effect and the second feel sensation comprises an authored force effect.

19. The non-transitory computer-readable medium of claim 13, further comprising instructions to cause the processor to:
receive the force feedback signal; and
generate a force feedback effect.

20. The non-transitory computer-readable medium of claim 13, wherein the markup references a java applet or an ActiveX control comprising the embedded feel sensation.

* * * * *

UNITED STATES PATENT AND TRADEMARK OFFICE
CERTIFICATE OF CORRECTION

| | | |
|---|---|---|
| PATENT NO. | : 8,838,671 B2 | Page 1 of 1 |
| APPLICATION NO. | : 10/092158 | |
| DATED | : September 16, 2014 | |
| INVENTOR(S) | : Wies et al. | |

It is certified that error appears in the above-identified patent and that said Letters Patent is hereby corrected as shown below:

In the Claims,

Column 15, line 57, Please delete "oil", please insert -- on --.

Column 16, line 43, Please delete "oil", please insert -- on --.

Column 17, line 1, Please delete "call", please insert -- can --.

Column 17, line 9, Please delete "oil", please insert -- on --.

Column 23, line 28, Please delete "feet", please insert -- feel --.

Column 24, line 64, Please delete "Such", please insert -- such --.

Column 25, line 59, Please delete "call", please insert -- cart --.

Column 26, line 32, Please delete "a n", please insert -- an --.

Column 27, line 46, Please delete "took", please insert -- look --.

Column 27, line 66, Please delete "BTJTTONSTATE", please insert -- BUTTONSTATE --.

Column 33, line 30 approx., After "<P>", please insert --   --.

Signed and Sealed this
Fourteenth Day of April, 2015

Michelle K. Lee
*Director of the United States Patent and Trademark Office*